(12) United States Patent
Suzuki et al.

(10) Patent No.: US 7,173,730 B1
(45) Date of Patent: Feb. 6, 2007

(54) RULE-BASED DATA REPRODUCTION SYSTEM AND METHOD

(75) Inventors: Stephanie Ann Suzuki, Irvine, CA (US); Neil Y. Iwamoto, Mission Viejo, CA (US); Don Francis Purpura, Yorba Linda, CA (US); Martin Martinez, Huntington Beach, CA (US); QuocCuong Thong Bui, Westminster, CA (US)

(73) Assignee: Canon Information Systems, Inc., Irvine, CA (US)

( * ) Notice: Subject to any disclaimer, the term of this patent is extended or adjusted under 35 U.S.C. 154(b) by 1028 days.

(21) Appl. No.: 09/661,183

(22) Filed: Sep. 13, 2000

(51) Int. Cl.
G06F 15/00 (2006.01)
G06K 1/00 (2006.01)

(52) U.S. Cl. .................. 358/1.16; 358/1.9; 358/1.15; 358/1.16

(58) Field of Classification Search .............. 358/1.5, 358/296, 400, 402, 406, 407, 1.1, 1.9, 1.11–1.18; 709/203, 206, 213
See application file for complete search history.

(56) References Cited

U.S. PATENT DOCUMENTS

| 5,935,217 | A | | 8/1999 | Sakai et al. ............ 709/249 |
| 5,978,560 | A | * | 11/1999 | Tan et al. ............... 358/1.15 |
| 5,999,708 | A | | 12/1999 | Kajita ..................... 395/114 |
| 6,029,198 | A | | 2/2000 | Iizuka ..................... 709/223 |
| 6,278,526 | B1 | | 8/2001 | Kurozasa ................ 358/1.15 |
| 6,295,117 | B2 | | 9/2001 | Haraguchi et al. ........ 355/40 |

FOREIGN PATENT DOCUMENTS

| JP | 9-261486 | 10/1997 |
| JP | 11-95938 | 4/1999 |

OTHER PUBLICATIONS

F.D. Wright, "Design Goals for an Internet Printing Protocol", Internet RFC/STD/FYI/BCP Archives, Apr. 1999, http://www.faqs.org/rfcs/rfc2567.html, pp. 1-27.

* cited by examiner

Primary Examiner—Gabriel Garcia
Assistant Examiner—Thierry L. Pham
(74) Attorney, Agent, or Firm—Fitzpatrick, Cella, Harper & Scinto

(57) ABSTRACT

A data storage and reproduction system is provided using a computer network that comprises a server, at least one attachment unit that is coupled to the server and first and second reproduction devices. The server storing data to be reproduced. At least one attachment unit comprising means for interfacing with a portable memory device having a reference to the reproduction data. The first reproduction device capable of performing a first data reproduction of the reproduction data and the second reproduction device capable of performing a second data reproduction of the reproduction data, the second data reproduction being different than the first data reproduction. A rule processing means for processing a rule set to determine whether the reproduction data satisfies selection criteria of the rule set, wherein the at least one attachment unit requests the reproduction data from the server for use by the reproduction device, if the reproduction data satisfies the selection criteria.

46 Claims, 43 Drawing Sheets

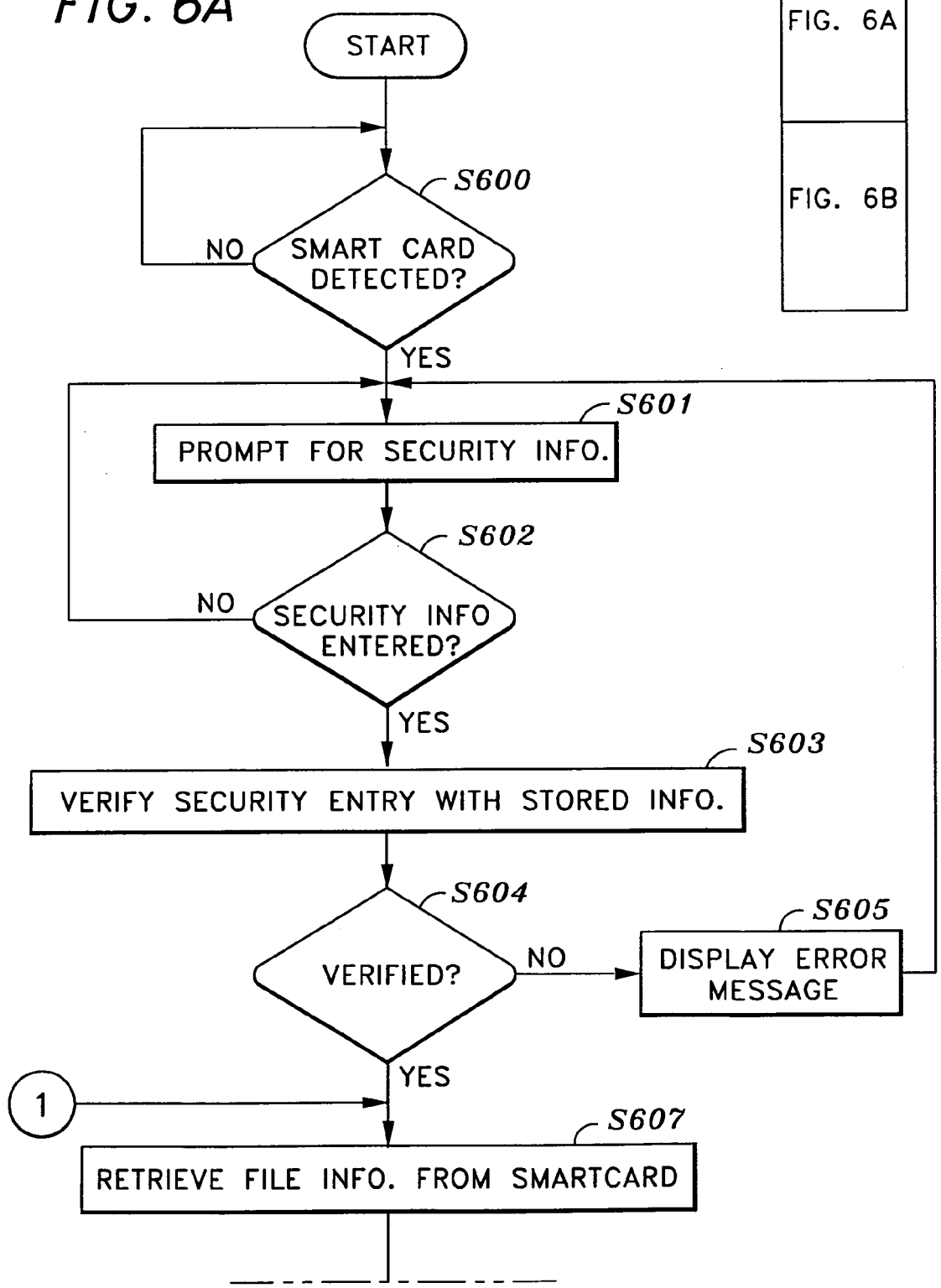

RULE-BASED DATA REPRODUCTION SYSTEM AND METHOD

BACKGROUND OF THE INVENTION

1. Field of the Invention

The present invention relates to a rule-based storage and reproduction of data and, more particularly, to the use of rules in selecting data for reproduction by a reproduction device, the reproduction being coordinated by a unit attached to a reproduction device which is capable of reading a portable memory device having stored information corresponding to the reproduction data and processing the rules for reproduction data selection.

2. Description of the Related Art

In a computer network environment, personal computers, workstations and I/O (Input/Output) devices such as printers, scanners, facsimile machines, copies, digital cameras, etc. are interconnected. Advantageously, networked I/O devices are accessible via the network to a network computer user such that the user may select from a number of devices to perform an I/O operation.

However, a disadvantage of the conventional network approach is that a user must specify a device at the time of the I/O operation. That is, the selection of data is coupled with the selection of the device during an I/O operation. As a result, the data is then formatted for use by the selected device. To use another device, it is necessary to use a separate I/O request to reselect the data and to choose another I/O device.

For example, in a Windows environment, to output data such as a word processing document, a user typically initiates the operation within the document using a dialog panel that contains the user's settings including the I/O device that is to output the document. When the request is submitted, the data that is to be output is formatted for the selected device and forwarded to the output device. The user cannot change the output device designation after submitting the print request. The format of the output data is dictated by the device selection. Thus, there is no ability to dynamically reformat the data for the other device. Once it is formatted, the data is sent to the selected device for output. To output the data to another device, it is necessary to initiate another request and designate the other device.

In a case of an input operation such as that involving a scanner, for example, a data file is generated that contains image data. It may be desirable to use the image data with an I/O device that does not support the image data's format. Thus, it would be necessary to initiate the I/O operation within an application that is able to read the data file and selecting the desired device.

Further, it is necessary to install an I/O device in a computer system before a computer user may use the device in an I/O operation. For example, in Windows98, the "Add Printer" function is used to add an entry in the system's registry of printers and to install a printer driver for use with the printer. Since, under the conventional approach, a user must specify both the data and the device at the same time, it is not possible to designate a device that has not previously been installed on the user's system.

The Internet Print Protocol (IPP) that is being developed through the Printer Working Group in accordance with the Internet Engineering Task Force (IETF) allows a user to print to remote printers across the Internet or an intranet. Further, it is possible to print by reference, or print a document by referring to the document's URI (Uniform Resource Identifier).

However, before a printer may be used for the first time, the end user must locate the desired printer on the Internet/intranet and then create a local instance of the printer on the user's system and install a printer driver. Once the desired printer has been located and installed, the user may print to the printer from local applications (i.e., applications running on the user's computer system) such as browser, word processing, spreadsheet, etc. applications. The print data is formatted and sent via the Internet/intranet to the designated printer.

IPP provides a means to locate, install and use remote printers in a manner similar to using a local printer. Further, like the previously-discussed approach, the user must specify the remote printer when initiating the print. The data is formatted based on the user's designation at the time the print job is initiated by the user. There is no provision to redirect the request to another device or to dynamically reformat the data to accommodate such a redirection.

Another approach for accessing an I/O device consists of an apparatus that reads a PCMCIA card containing a user's identification. The user identification is used to determine a forwarding location for input information and a directory on the apparatus that contains a user's output for a device connected to the apparatus. In Japanese laid-open Patent 9-261486, a network system is described that consists of an apparatus that interfaces with a PCMCIA (Personal Computer Memory Card International Association) card, a client computer and a peripheral device. The apparatus stores user information and is capable of temporarily storing I/O data. The PCMCIA card contains a user identification that is used by the apparatus to access user information stored in the apparatus such as the location of data stored on the apparatus and an identification of the user's client terminal.

Where the apparatus is connected to an input device, the input is directed to a previously-specified location identified in the user information stored in the memory of the apparatus. Where the apparatus receives output data from a user, the apparatus stores the data in its memory until the user's PCMCIA card is inserted at the apparatus.

More particularly, when output data is received, the apparatus searches its database to determine the user's directory and temporarily stores the data in the directory associated with the user identification accompanying the output data. When the user's PCMCIA card is inserted in the apparatus, the user identification is retrieved and used to identify the directory that contains the user's output files(s). Each file that is stored in the user's directory on the apparatus is transmitted to the connected output device for output by the device.

In the case of an output request, the user identifies the device at the time the output request is submitted. Once the user designates the device that is to output the desired data, the user is not able to alter the device designation. Further, there is no provision for forwarding the output to another output device or to ensure that the data is formatted for a given output device.

There is no mechanism in the above-described approaches for limiting or otherwise selecting the file or files stored in the user's directory based on selection criteria defined by the user. As more and more files are being stored, a mechanism for avoiding those files that are not currently of interest to the user would be beneficial.

SUMMARY OF THE INVENTION

The present invention addresses the foregoing problems and provides a data reproduction system and method to separate the selection of data for reproduction from the selection of the reproduction device that is to reproduce the data, in combination with a mechanism to filter reproduction data based on filtering (or selection) criteria specified in a filtering rule set. Thus, it is possible to filter out reproduction data that is not currently of interest, and thereby process the reproduction data that is currently of interest.

More particularly, with regard to one aspect of the invention, a data storing and reproducing system using a computer network is provided and comprises a server for storing reproduction data, at least one attachment unit coupled to the server, the at least one attachment unit comprising means for interfacing with a portable memory device having a reference to the reproduction data, first and second reproduction devices 18 coupled to one or more of the at least one attachment unit, the first reproduction device 18 capable of performing a first reproduction of the reproduction data and the second reproduction device 18 capable of performing a second reproduction of the reproduction data, the second data reproduction being different than the first data reproduction, and a rule processing means for processing a rule set to determine whether the reproduction data satisfies selection criteria of the rule set, wherein the at least one attachment unit requests the reproduction data from the server for use by the reproduction device, if the reproduction data satisfies the selection criteria.

In another aspect of the present invention, an attachment unit connectable to plural types of data processing devices is provided and comprises means for interfacing with a portable memory device having information including a reference to reproduction data stored on a network server, means for processing a rule set to determine whether the reproduction data satisfies selection criteria of the rule set, means for sending a request for the reproduction data, when the reproduction data satisfies the selection criteria, means for receiving the requested reproduction data from the network server, and means for causing the at least one of the plural types of data processing devices to perform a data reproduction of the received data.

In a further aspect of the invention, a method of storing and reproducing data on at least one of plural types of reproduction devices, the method is provided and comprises storing the reproduction data on a server, retrieving information stored on a portable memory device in response to a request to reproduce the reproduction data using one of plural types of reproduction devices, the stored information on the portable memory device corresponding to the reproduction data, retrieving a rule set having selection criteria for selecting the reproduction data, using the stored information and the rule set to determine whether the reproduction data satisfies the selection criteria, accessing the reproduction data on the server, if the reproduction data satisfies the selection criteria, and reproducing the reproduction data using the requested reproduction device.

This brief summary has been provided so that the nature of the invention may be understood quickly. A more complete understanding of the invention can be obtained by reference to the following detailed description of the preferred embodiment(s) thereof in connection with the attached drawings.

DETAILED DESCRIPTION OF THE PREFERRED EMBODIMENTS

Figure 1A:
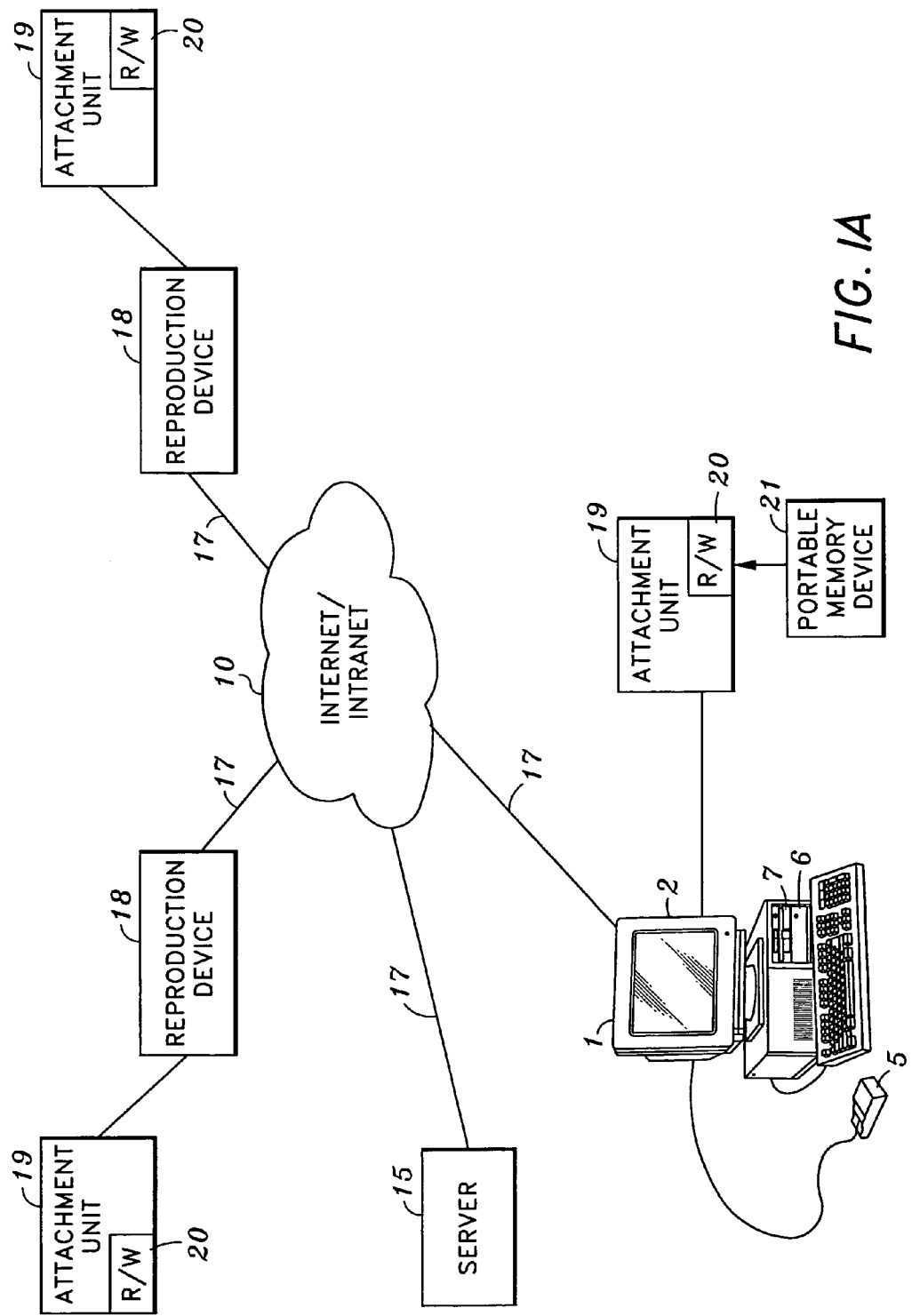
FIG. 1 is an outward view of a hardware environment embodying the present invention.

FIG. 1 is an outward view of representative computing hardware embodying the present invention. Shown in FIG. 1 are computer 1 executing a browser-enabled operating system, such as Microsoft Windows98®, display monitor 2 for displaying text and images to a user, keyboard 4 for entering text and commands into computer 1, and mouse 5 for manipulating and for selecting objects displayed on display monitor 2. Also included with computer 1 are fixed disk drive 6, in which are stored application programs, such as a World Wide Web browser application, data files, and device drivers for controlling peripheral devices attached to computer 1, floppy disk drive 7 for use in reading data from and writing data to floppy disks inserted therein. Data and/or applications may also be accessed from a CD-ROM via a CD-ROM drive (not shown) or over a network to which computer 1 may be connected (network connection not shown).

Computer 1 further includes a connection 17 to World Wide Web 10. While the invention is described with reference to the World Wide Web 10 (also referred to as the Internet), it should be apparent that the invention may be practiced with other types of networks such as an intranet, local area network, etc. Connection 17 may be formed, for example, via a serial modem (not shown) connected to computer 1 and a telephone line which, in turn, is connected to World Wide Web 10. It should be noted that computer 1 may be connected to World Wide Web 10 by other types of connections. By executing a web browser application, web pages and data can be received from World Wide Web 10 over connection 17 for display on monitor 2 and/or use by computer 1.

Also connected to World Wide Web 10, via a connection 17, is web server 15, which receives requests for web pages and/or data from such web browsers and/or other applications running on a client device such as computer 1 and sends the pages and/or data to a requesting application over World Wide Web 10. It should be apparent while only one server 15 is shown in FIG. 1A, additional instances of server 15 may be used to store and reproduce data as described herein.

Also connected to World Wide Web 10 (via connection 17) is reproduction device 18 that may be used to reproduce data. Reproduction device 18 may be, for example, a printer, display (such as an intelligent display), a scanner, facsimile machine, digital copier or a personal computer (e.g., an instance of computer 1). According to the present invention, one instance of reproduction device 18 may differ from another instance of reproduction device 18 in data format expected by the reproduction device 18. Attachment unit 19 is attached to a reproduction device 18 which comprises a reader/writer 20 capable of reading from and writing to portable memory device 21.

As is discussed in more detail below, attachment unit 19 is coupled to reproduction device 18 and facilitates the storage and reproduction of data using the present invention. Portable memory device 21 includes memory store that includes, among other things, the data format of data stored on server 15. When data is to be reproduced by reproduction device 18, attachment unit 19 determines based on the information stored in portable memory device 21 whether data's current format is suitable for the reproduction device 18. If not, the data is reformatted for use by reproduction device 18.

Figure 1B:
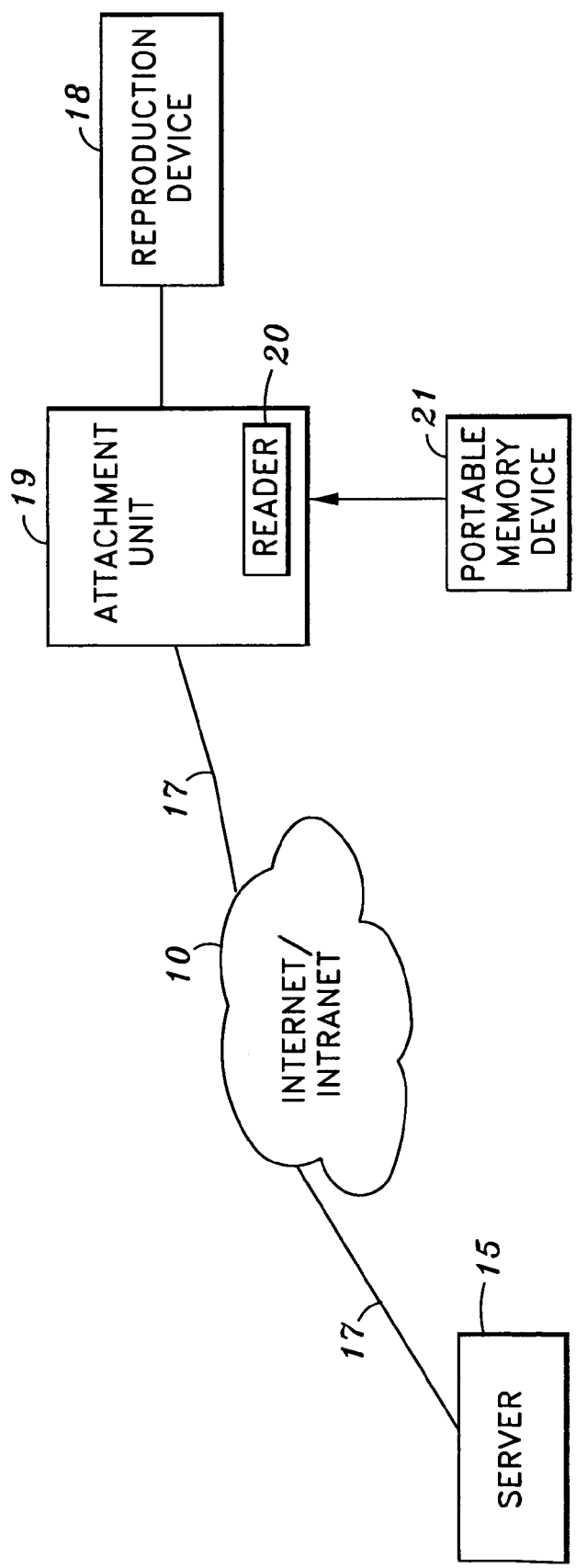

Attachment unit 19 may be internal or external to reproduction device 18. That is, attachment unit 19 may be a component of smart box 25 which, as is illustrated in FIG. 1B, provides an interface between World Wide Web 10 and reproduction device 18.

Web server 15 includes program code configured to receive requests and send responses to the requesting application to assist a user of computer 1 or other device to store data on web server 15 and retrieve stored data for reproduction by various instances of reproduction device 18.

Like computer 1, web server 15 is a computing system that is preferably executing a browser-enabled operating system, such as Microsoft Windows98®, and may include a display monitor 2, keyboard 4 for entering text and commands and mouse 5 for manipulating and for selecting objects displayed on display monitor 2. Web server 15 further includes one or more disk drives (e.g., fixed disk drive 6, floppy disk drive 7 and/or a CD-ROM drive), in which are stored reproduction data, application programs, other data and files, and device drivers for controlling peripheral devices.

A floppy disk drive, such as floppy disk drive 7 may be used to read data from and write data to floppy disks inserted therein. Data and/or applications may also be accessed from a CD-ROM via a CD-ROM drive (not shown) or over a network to which web server 15 may be connected (network connection not shown).

Web server 15 is connected to World Wide Web 10 via connection 17 which may be a serial modem or other interface (e.g., ethernet card) to connect directly or, indirectly, to the World Wide Web (or other communications network such as local or wide area networks). Connection 17 may be, for example, a telephone line, a T1 line, a local area network connection or the like. In a case that connection 17 connects directly to a local area network, the local area network is preferably connected to a router (not shown), which, in turn, is connected to World Wide Web 10. In such a configuration, the router includes firewall software for prevention of unauthorized access to the local area network.

Figure 2:
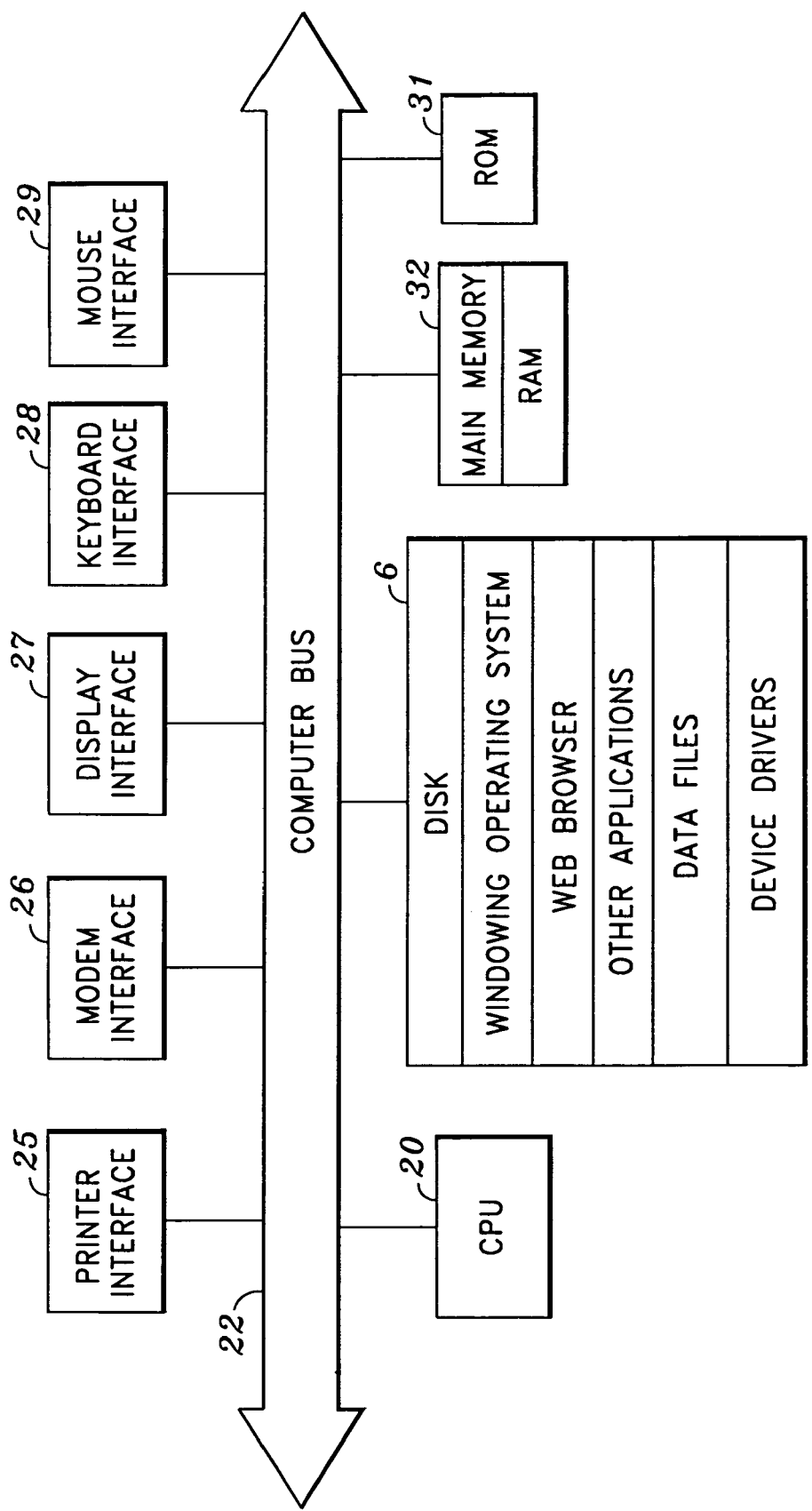
FIG. 2 is a block diagram of the internal architecture of a personal computer for use in conjunction with the present invention.

FIG. 2 is a block diagram of the internal architecture of computer 1. Shown in FIG. 2 are CPU 20, which is preferably a Pentium-type microprocessor, interfaced to computer bus 22. Also interfaced to computer bus 22 are printer interface 25, to allow computer 1 to communicate with printer 8, modem interface 26 to enable communications between computer 1 and its internal modem, display interface 27 for interfacing with display monitor 2, keyboard interface 28 for interfacing with keyboard 4, and mouse interface 29 for interfacing with mouse 5. Of course, if computer 1 connects to World Wide Web 10 by a connection other than a telephone connection, a suitable interface other than modem interface 29 may be utilized.

Read only memory (ROM) 31 stores invariant computer-executable process steps for basic system functions such as basic I/O, start up, or reception of keystrokes from keyboard 4.

Main random access memory (RAM) 32 provides CPU 20 with memory storage which can be accessed quickly. In this regard, computer-executable process steps of a web browser or other application are transferred from disk 6 over computer bus 22 to RAM 32 and executed therefrom by CPU 20.

Also shown in FIG. 2 is disk 6 which, as described above, includes a windowing operating system, a web browser executable on the particular windowing operating system, other applications which may include word processing, spreadsheet, graphics, gaming applications as well as applications downloaded from World Wide Web 10 (e.g., an interactive photo shop interface application). Disk 6 further includes data files and device drivers as shown.

Web server 15 has a similar internal architecture to that of computer 1. In addition to that described, web server 15 may further include a TCP/IP layer wherein the TCP portion of a packet received via World Wide Web 10 is removed and an HTTP or, in a case of a secure (e.g., encrypted) packet, an HTTPS packet is forwarded to HTTP, or HTTPS, server software, respectively. The HTTP, or HTTPS, server 15 may forward the request to a specified application. For example, a request from attachment unit 19 is forwarded to application software capable of handling such a request (e.g., download, delete, conversion, etc.). Responses (e.g., a web page and/or data responses) are forwarded to the client using this mechanism in the reverse. A response may be forwarded to a requester via the HTTP, or HTTPS, Server, the TCP/IP Layer 41 and World Wide Web 10.

Figure 3:
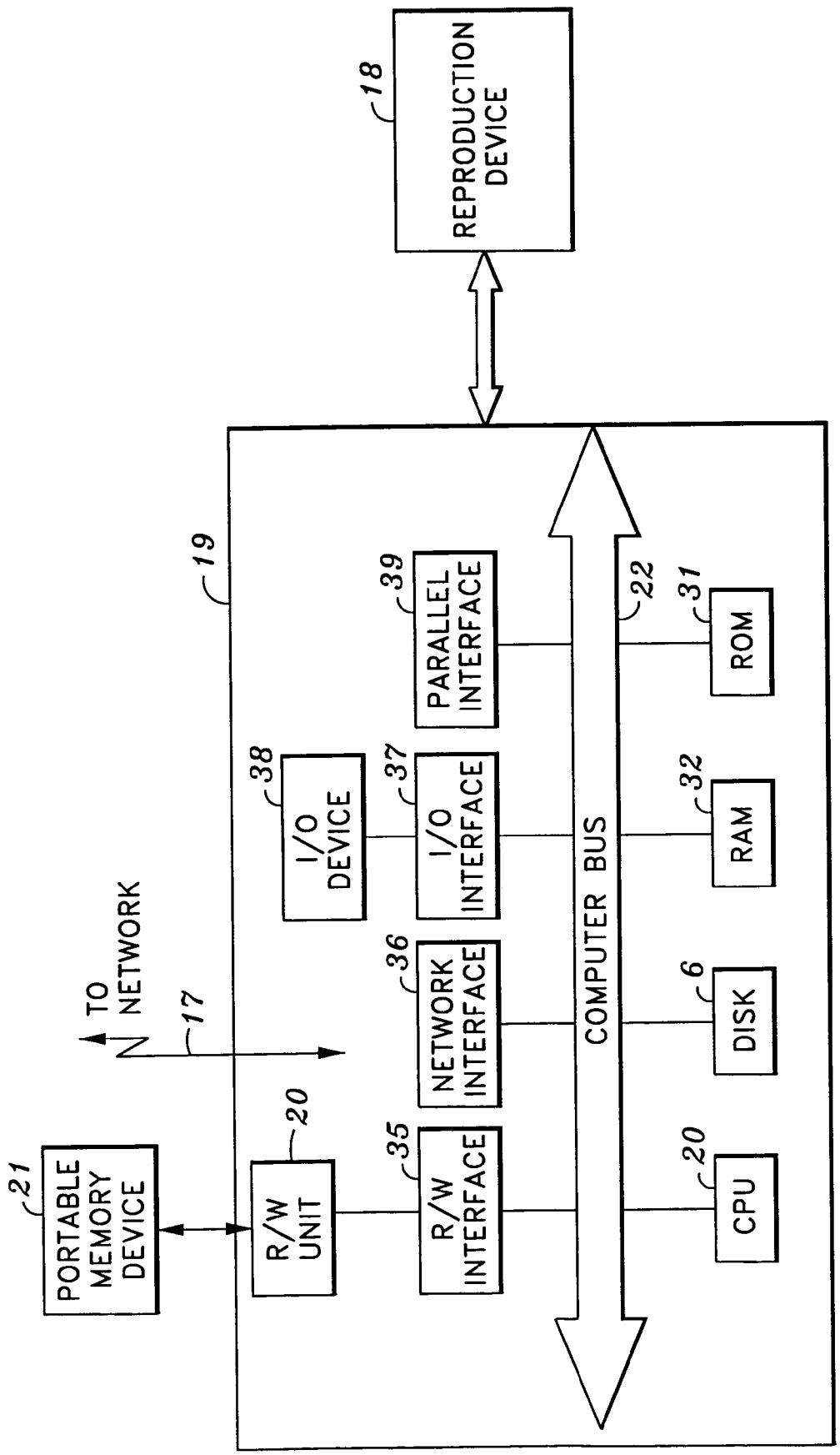
FIG. 3 is a block diagram of relevant internal architecture of computer servers used in conjunction with the present invention.

FIG. 3 illustrates an example of an internal architecture of attachment unit 19 according to the present invention. As is illustrated in the example architecture, attachment unit 19 includes a central processing unit 20, bus 22, disk 6, RAM 32, ROM 31 as previously described. Disk 6 includes software executable by CPU 20 used in the storage and reproduction of data as is described herein. Further, attachment unit 19 includes read/write interface 35 that provides an interface to read/write unit 20. Read/write unit 20 allows attachment unit 19 to read from and write to portable memory device 21, and may be external or internal to attachment unit 19. A network interface 36 provides an interface between attachment unit 19 and a network (e.g., Internet/intranet 10).

I/O interface 37 provides an interface between an I/O device and attachment unit 19. Examples of I/O devices that may be used with attachment unit 19 include display and input devices. A display may be used to display a graphical user interface (GUI) including available storage and reproduction functions such as the functions provided by reproduction device 18. Examples of input devices that may be used with attachment unit 19 include a keypad, keyboard, mouse, etc. for use in entering and/or selecting commands to store and reproduce data. Parallel interface 39 provides an interface between attachment unit 19 and reproduction device 18.

In the example of FIG. 3, attachment unit 19 is external to reproduction device 18. However, attachment unit 19 may be internal to reproduction device 18. In such a case, the internal architecture of attachment unit 19 may not include parallel interface 39 for interfacing with reproduction device 18.

The present invention stores and reproduces data such that the reproduction device selection is made independent of the reproduction data selection. Thus, it is possible to select data for reproduction once for use with multiple reproduction devices 18. The present invention ensures that the format of reproduction data is suitable for each of the reproduction devices 18 that are used to reproduce the data. The present invention further provides the ability for a computer system user to use a reproduction device 18 that has not been previously installed in the computer system. Further, the present invention allows a user to delay a reproduction operation.

According to the present invention, data identified as reproduction data is retained in storage by server 15 and accessible for use in one or more reproduction operations using attachment unit 19 coupled to a reproduction device 18 and server 15. Attachment unit 19 is capable of reading portable memory device 21 (e.g., smart card, PCMCIA card, etc.) having a memory for storing a reference to the data stored on server 15.

The present invention provides a mechanism to allow a first instance of reproduction device 18 to perform a first reproduction of the reproduction data and a second reproduction device 18 to perform a second reproduction of the reproduction data, the second instance of reproduction device 18 being different than the first instance of reproduction device 18. Server 15 responds to a request from an attachment unit 19 by transmitting the reproduction data and where the reproduction data is determined to be a format unsuitable for the intended reproduction device 18, the data is reformatted for use by the reproduction device 18.

Where it is determined that the reproduction data has a format that is unsuitable for the reproduction device 18, the data may be reformatted by attachment unit 19, server 15 or another computer system or server that is capable of reformatting the reproduction data.

A user interface is provided for outputting information (e.g., information stored on portable memory device 21) and receiving instructions. The user interface comprises a portion that is common to all reproduction devices 18 and another portion that is customized for use with a certain instance or type of reproduction device 18 coupled with attachment unit 19. For example, the customizable portion comprises options and/or information corresponding to the functionality provided by attachment unit 19. Thus, for example, the user interface displays for selection at least one entry corresponding to a data reference stored in portable memory device 21 and at least one selectable function associated of reproduction device 18.

Figure 4A:
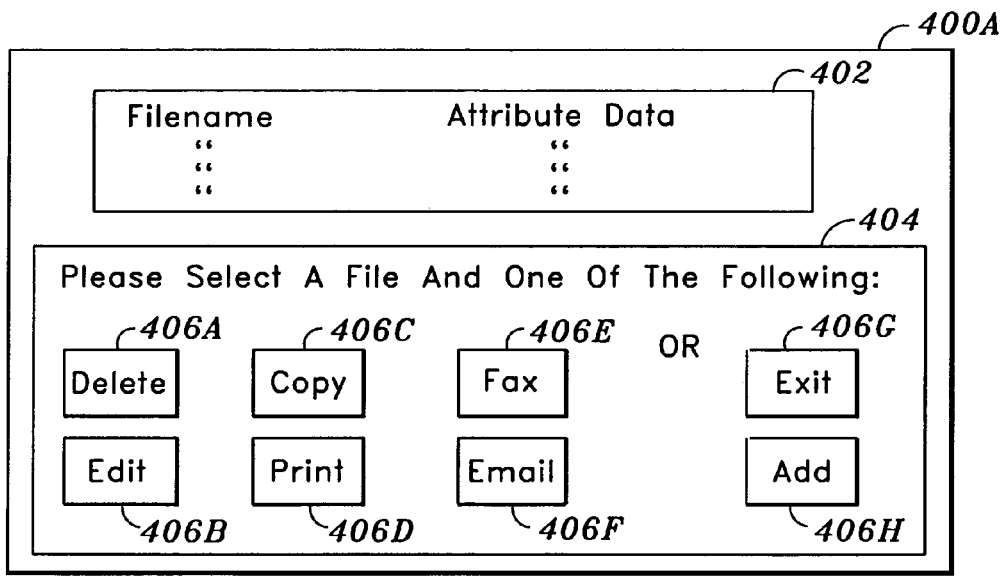
FIGS. 4A and 4B illustrate GUIs comprising common and customizable portions for use with the present invention.
Figure 4B:
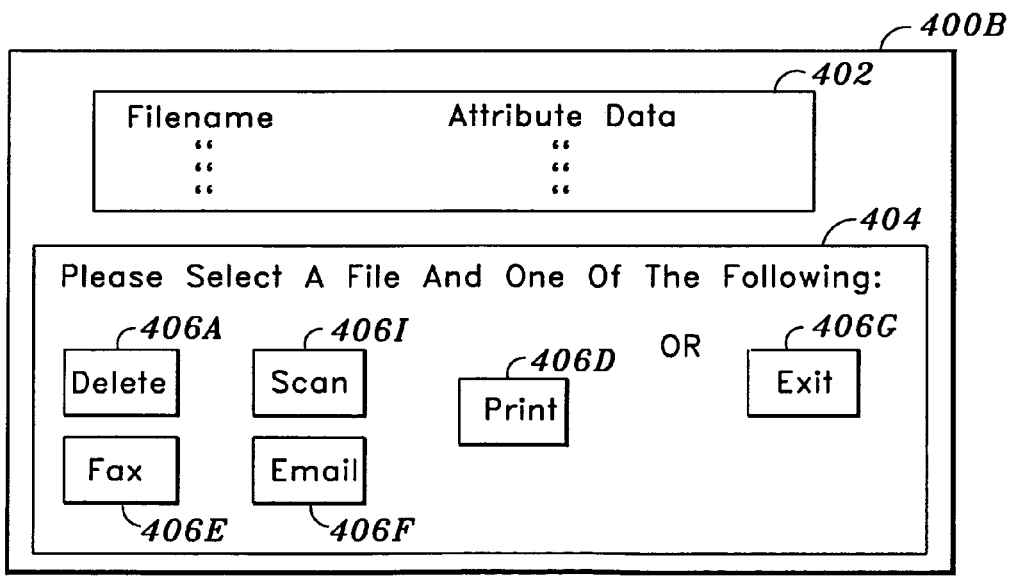

FIGS. 4A and 4B illustrate GUIs comprising common and customizable portions for use with the present invention. FIG. 4A illustrates a GUI for use with a PC and FIG. 4B illustrates a GUI that may be used with a facsimile machine, for example.

Referring to FIG. 4A, listing 402 includes entries that correspond to entries in portable memory device 21 and identify information associated with reproduction data stored on server 15. Such information includes the file name that include the reproduction data and may include other information as well such as file type.

Command section 404 identifies operations that are available with an instance of reproduction device 18 coupled to attachment unit 19. For example, in FIG. 4A, GUI 400A is customized for use with a personal computer and includes selections 406A to 406H with which a user may initiate delete, edit, copy, print, fax, electronically mail (or email), add and exit operations.

To perform an operation, in addition to selecting one of 406A through 406F, the user selects an entry in listing 402 to initiate an operation. The user may choose to delete reproduction data, using selection 406, which results in the corresponding entry being deleted from portable memory card 21 and the reproduction data being deleted by server 15, or add reproduction data using selection 406H. An add operation results in the reproduction data being stored by server 15 and an entry being added to portable memory device 21 corresponding to the reproduction data. As an alternative to using selection 406H to add reproduction data, a drag and drop operation may be used to initiate an add operation. For example, a user may select an icon, or other representation of the reproduction data in a GUI (e.g., a file icon in Windows98) using mouse 5, drag and drop the icon onto an icon of portable memory card 21 in the GUI.

The user may edit, copy, print, fax or email reproduction data using selections 406B, 406C, 406D, 406E and 406F, respectively. As is discussed in more detail below, a fax or email operation may be performed by reproduction device 18 coupled to attachment unit 19. Alternatively, attachment unit 19 may send a request to server 15 to perform the fax or email operation. Further, a print operation may be performed using a conventional printing approach (i.e., a printer installed on the PC) or, using the present invention, the print operation may be performed using a printer coupled to an instance of attachment unit 19.

Referring to FIG. 4B, GUI 400B is customized for use with a facsimile machine. Listing portion 402 includes entries that correspond to entries stored in portable memory device 21. Command section 404 includes those operations that are available for use with the facsimile machine coupled to attachment unit 19. For example, GUI 400B includes selections 406A, 406E, 406I, 406F, 406D and 406G that correspond to delete, fax, scan, email, print and exit operations. Selection 406I allows a user to add reproduction data by scanning a document (e.g., an image) using the scanning capabilities of the facsimile machine.

GUIs 400A and 400B include selections that are common to each (e.g., selections 406A, 406D, 406E, 406F and 406G) and selections that are unique to each (selections 406B and 406C in GUI 400A and selections 406I in GUI 400B). Further, a similar selection in one GUI may be processed differently depending on the reproduction device 18 coupled to attachment unit 19. For example, selection 406E (i.e., "FAX") in GUI 400A results in a facsimile operation being sent to server 15 for processing while the same selection in GUI 400B causes the facsimile operation to be initiated on the facsimile machine coupled to attachment unit 19.

Similarly, print selection 406D in GUI 400A may be used to print on a printer attached to PC, or a printer coupled to an instance of attachment unit 19. In the latter case, where, for example, there is no printer attached to the PC or the attached printer is unable to perform the print operation, the reproduction data may be stored on server 15 with a corresponding entry added to portable memory device 21. A print operation may be performed by a printer attached to an instance of attachment unit 19 as is described in more detail below.

FIGS. 6 through 15 illustrate a flow diagram of process steps for handling store and reproduction operations according to the present invention.

Figure 6B:
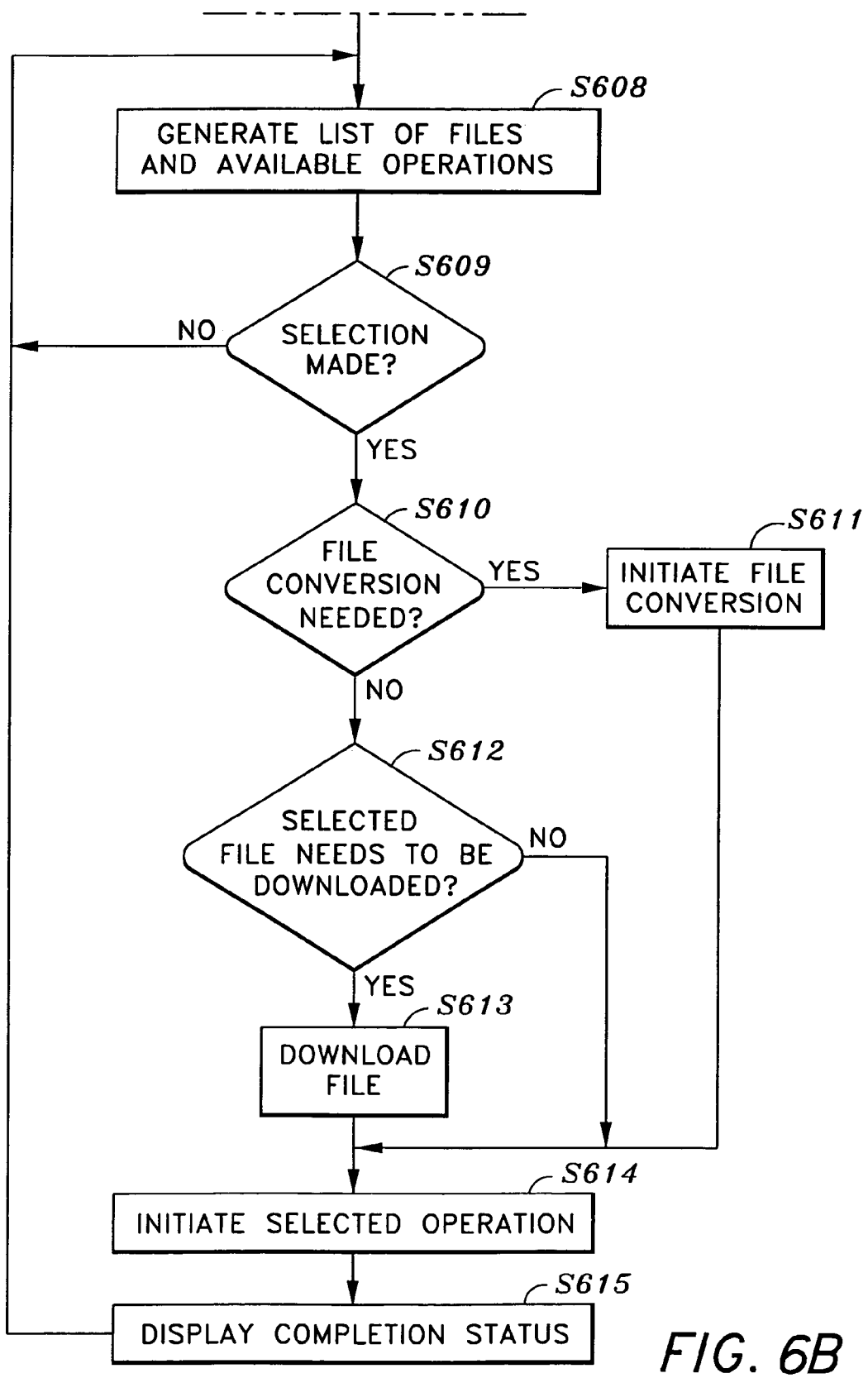
FIG. 6 illustrates a process for responding to an operation selected by the user according to the present invention.

More particular, referring to FIG. 6, process steps are provided illustrating functionality of attachment unit 19. At step S600, attachment unit 19 determines whether portable memory device 21 has been detected in read/write unit 20. If not, processing continues at step S600 to detect a presence of portable memory device 21.

If it is determined, at step S600, that portable memory device 21 is inserted in read/write unit 20, processing continues at step S601 to prompt the user for security information. For example, a user may enter username and/or password information. A determination is made at step S602 whether security information has been entered by the user. If not, processing continues at step S601 to prompt for the security information.

If security information is entered by the user, processing continues at step S603, to compare the security information that is entered by the user with security information stored in portable memory device 21 to verify the user. If it is determined, at step S604, that the user is not verified by security information entered (e.g., the username and/or password does not match with username and/or password information stored in portable memory device 21), processing continues at step S601 to prompt the user to re-enter the requested security information.

If the user is verified, as determined in step S604, processing continues at step S607 to retrieve information stored on portable memory device 21 including information corresponding to reproduction data stored by server 15.

According to the present invention, portable memory device 21 is capable of storing information that is received from the server, personal information unique to a user of portable memory device 21, a reference (or references), such as a file name, corresponding to each of the reproduction data sent to the server using the portable memory device, a format attribute identifying a format of the reproduction data sent to the server using portable memory device 21, personal facsimile information used in sending the data as a facsimile message, and/or information used in sending the data as an electronic mail message.

Figure 5:
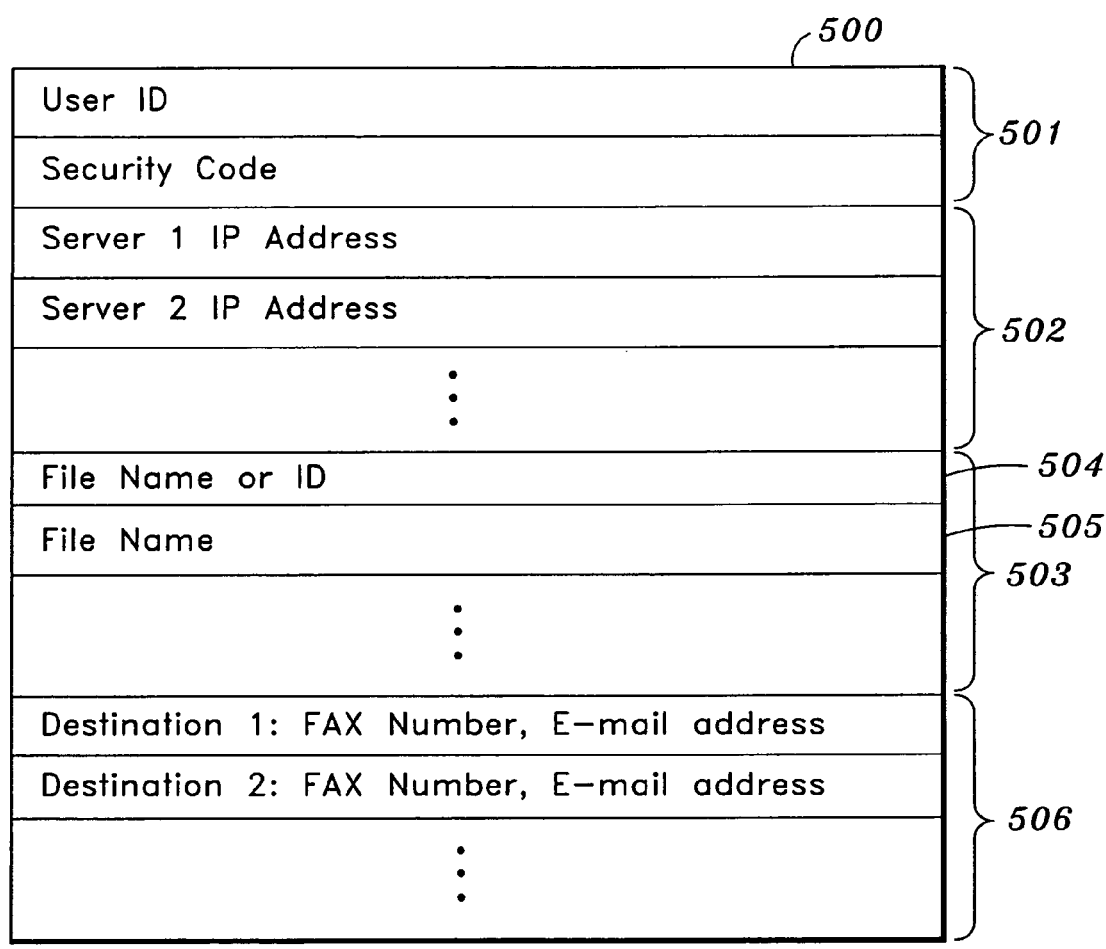
FIG. 5 provides an example of information that may be stored in memory of a portable memory device according to the present invention.

FIG. 5 provides an example of the information that may be stored in memory of portable memory device 21. Information 500 may be stored in RAM 32 and/or disk 6 and includes user information 501, server information 502, reproduction data information 503 and address information 506.

More particularly, user information 501 includes a user identification (e.g., a username) and preferably includes a security code or password that may be used to verify the user. Server information 502 includes server access information including a server address such as an IP (Internet Protocol) address and/or a URL (Universal Resource Locator), for example.

Reproduction data information 503 includes references to reproduction data. Entries 504 and 505 each have references to a file that contains reproduction data and attribute information of the reproduction data. More specifically, entries 504 and 505 include a file name (or other identification), a type (or format) and a preferably a default application for use with the reproduction data (e.g., a word processing application in which reproduction data was created). In addition, the server that stores the reproduction data (e.g., server 15) is identified. Thus, in a case where entry 504 corresponds to a file containing reproduction data which is stored on server 15, entry 504 includes a reference to server 15 or an entry in server information 502 that corresponds to server 15.

Information 500 further includes address information 506 that may be used in sending a facsimile and/or electronic mail message to a user. Preferably, an entry in address information 506 identifies a recipient by name, or other identification, as well as a facsimile number and/or an electronic mail address.

Referring again to FIG. 6, a GUI (e.g., GUIs 400A or 400B) is generated using the information retrieved from portable memory device 21 that includes a list of the reproduction data having entries in portable memory device 21 and available operation selections. At step S609, a determination is made whether a selection is made by the user. If not, processing continues at step S609 to await a selection.

If a selection is detected, at step S609, processing continues at step S610 to determine based on attribute information and expected, or suitable, formats of the reproduction device 18 whether the reproduction data format is suitable for reproduction device 18. If not, processing continues at step S611 to initiate conversion of the reproduction data to be described in more detail below with reference to FIG. 13.

If it is determined, at step S610, that there is no need to convert the reproduction data, processing continues at step S612 to determine whether it is necessary to download the reproduction data. For example, it may be that the selected operation is to be performed, or at least initiated, by server 15. In such a case, it is not necessary to download the reproduction data. However, if it is determined that the reproduction data needs to be downloaded, processing continues at step S613 to request and receive the reproduction data from server 15. At step S614, a selected operation is initiated, and processing continues at step S615 to display a completion status.

Figure 7:
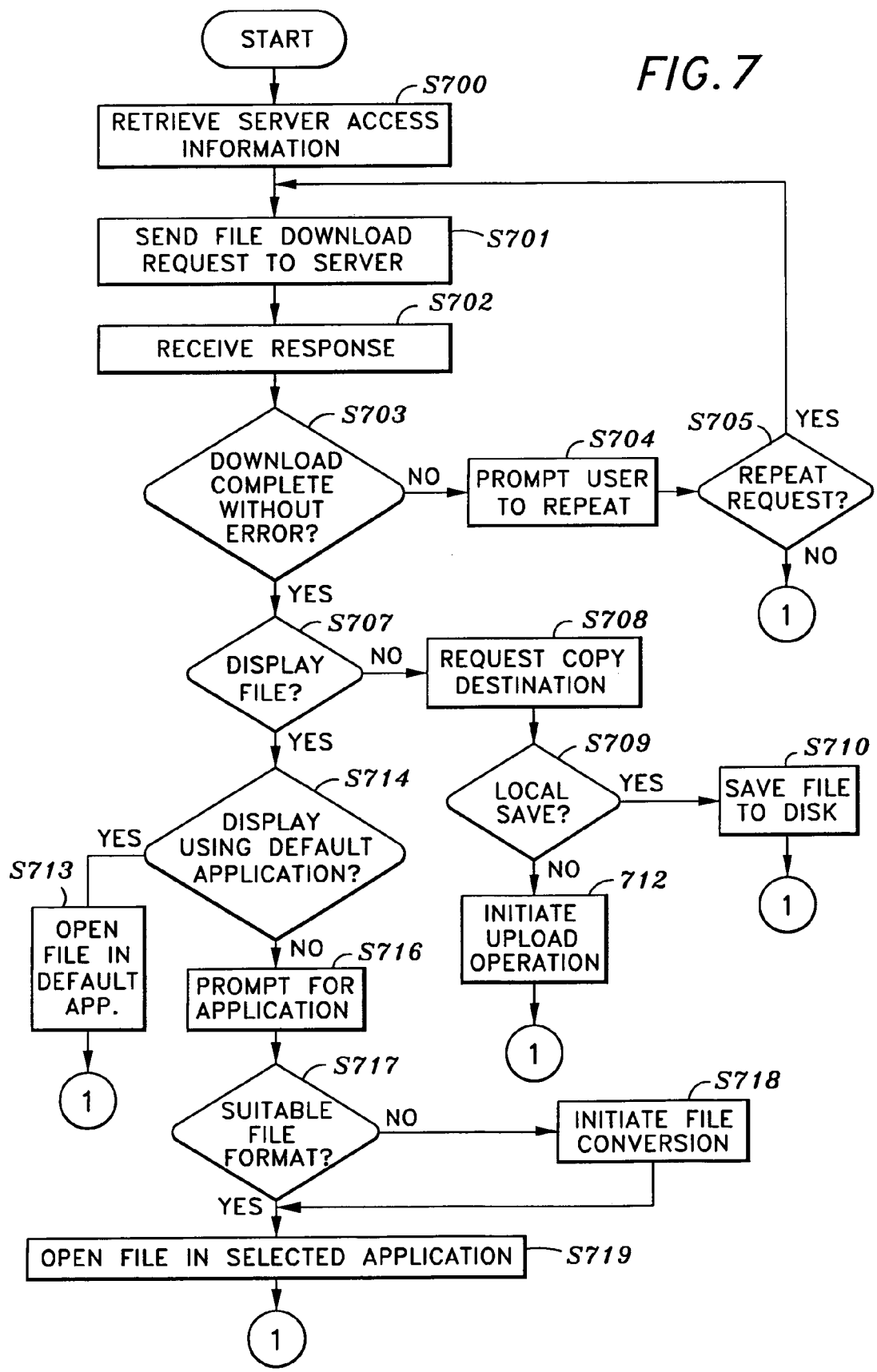
FIG. 7 illustrates a flow diagram of process steps to process a copy operation where the reproduction data may be viewed within an application or saved to another location according to the present invention.
Figure 8:
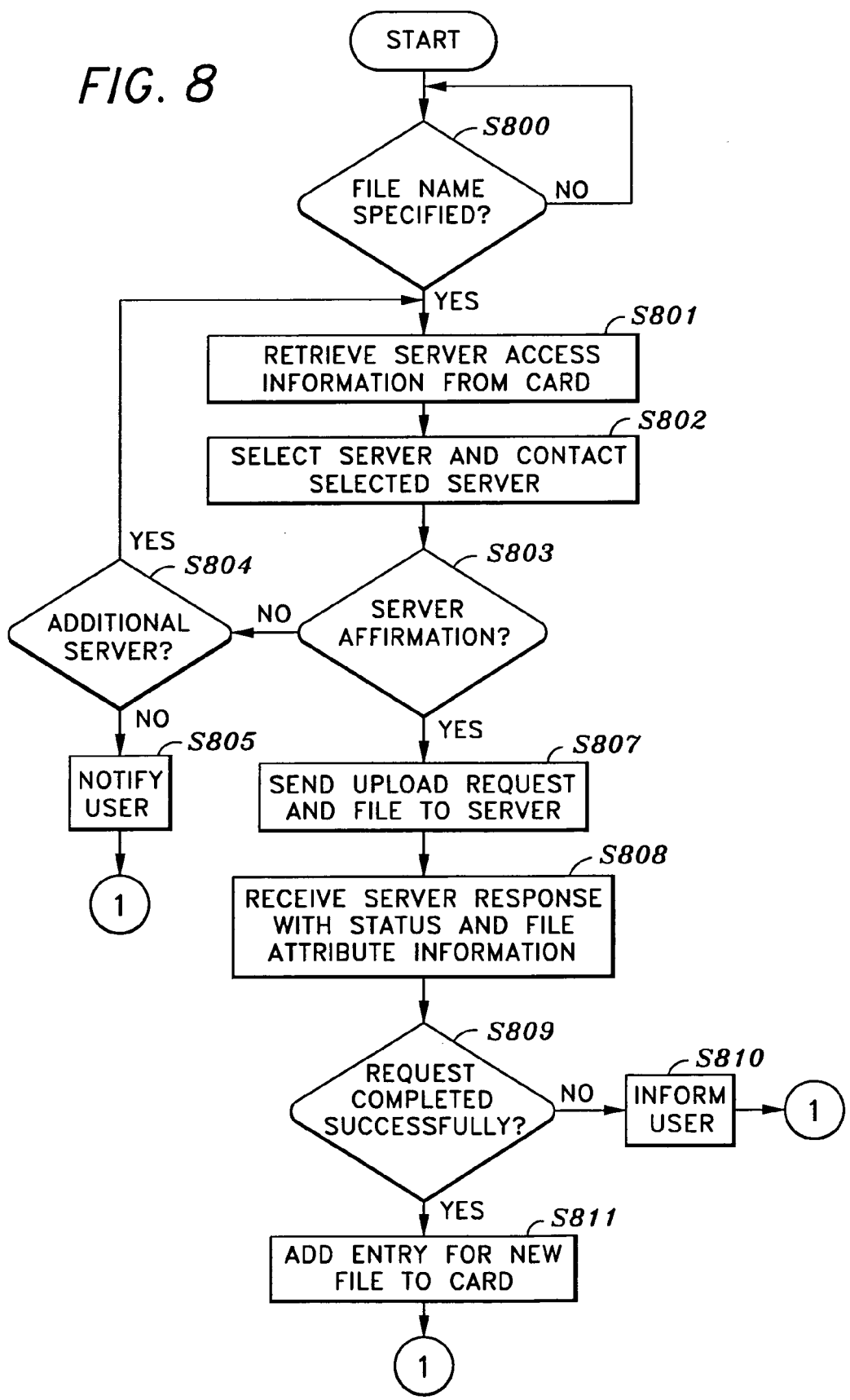
FIG. 8 illustrates a flow diagram of process steps to process a copy operation to edit a selected reproduction data according to the present invention.
Figure 9:
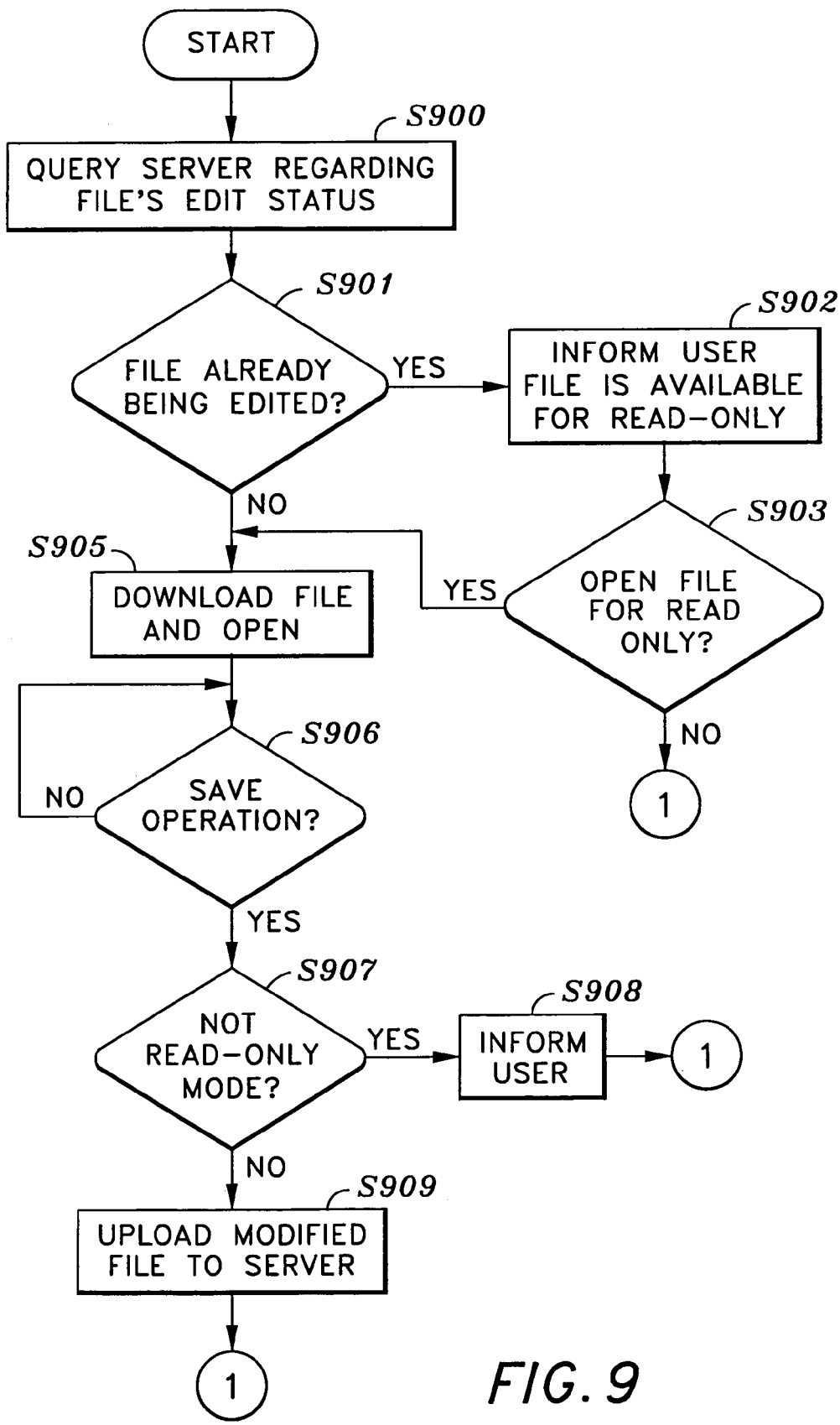
FIG. 9 illustrates a flow diagram of process steps to edit reproduction data according to the present invention.
Figure 10:
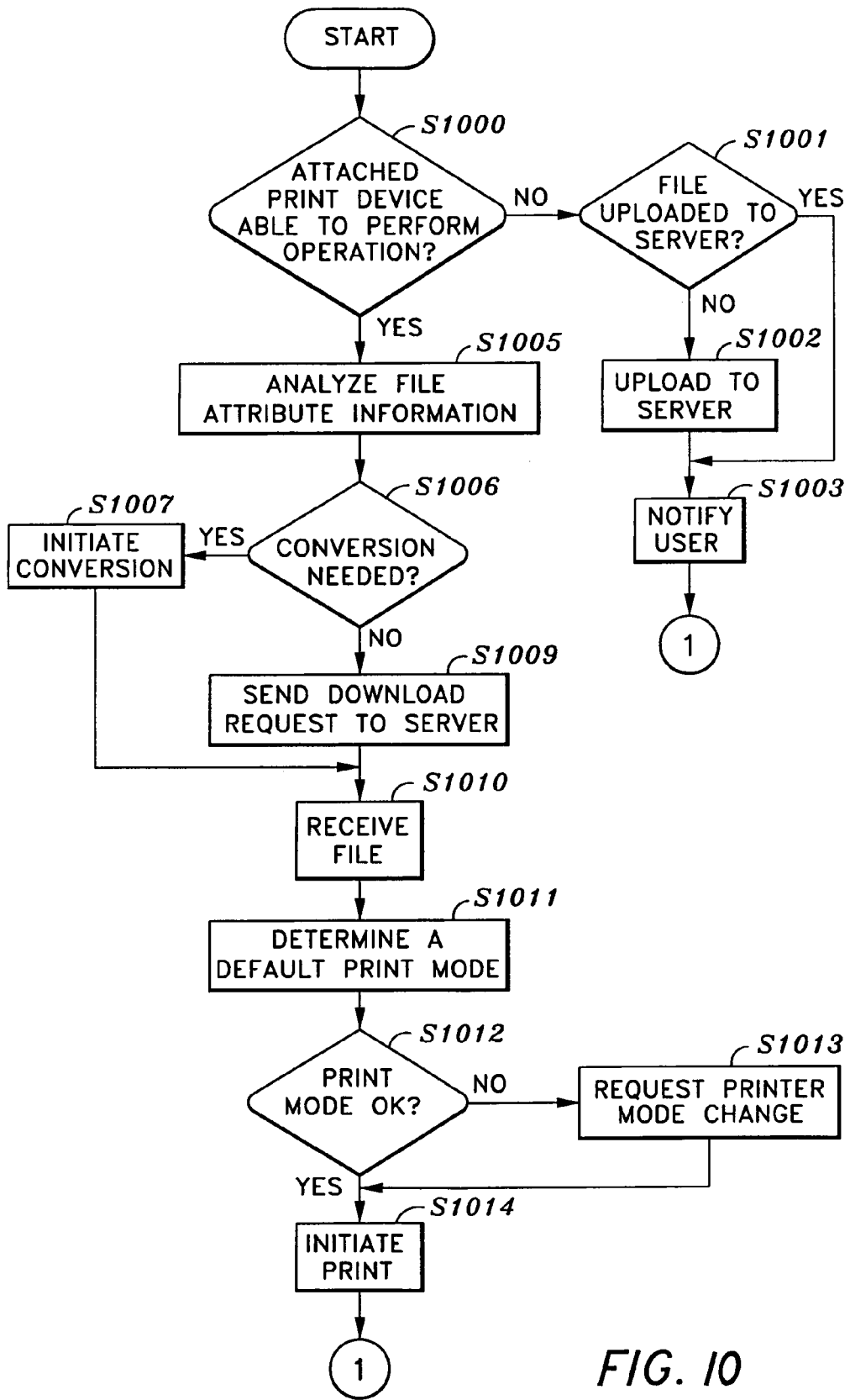
FIG. 10 illustrates a flow diagram of process steps to respond to a printer request according to the present invention.
Figure 11:
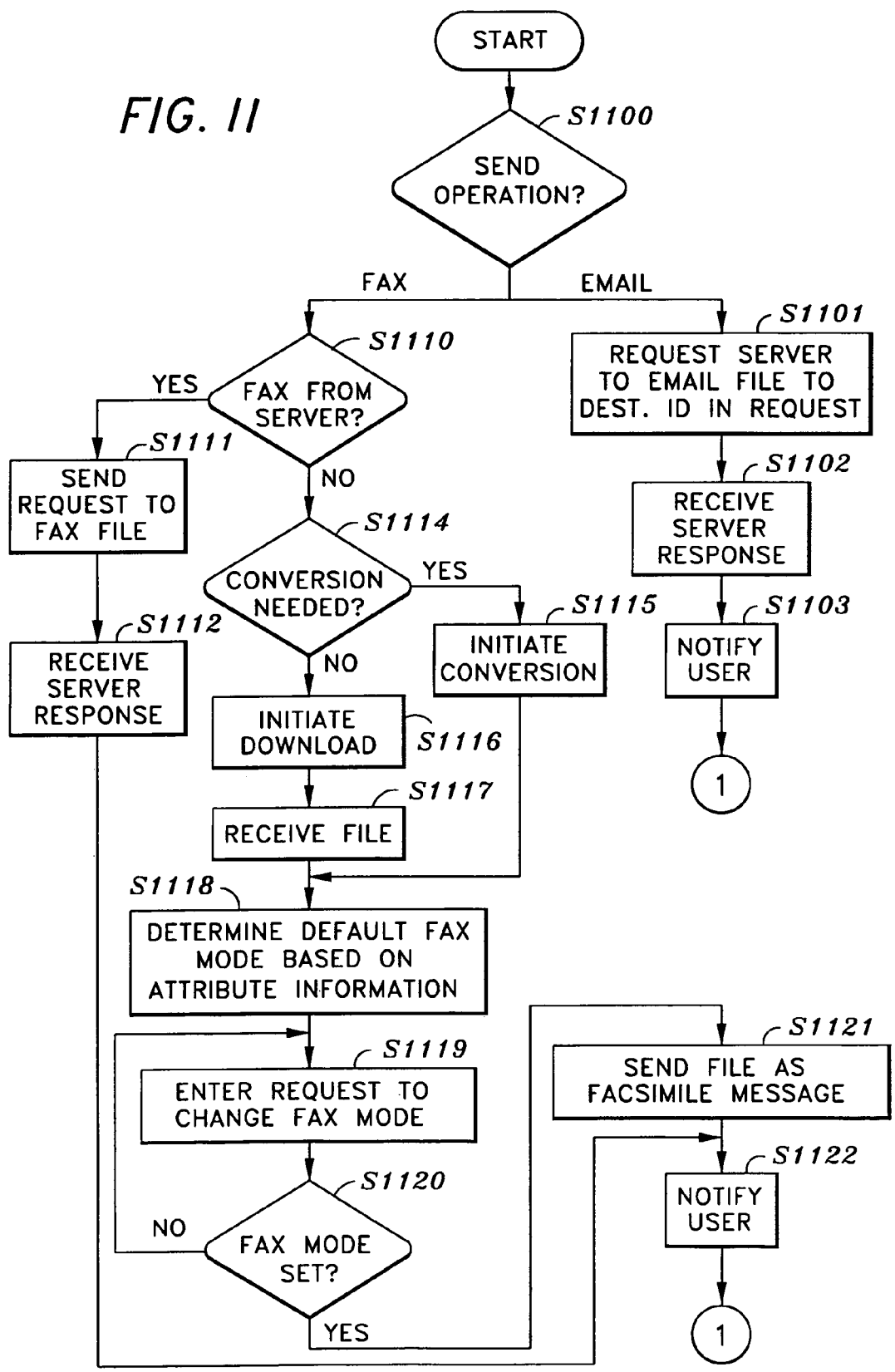
FIG. 11 illustrates a flow diagram of process steps to send reproduction data via fax and electronic mail, or email, according to the present invention.
Figure 12:
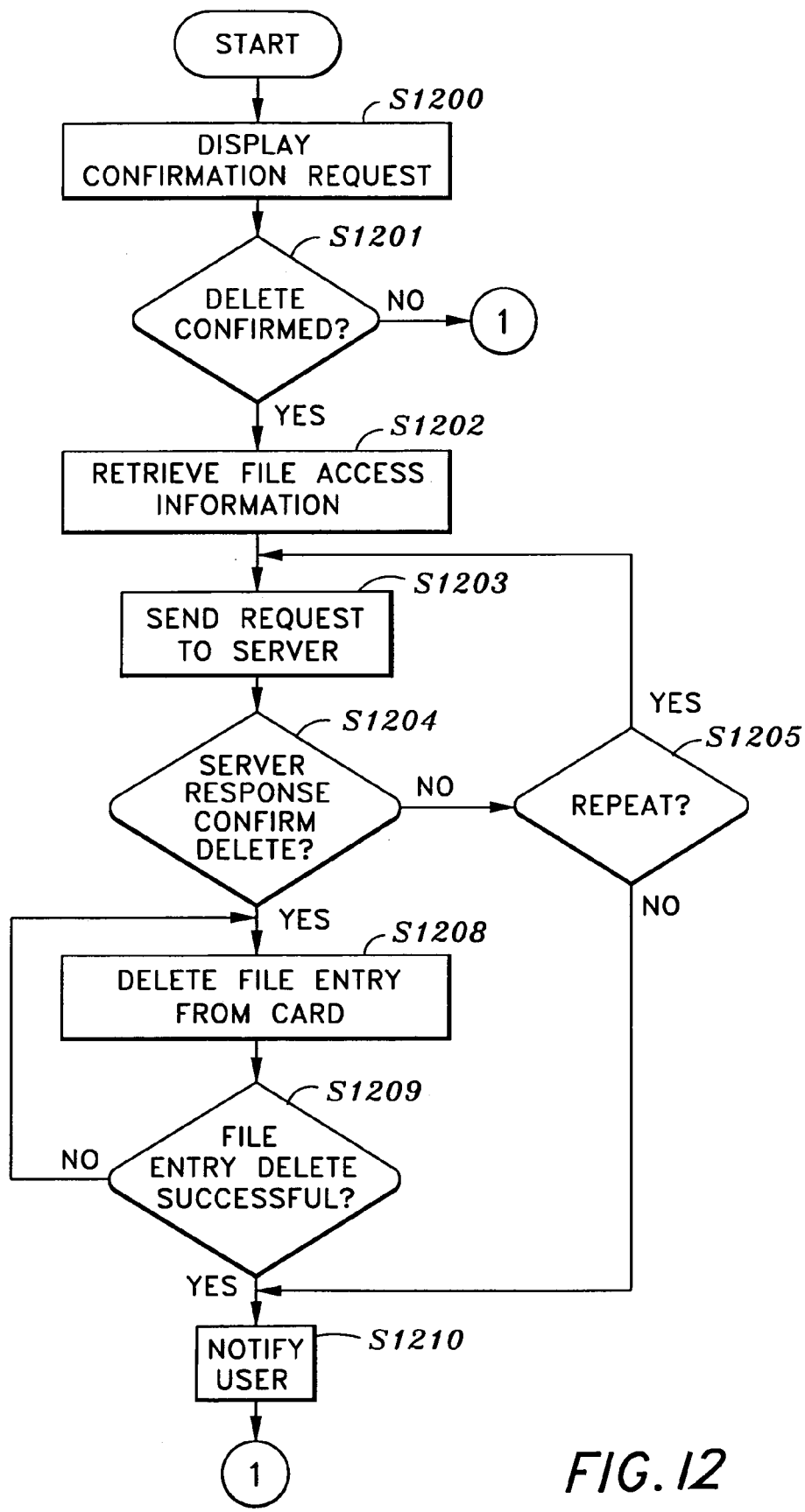
FIG. 12 illustrates a flow diagram of process steps to delete reproduction data according to the present invention.

FIGS. 7 through 12 provide examples of flow diagrams comprising process steps to process specific operations. FIGS. 7 and 9 provide examples of operation handling where the operation is a download, or copy, operation according to the present invention. A download operation may be used to view reproduction data, save reproduction data to another location and/or edit reproduction data. FIG. 8 provides an example of an add, or new, operation. FIGS. 10 through 12 provide examples of process steps for responding to print, send and delete operations, respectively.

Referring to FIG. 7, a flow diagram is provided for handling a copy operation wherein the reproduction data is converted in a case where it is to be opened in other than the default application (i.e., the application identified in the attribute information corresponding to the reproduction data) and the current format is not suitable for the selected application.

At step S700, attachment unit 19 retrieves server information (e.g., server 15's IP address) from portable memory device 21 and/or the memory of attachment unit 19. At step S701, a download request is sent to the identified server. At step S702, a response is received from the server 15. At step S703, a determination is made whether the request completed without error. That is, whether the reproduction data was received successfully. If not, processing continues at steps S704 and S705 to ask the user whether to repeat the download, and if the user wishes to repeat the download, continuing processing at step S701. Otherwise, processing returns to step S607, of FIG. 6, to refresh the GUI display and await another operation selection.

Once the reproduction data is downloaded successfully, processing continues at step S707 to determine whether the reproduction data is to be displayed or copied to another location.

If a copy operation was selected by the user, processing continues at step S708 to request the copy destination. If it is determined, at step S709, that the destination is local (e.g., the disk 6 of an attached personal computer), processing continues at step S710 to save the reproduction data to disk and processing continues at step S607 to update the GUI display (e.g., add the copy of the reproduction data to the display) and await another operation request. If it is determined, at step S709, that the save is not a local save, processing continues at step S712 to initiate an upload operation, and processing continues at step S607 to await another operation request.

If a copy operation is not the selected operation, processing continues at step S714 to determine whether to display the reproduction data using the default application. If so, processing continues at step S713 to display the reproduction data in the default application. If not, processing continues at step S716 to prompt the user for an application to display the reproduction data. At step S717, a determination is made whether the reproduction data's current format is suitable for the identified application. If not, processing continues at step S718 to initiate a conversion, and the reproduction data, in a suitable format, is opened for display in the selected application.

It may be desirable to edit downloaded reproduction data. FIG. 9 provides an example of a process flow for editing reproduction data according to the present invention.

At step S900, server 15 is queried to determine the status of the reproduction data (e.g., whether the reproduction data is already being edited by another user). If it is determined, at step S901, that the reproduction data is already being edited by another, processing continues at step S902 to inform the user of the status and ask the user whether the reproduction data is to be provided in read-only mode at step S903. If not, processing continues at step S607 to refresh the GUI and await an operation selection.

If the reproduction data is not being edited, or the user wishes to view the reproduction data in read-only mode, processing continues at step S905 to download the reproduction data from server 15 and display the reproduction data in the default application. Alternatively, the reproduction data may be displayed using an application selected by the user as described above with reference to FIG. 7.

The user may choose to save the modifications to server 15 using a copy or an add operation, for example. In such a case, the user may use a "save" or "save as" operation within the application that is displaying the reproduction data.

When a "save" or "save as" operation is selected within the application, attachment unit 19 may detect and intercept the application's call to the file system. Thus, at step S906, a determination is made whether a save operation is detected. If so, processing continues at step S907 to determine whether the reproduction data is accessible in read-only mode. If so, processing continues at step S908 to inform the user and processing continues at step S607. However, if the reproduction data was not opened in read-only mode, processing continues at step S909 to upload the modified reproduction data to the server, and processing continues at step S607.

As stated above, and illustrated in FIGS. 4A and 4B, new reproduction data may be specified using the add and/or scan operations. FIG. 8 provides an example of a process flow for specifying new reproduction data that may be used in either of the add or scan operations as well as others.

At step S800, a determination is made whether a filename has been specified that includes the reproduction data. If not, processing continues at step S800. A new filename may be specified by selecting a representation of a file (e.g., an icon) in a GUI such as Windows98, or by entering a filename in a prompt provided by attachment unit 19, for example.

Once a filename has been specified, processing continues at step S801 to retrieve server access information from portable memory device 21. As illustrated in FIG. 5, portable memory device 21 may contain access information for multiple servers. Where multiple servers are identified, a server may be selected by the user, or by criteria such as availability and/or location of the server, for example.

At step S802, a selected server is contacted to determine whether the server is available to service the request. If it is determined, at step S803, that the selected server is not available, processing continues at step S804 to determine whether there are additional servers. If not, at step S805, the user is notified and processing continues at step S607. Alternatively, the user may be prompted for another server.

If the selected server is determined to be available, at step S803, processing continues at step S807 to send an upload request along with the reproduction data to the selected server. At step S808, the server returns attribute information (e.g., file access information such as path or storage location information) and/or a status of the request. If a successful completion is detected at step S809, processing continues at step S811 to add an entry to memory of portable memory device 21 corresponding to the reproduction data uploaded to server 15 and processing continues at step S607.

If an error status is detected, processing continues at step S810 to inform the user and processing continues at step S607. Alternatively, the user may be given the option of repeating the request with the same or a different server. In a case where the same server is desired, processing continues at s807 to re-send the upload request to the selected server. In a case where a different server is desired, processing continues at step S802 with the server that returned the error status excluded from the available servers.

Another example of a reproduction operation is a printing operation. According to the present invention, reproduction data may be printed using a printer instance of reproduction device 18 coupled to attachment unit 19 or, in a case that there is no available printer, uploaded to server 15. FIG. 10 provides an example of a process flow to respond to a printer request according to the present invention.

At step S1000, a determination is made whether an attached print device is available to perform the print operation. Availability may be determined based on the user's desire and/or whether an installed printer is able to print the reproduction data. If not, processing continues at step S1001 to upload the reproduction data to server 15, if it has not already been uploaded. Thus, at step S1001, a determination is made whether the reproduction data has already been uploaded to server 15. If not, processing continues at step S1002 to upload the reproduction data to server 15. In any event, processing continues at step S1003 to notify the user and processing continues at step S607.

If it is determined, at step S1000, that there is an available print device capable of performing the print operation, processing continues at step S1005 to analyze attribute information (e.g., file attribute information) to determine whether the current format is suitable. If it is determined, at step S1006, that the current format is unsuitable, processing continues at step S1007 to initiate a conversion operation (e.g., see discussion with regard to FIG. 13 below) and processing continues at step S1010 to receive the reproduction data. However, if it is determined at step S1006 that the current format is suitable for use with the print device, processing continues at step S1009 to send a request to server 15 for the reproduction data which is received from the server at step S1010.

At step S1011, a default print mode is determined for the print device. At step S1012, a determination is made whether the print mode is suitable. If not, processing continues at step S10013 to request a print mode change of the print device. Processing continues at step S1014 to initiate printing of the selected reproduction data using the print device.

Reproduction data may be sent via facsimile and/or email using the invention. As stated above, a facsimile or email transmission may be performed by a facsimile reproduction device 18 coupled to attachment unit 19, or attachment unit 19 may send a request to server 15 to initiate the facsimile or email transmission. In the latter case, transmission of the reproduction data to attachment unit 19 may be avoided. FIG. 11 provides a process example for sending reproduction data via fax and email according to the invention.

At step S1100, a determination is made as to the type of send operation. If it is determined that the transmission is to be by facsimile, processing continues at step S1110 to make a determination whether to send the facsimile transmission from the server. If so, processing continues at step S1111 to request server 15 to initiate facsimile transmission of the selected reproduction data. At step S1112, a response is received from server 15 and processing continues at step S1122 to notify the user of the completion status of the request and processing continues at step S607 to await another operation selection.

If it is determined, at step S1110, that server 15 is not to send the facsimile transmission, processing continues at step S1114 to determine whether the current format is suitable for transmitting the selected reproduction data using the facsimile machine attached to attachment unit 19. Conventional facsimile machines, for example, may transmit a bitmap image format. In such a case, the reproduction data is converted to bitmap image format, if it is in another format.

If it is determined that conversion is necessary, processing continues at step S1115 to initiate conversion of the selected reproduction data. An example of a flow diagram for converting and downloading the converted reproduction data is discussed in more detail below with reference to FIG. 13. If it is determined, at step S1114, that conversion is not needed, processing continues at steps S1116 and S1117 to request and receive the reproduction data from server 15.

At step S1118, a default facsimile mode is determined based on the selected reproduction data's attribute information. For example, a resolution may be determined based on the reproduction data (e.g., a higher resolution may be used where the reproduction data is an image versus text). At step S1119, the facsimile machine is requested to set a transmission or facsimile mode as determined in step S1118. Processing continues at step S1120 to determine whether the "set mode" request was successfully performed. If not, processing continues at step S1119 to repeat the request.

If it is determined, at step S1120, that the "set mode" request was successful, processing continues at step S1121 to initiate a facsimile transmission of the selected reproduction data by the facsimile machine. Processing continues at step S1122 to notify the user of the completion status of the request and processing continues at step S607 to await another operation selection.

If it is determined, at step S1100, that an email operation was selected, processing continues at step S1101 to request server 15 to email the selected reproduction data to the destination identified in the request. At steps S1102 and 1103, a response is received from server 15 indicating the completion status of the request, and the user is notified. Processing continues at step S607 to await another operation selection.

In the process flow example of FIG. 11, an email message (or messages) is sent by server 15. Alternatively, attachment unit 19 may send email messages containing the selected reproduction data where attachment unit 19 includes electronic mail messaging capability (e.g., an electronic mail application). In such a case, a request is made to server 15 to retrieve the reproduction data in its current or a suitable format. The received reproduction data is then sent by attachment unit 19 and the user is notified of the completion status of the email request.

Reproduction data stored on server 15 with a corresponding entry in portable memory device 21 may be deleted using a delete operation. When a delete operation selection is confirmed by the user, the attribute information is consulted to determine the server storage location of the reproduction data. A request is generated to delete the reproduction data from the indicated server, and the corresponding entry in portable memory device 21 is deleted. FIG. 12 provides an example process flow according to the present invention.

At step S1200, a confirmation request is presented to the user. At step S1201, a determination is made whether the user response confirms the request to delete the selected reproduction data. If the user does not confirm the selection, processing continues at step S607 to refresh the GUI and await another operation selection.

If confirmation is received from the user, processing continues at step S1202 to retrieve attribute information (e.g., from portable memory device 21 or RAM 32 of attachment unit 19). More particularly, server address portion of the attribute information is used to send the delete request to server 15 at step S1203. When a response is received from server 15, processing continues at step S1204 to determine whether the delete operation completed successfully. If not, processing continues at step S1205 to determine whether to repeat the request. If so, processing continues at step S1203 to re-send the delete request. If not, processing continues at step S1210 to notify the user that the delete operation was not performed successfully and processing continues at step S607.

If it is determined, at step S1204, that server 15 completed the delete operation successfully, processing continues at step S1208 to delete the entry from portable memory device 21 corresponding to the reproduction data deleted by server 15. At step S1209, a determination is made whether the entry was successfully deleted from portable memory card 21. If so, processing continues at step S1210 to notify the user of the successful completion of the delete operation selected and processing continues at step S607. If, however, the entry was not successfully deleted from portable memory device 21, processing continues at step S1208 to again attempt to delete the entry.

In examples of process flows described above, a determination is made whether the current format of the reproduction data (e.g., a selected file) is suitable for the operation and/or the reproduction device 18 that is to reproduce the data. If it is determined that the current format is unsuitable, attachment unit 19 determines whether to request server 15 to convert the data or to perform the conversion itself. For example, attachment unit 19 may include a software program (or programs) executable on attachment unit 19 that is capable of transforming the reproduction data from its current format to the desired format (i.e., a suitable format for reproduction device 18 and the operation selected). If attachment unit 19 chooses to request server 15 to perform the conversion, attachment unit 19 sends a request to server 15. Server 15 may perform the conversion or request another computer (e.g., another server) to perform the conversion).

Reproduction data may be converted using the conversion capabilities of various existing software applications (e.g., word processing, spreadsheet, image processing, etc.) or using customized software that is capable of reading the reproduction data in its current format and converting the reproduction data to a format that is suitable for use with reproduction device 18. The conversion process may use more than one conversion step where, for example, it is not possible to convert the reproduction data into a suitable format using the current format. In such a case, one or more intermediate formats may be generated in order to arrive at a suitable format for the reproduction data.

Figure 13:
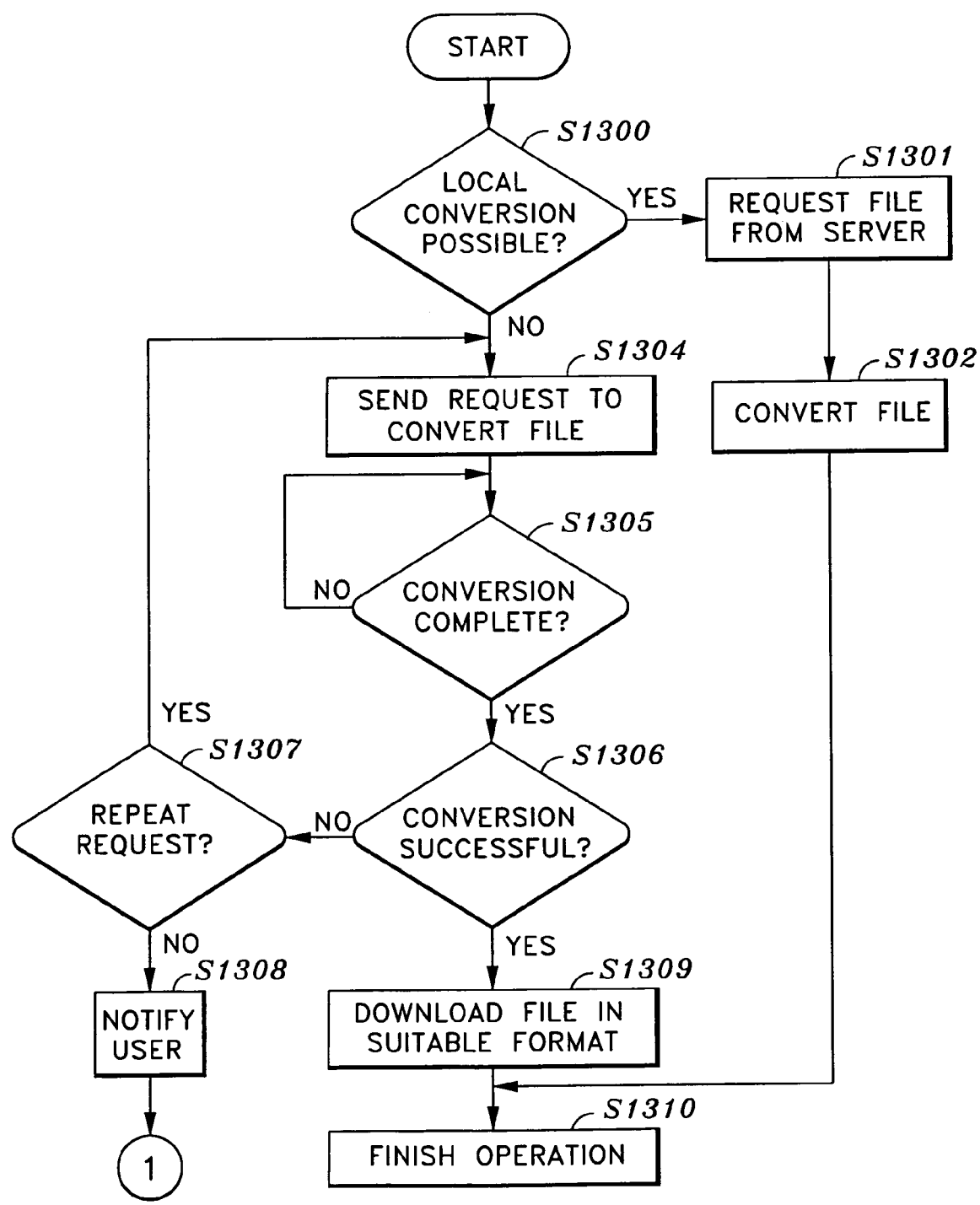
FIG. 13 illustrates a flow diagram of process steps to convert reproduction data from a current format to a suitable format according to the present invention.

FIG. 13 provides an example of a process flow for converting reproduction data from a current format to a suitable format according to the present invention. At step S1300, a determination is made whether attachment unit 19 is to perform the conversion. If so, processing continues at step S1301 to request the reproduction data from server 15. At step S1302, attachment unit 19 converts the reproduction data and processing continues to process the selected operation (e.g., send the reproduction data via email or facsimile transmission, print, display, etc.).

If it is determined, at step S1300, that server 15 is to convert the reproduction data, processing continues at step S1304 to send a conversion request to server 15. At step S1305, a determination is made whether the conversion is completed based on a response received from server 15. If so, processing continues at step S1306 to determine whether the conversion operation was successfully performed by server 15 by, for example, examining a completion status received in the response.

If the conversion was not completed successfully, processing continues at step S1307 to determine whether to repeat the request. If so, processing continues at step S1304 to again request server 15 to convert the reproduction data. If it is determined not to repeat the request, processing continues at step S1308 to notify the user and processing returns to step S607.

If it is determined, at step S1306, that the conversion operation was successfully completed, processing continues at step S1309 to download the reproduction data that has been converted into a suitable format.

Attachment unit 19 transmits requests to server 15 to, for example, store, retrieve, and send reproduction data. A request that is transmitted by attachment unit 19 may include a user name and/or password that may be used by server 15 to verify the user. In such a case, user verification may be performed by attachment unit 19 as well. Where it is performed by both server 15 and attachment unit 19, different server 15 may perform a different verification. For example, server 15 may verify attachment unit 19 in addition to or as a replacement for verification of the user.

Further, reproduction data may be encrypted for storage on server 15. In such a case, reproduction data received by server 15 from attachment unit 19, for example, is first encrypted before it is stored by server 15. Any suitable encryption scheme may be used, and any encryption keys used by an encryption algorithm used may be supplied by the user via attachment unit 19, by attachment unit 19 and/or server 15.

Encrypted reproduction data stored by server 15 is preferably decrypted prior to transmission or other use. For example, where the data is to be edited, the reproduction data may first be encrypted before it is forwarded to attachment unit 19. However, it may be desirable to forward the encrypted reproduction data to attachment unit 19 for decryption. Attachment unit 19 may specify whether or not server 15 is to decrypted encrypted reproduction data in a request forwarded to server 15.

Figures 14, 14A:
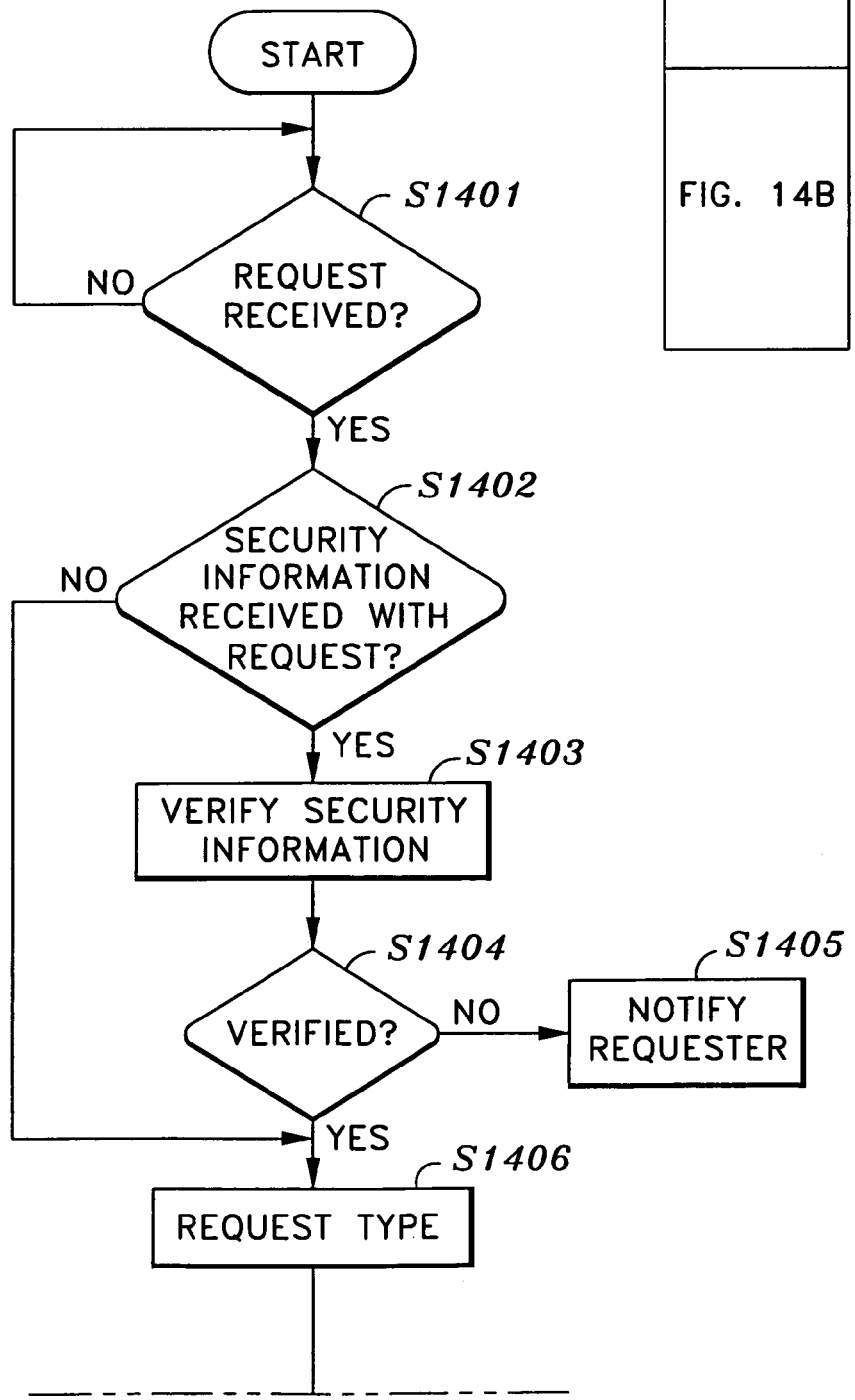
FIG. 14 illustrates a flow diagram of process steps of a server to respond to requests according to the present invention.
Figure 14B:
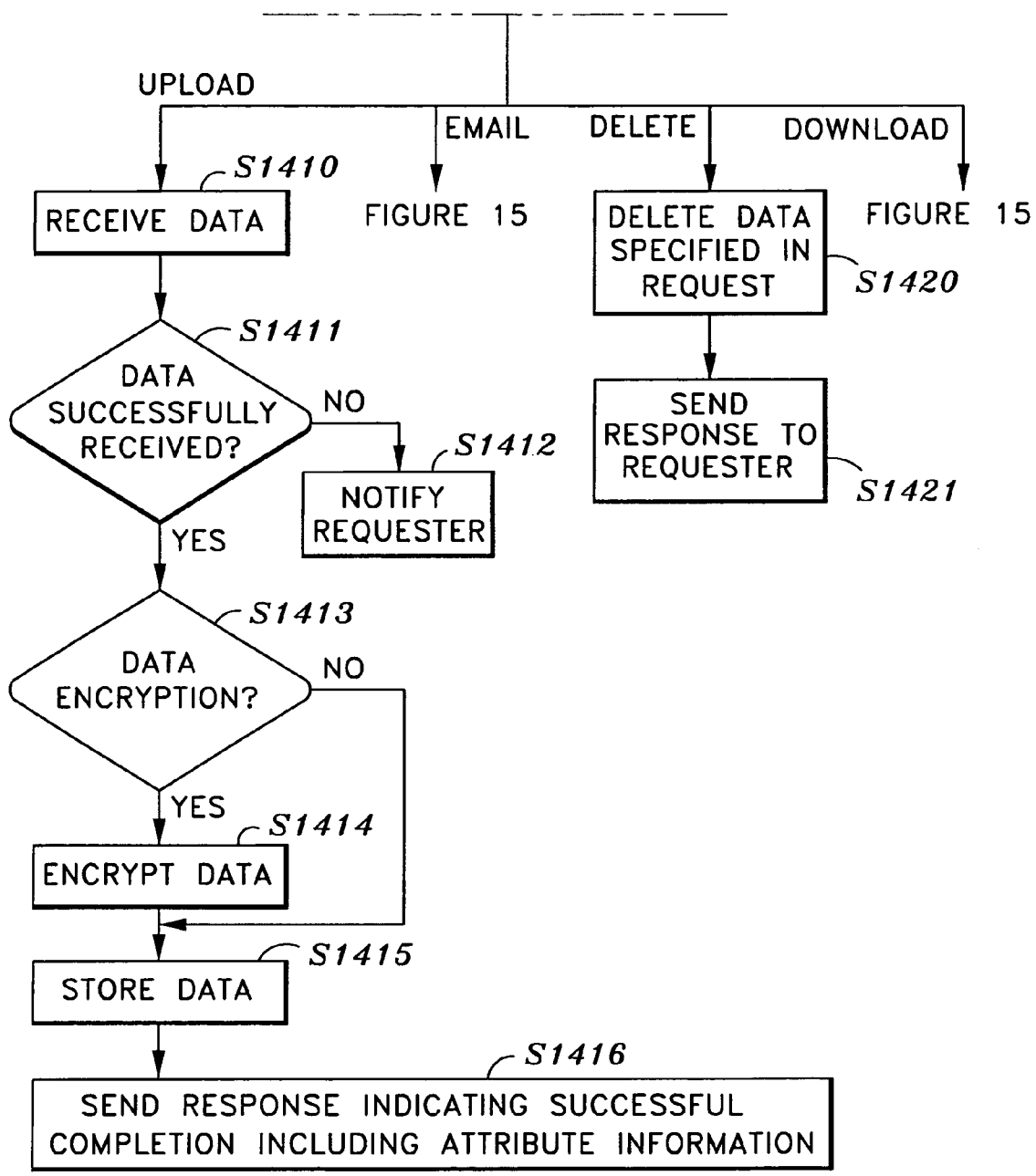

FIG. 14 illustrates a flow diagram of process steps of a server to respond to requests according to the present invention. At step S1401, a determination is made as to whether a request is received by server 15. If so, processing continues at S1402 to determine whether security information is provided with which a verification can be performed. If so, processing continues at step S1403 to analyze the security information to determine whether the requester (e.g., attachment unit 19 and/or a user thereof) is an authorized requester. If it is determined at step S1404 that the information is not verifiable, processing continues at step S1405 to notify the request.

However, if verification is successful, processing continues at step S1406 to determine the type of request received by server 15.

If an upload request is received, processing continues at step S1410 to receive the reproduction data. At step S1411, a determination is made whether the data was received successfully. If not, processing continues at step S1412 to notify the requester (e.g., attachment unit 19). If the data was received successfully, processing continues at step S1413 to determine whether or not to encrypt the reproduction data before it is stored. The determination may be based, for example, on the information supplied in the request (e.g., based on data type or a explicit request).

If it is determined, at step S1413, that the data is to be encrypted, processing continues at step S1414 to encrypt the data. In either case, at step S1415, the reproduction data is stored by server 15. At step S1416, server 15 sends a response to the requester indicating successful completion of the request and including attribute information (e.g., access information such as storage location of the reproduction data).

Server 15 may determine, at step S1406, that reproduction data stored by server 15 is to be deleted based on information contained in a received request. In such a case, processing continues at step S1420 to delete the reproduction data specified in the request. At step 1421, a response is sent to the requester indicating the completion status of the request.

Server 15 may receive a request to send stored reproduction data. For example, reproduction data may be forwarded to attachment unit 19 or sent to another destination via facsimile or electronic mail. If it is determined at step S1406, that a received request is for reproduction data, processing continues at step S1500 of FIG. 15.

Figure 15:
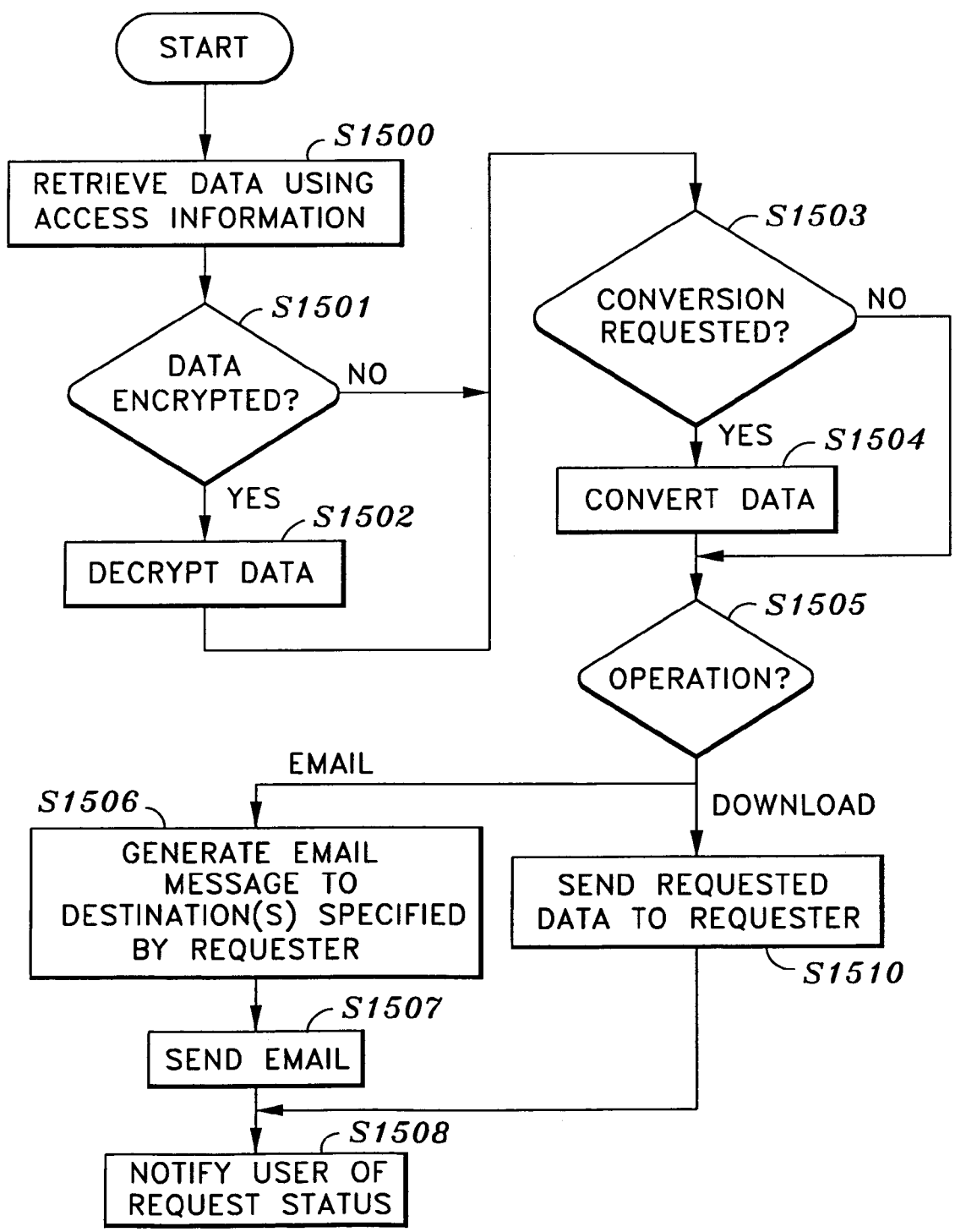
FIG. 15 illustrates a flow diagram of process steps of a server to respond to an access (e.g., email or download) request according to the present invention.

FIG. 15 illustrates a flow diagram of process steps of a server to respond to an access (e.g., email or download) request according to the present invention.

At step S1500, server 15 retrieves the requested reproduction data using access information contained in the request. At step 1501, a determination is made whether the stored reproduction data is encrypted. If so, processing continues at step S1502 to decrypt the data. In either case, processing continues at step S1503 to determine, using information in the request, whether the reproduction data is to be converted.

If it is determined, at step S1503, that conversion is needed, processing continues at step S1504 to convert the reproduction data. Server 15 may perform the conversion or request another computing system to convert the data, e.g., in a case that server 15 is unable to perform the requested conversion.

Processing continues at step S1505 to determine the type of operation requested. If it is determined that the request is to send the reproduction data via electronic mail, processing continues at step S1506 to generate an electronic mail message to the destination (or destination(s)) indicated in the request. At step S1507, server 15 sends the electronic mail message(s) and sends a response, at step S1508, notifying the requester of the completion status of the request.

If it is determined that the request is a download request, server 15 forwards the reproduction data to the requester.

For example, one instance of attachment unit 19 may request reproduction data that was previously stored using another instance of attachment unit 19. In addition, multiple requests may be made for the reproduction data using the same or another instance of attachment unit 19. Thus, it is possible to retrieve reproduction data for reproduction by multiple instances of reproduction device 18 using one or more instances of attachment unit 19.

In addition to transmitting reproduction data via electronic mail, server 15 may be requested to forward reproduction data via facsimile transmission. In such a case, server 15 may initiate a facsimile transmission via a facsimile machine connected to server 15, forward the request to another computer system (e.g., an instance of server 15) or request an attachment unit 19 coupled to a facsimile machine to carry out the request.

Where server 15 is to perform the facsimile request via a facsimile machine coupled to server 15, steps S1118 through S1121 may be used as discussed above. The request received by server 15 may include the attribute information needed to determine the default fax mode in step S118. At step S1122, server 15 forwards a response to the facsimile request including a completion status of the request.

Figure 22:
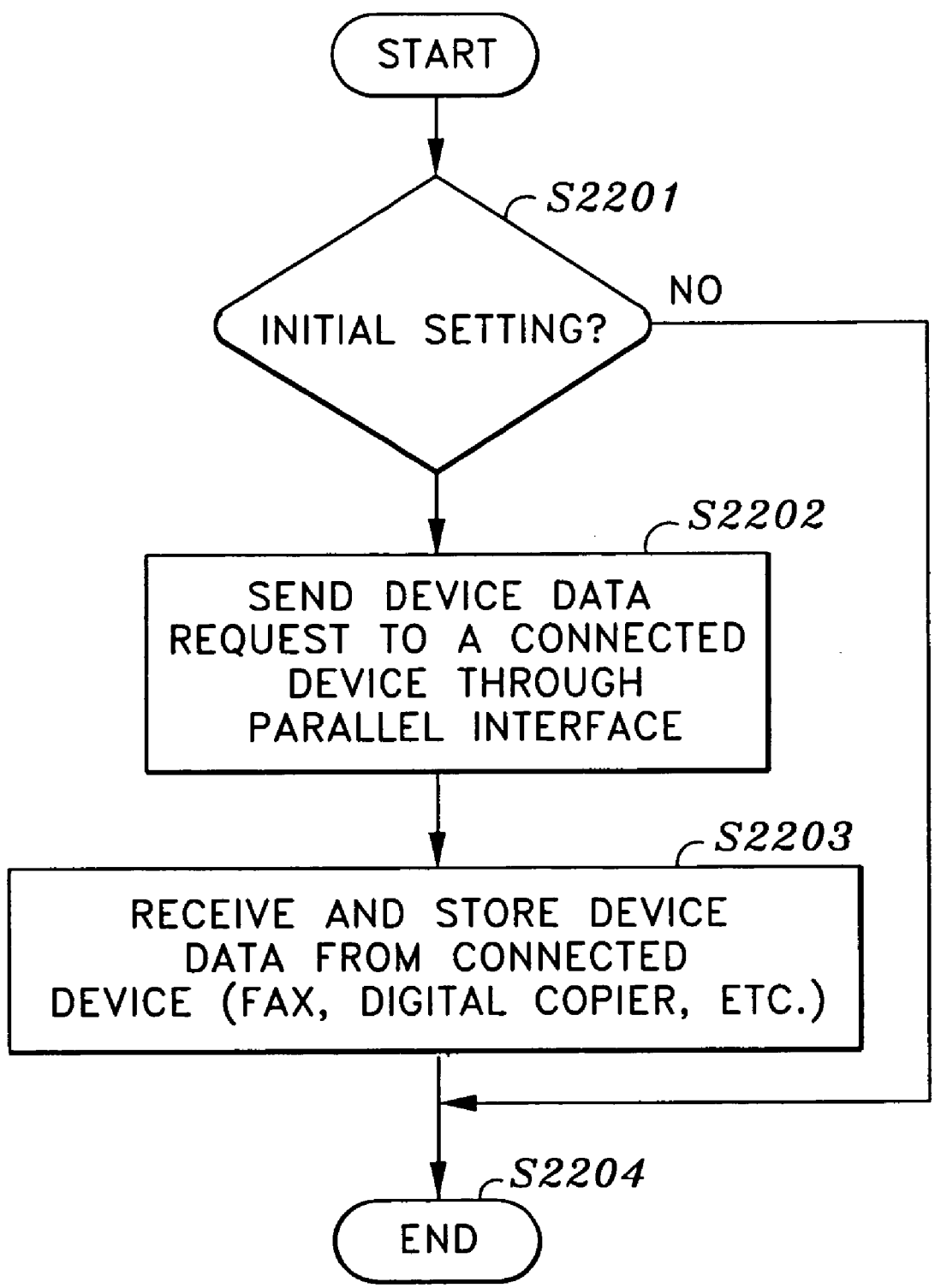
FIG. 22 illustrates a flow diagram of processing steps for initializing an attachment unit according to the present invention.

Attachment unit 19 is initialized one or more times such that attachment unit 19 is informed of an attached reproduction device 19 and its functionality. In addition, attachment unit 19 may receive program code for execution from server 15 or another computer system or server accessible via network connection 17. FIG. 22 illustrates a flow diagram of processing steps for initializing an attachment unit 19 according to the present invention.

At step S2201, a determination is made whether the current settings (e.g., program code and/or information associated with an attached reproduction device 18) of attachment unit 19 are to be initialized/updated. If not, initialization processing ends at step S2204. If so, processing continues at step S2202 to send a device data request to the connected reproduction device 18 through parallel interface 39. At step S2203, the information received from the connected reproduction device 18 is stored by attachment unit 19 (e.g., in RAM 32). Initialization processing to receive information from reproduction device 18 ends at step S2204.

Attachment unit 19 may use the information received from reproduction device 19 to determine what if any program code is needed to interact with the attached reproduction device 19 such as a driver as well as the program code needed to display a user interface with selections identifying functionality of the reproduction device 19 and process input received from a user of the user interface. Such program code, if not already resident on attachment unit 19, may be downloaded via World Wide Web 10. For example, attachment unit 19 may request the program code from server 15 via World Wide Web 10.

From the above discussion, the present invention contemplates a user interface that incorporates functionality that is available from sources other than a reproduction device 18 coupled to attachment unit 19. For example, selection 406E provides the ability to send a facsimile transmission via an attached reproduction device 18 or via server 15. Thus, as in FIG. 4A, it is possible to send a facsimile even where the reproduction device 18, a PC, and/or attachment unit 19 are unable to send the facsimile. In such a case, the facsimile request can be forwarded to server 15. In addition, as described above and illustrated in FIG. 13, attachment unit 19 may include functionality to perform format conversion as well as other functionality.

As more functionality is selectable in the user interface of the present invention and/or more functionality is included in attachment unit 19, the cost of attachment unit 19 increases due, for example, to the need for increased memory. In addition, as is discussed below, the software programs executable by attachment unit 19 may be downloaded via a network. The transmission time needed to download via the network increases with increases in the size of the program code. Further, there is more likelihood that as more capability is added to attachment unit 19, the program code needed to support such capability (e.g., conversion) may need to be updated (e.g., to convert a new format or a new version of a format) thereby adding to the burden of downloading program code to attachment unit 19.

It may also be advantageous to limit the options available in the user interface to accommodate a less sophisticated user. A user may find a more complicated user interface with a number of options more difficult to comprehend causing the user to avoid using any of the capabilities of the present invention.

Therefore, one aspect of the present invention contemplates a simpler user interface and/or attachment unit 19. In such a case, a given set of functions associated with an attached reproduction device 18 are provided by the user interface. Further, attachment unit 19 responds to a user request entered via the simplified user interface typically by forwarding a request to server 15 for processing instead of processing the request. Of course, it is possible with the present invention, to combine the simplified user interface with a more sophisticated attachment unit 19 that is capable of processing user requests without the aid of server 15.

FIGS. 16A through 16D illustrate examples of user interfaces for use with specific reproduction devices 18 according to the present invention.

Figure 16A:
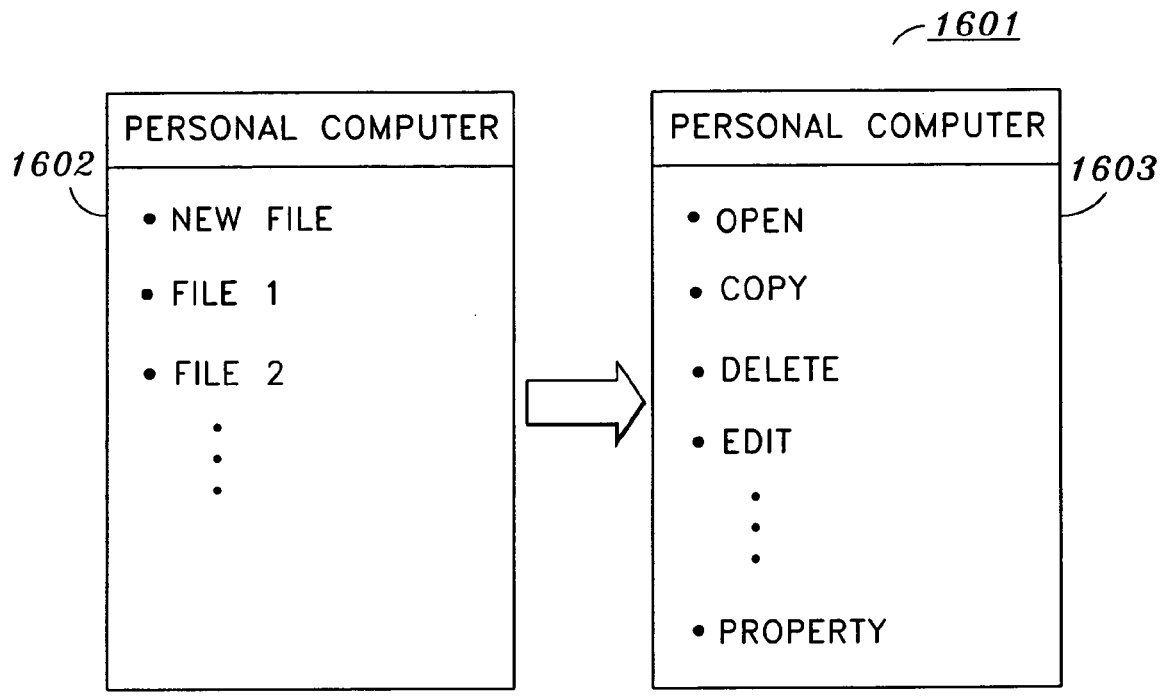
FIG. 16A illustrates an example of a user interface for use with a personal computer reproduction device according to the present invention.

Referring to FIG. 16A, a user interface is provided for use with a personal computer, or PC. Display 1602, of user interface 1601, may be a panel or menu display and provides for a selection of either a new file, or one of the listing of files read from portable memory device 21. Once a selection is made in display 1602, display 1603 is provided which contains available operation, or action, selections.

By selecting "New file", a user is able to upload a file to server 15 without actually knowing or specifying that the file is to be uploaded to server 15. For example, when a user selects "New file" and identifies the file, such as by dragging a file icon from one location of the PC desktop over an icon of portable memory device 21, an upload operation is initiated to store the reproduction data contained in the file to server 15. The user need not be aware of the storage location of the reproduction data. In fact, the user may believe that the file is being stored in portable memory device 21.

A user may select one of the files (e.g., "File 1" or File 2") in the file listing of display 1602, and an operation from display 1603. Thus, it is possible, using displays 1602 and 1603, to select reproduction data and open, copy, delete, or edit a file, or view one or more properties associated with the selected file. As with a new file, the user need not be aware of the actual storage location of the selected file (e.g., server 15).

Figure 16B:
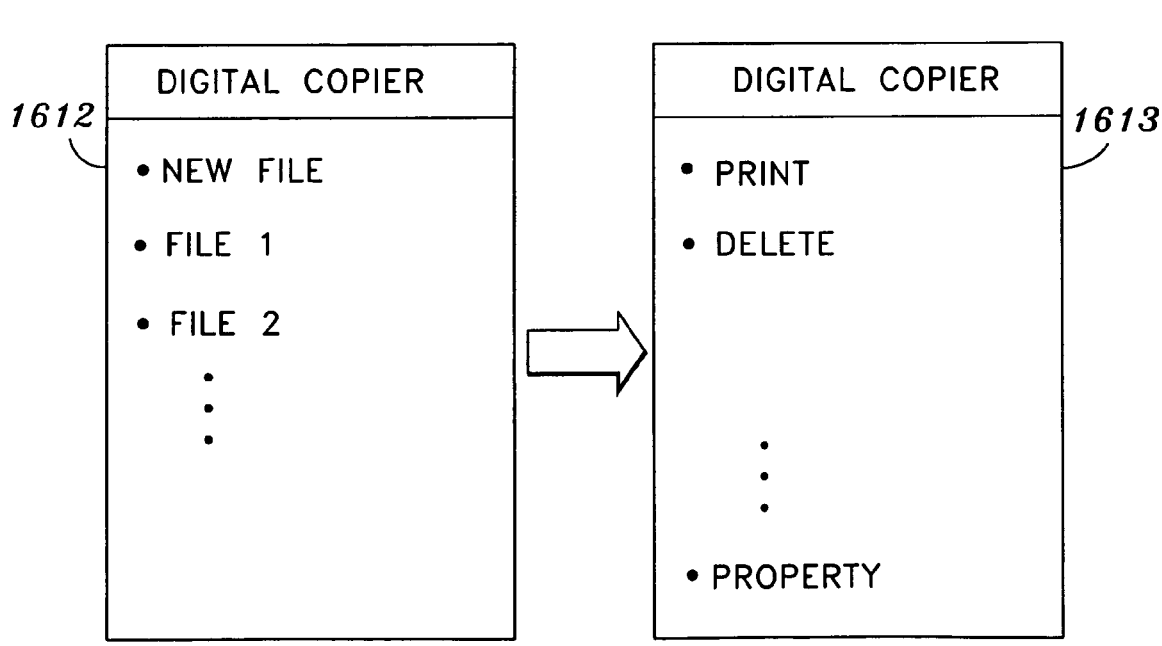
FIG. 16B illustrates an example of a user interface for use with a digital copier reproduction device according to the present invention.

Similarly, in user interface 1611 of FIG. 16B, a user is able to make either a "New file" selection or select from among existing files. The user may print or delete a selected file by making the appropriate selection in display 1613.

Figure 16C:
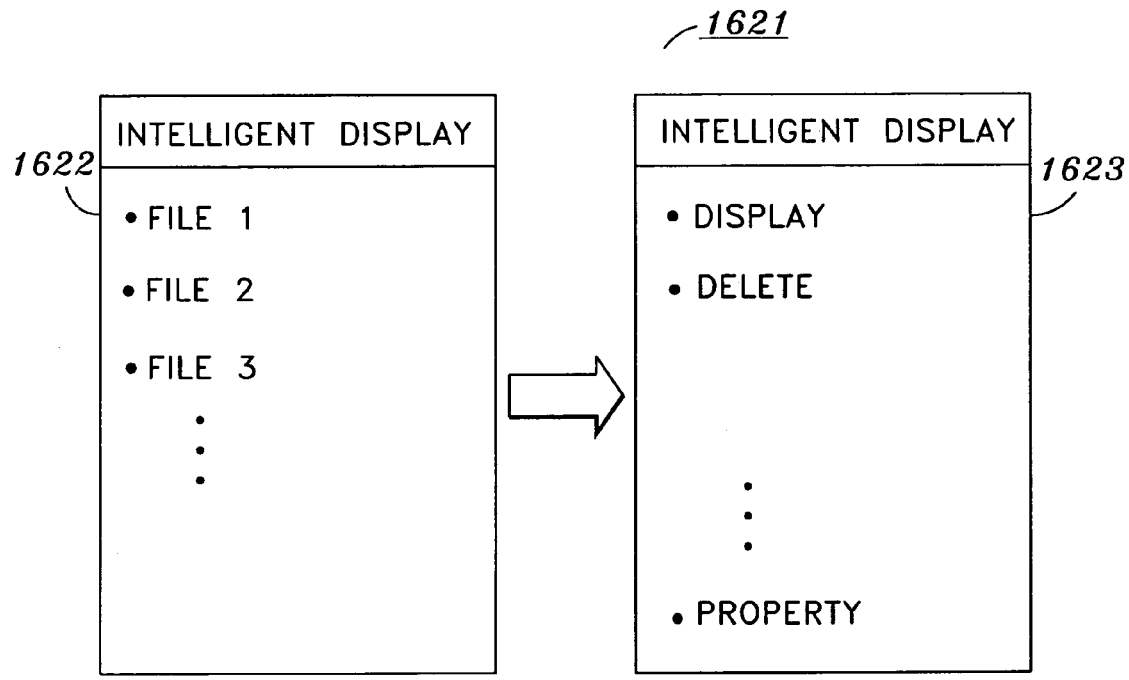
FIG. 16C illustrates an example of a user interface for use with an intelligent display according to the present invention.

Referring to FIG. 16C, user interface 1621 allows a user to display or delete a selected file by first selected the file in display 1622 and choosing the appropriate selection in display 1623.

Figure 16D:
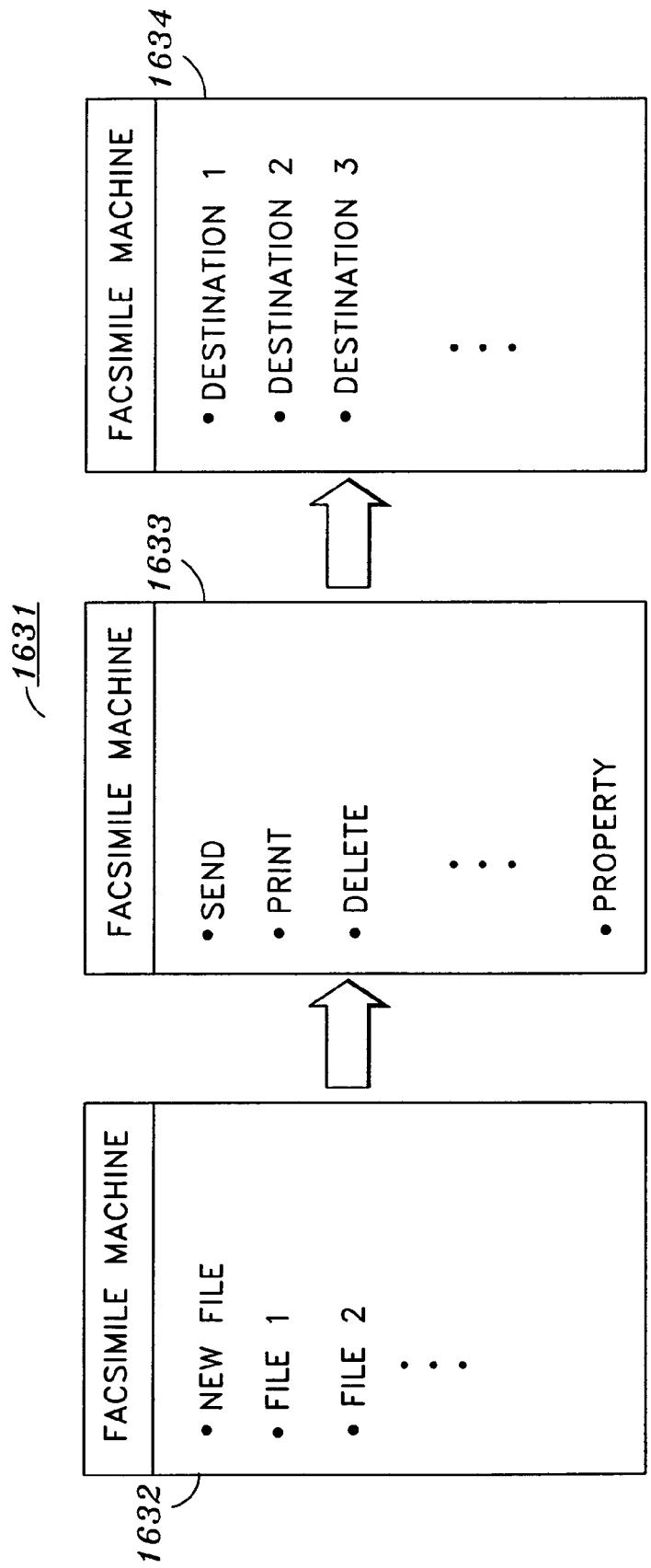
FIG. 16D illustrates an example of a user interface for use with a facsimile machine according to the present invention.

Referring to FIG. 16D, a user has the option of sending, printing and deleting a selected file using user interface 1631. If the user selects a send operation, display 1634 is provided including possible destinations. The destinations being generated from information retrieved from the user's portable memory device 21.

FIGS. 17A through 17E illustrate a flow diagram of process steps, according to the present invention, in which an attachment unit 19 responds to input received from the user interface 1601 depicted in FIG. 16A.

At step S1701, a determination is made by attachment unit 19 whether or not a smart card, or other type of portable memory device 21, has been inserted in reader 20. If not, processing continues at step S1701 to await detection of a portable memory device 21. If a portable memory device 21 is detected at step S1701, processing continues at step S1702 to prompt for and receive security code information for user verification. At step S1703, a determination is made whether security code information entered by the user is valid. If not, processing continues at step S1702 to prompt the user for security code information.

If it is determined that valid security information has been entered by the user, processing continues at step S1704, to read file data from portable memory device 21 (e.g., reproduction data information 503) and generate user interface 1601. Initially, display 1602 of user interface 1601 in FIG. 16A is displayed in step S1704. Once the user makes a selection in display 1602, display 1603 of user interface 1601 is displayed.

If, at step S1705, it is determined that a file and action, or operation, have been selected in the displayed user interface, processing continues at step S1706 to determine the type of action. Otherwise, processing continues to await user input.

At step S1706, if it is determined that the action selected by the user is a new file, processing continues at step S1707 to allow the user to select a file. At step S1708, the name of the new file is written to portable memory device 21 (e.g. the name of the file may be determined from the selection of a file icon in a drag and drop operation of the icon onto the icon of portable memory device 21). Processing continues at step S1720 of FIG. 17B to notify server 15 that an upload operation is pending. As discussed herein, server 15 is identified from the one or more servers listed in portable memory device 21.

At step S1721, a determination is made whether attachment unit 19 has received a response from server 15 acknowledging, or accepting, the upload request. If a response has not been received, processing continues at step S1721 to await a response from server 15. While it is not shown in FIG. 17B, attachment unit 19 may resend the notification to server 15 after a period of time in which no response is detected at step S1721.

Once a response is received from server 15 acknowledging receipt of the notification and accepting the request, processing continues at step S1722 to send the upload request to serve 15. At step S1723, the file is uploaded to server 15. Steps S1722 and S1723 may be performed simultaneously (e.g., as a single transmission), or sequentially (e.g., as multiple transmissions). In addition, it is possible to combine the access to server 15, upload request and file transmission as a single message, or transmission.

At step S1724, attachment unit 19 receives attribute information from server 15 corresponding to the file uploaded to server 15 in step S1723. Such attribute information includes a file name or ID, for example. It may also include a path or other storage location or identification information. At step S1725, attribute information corresponding to the uploaded reproduction data is stored on portable memory device 21. Such information may include a file name (or other identification), a type (or format) and preferably a default application for use with the reproduction data (e.g., a word processing application in which reproduction data was created) as well as an identification of server 15. Processing continues at step S1704 to display user interface 1601 using information retrieved from portable memory device 21.

Figure 17A:
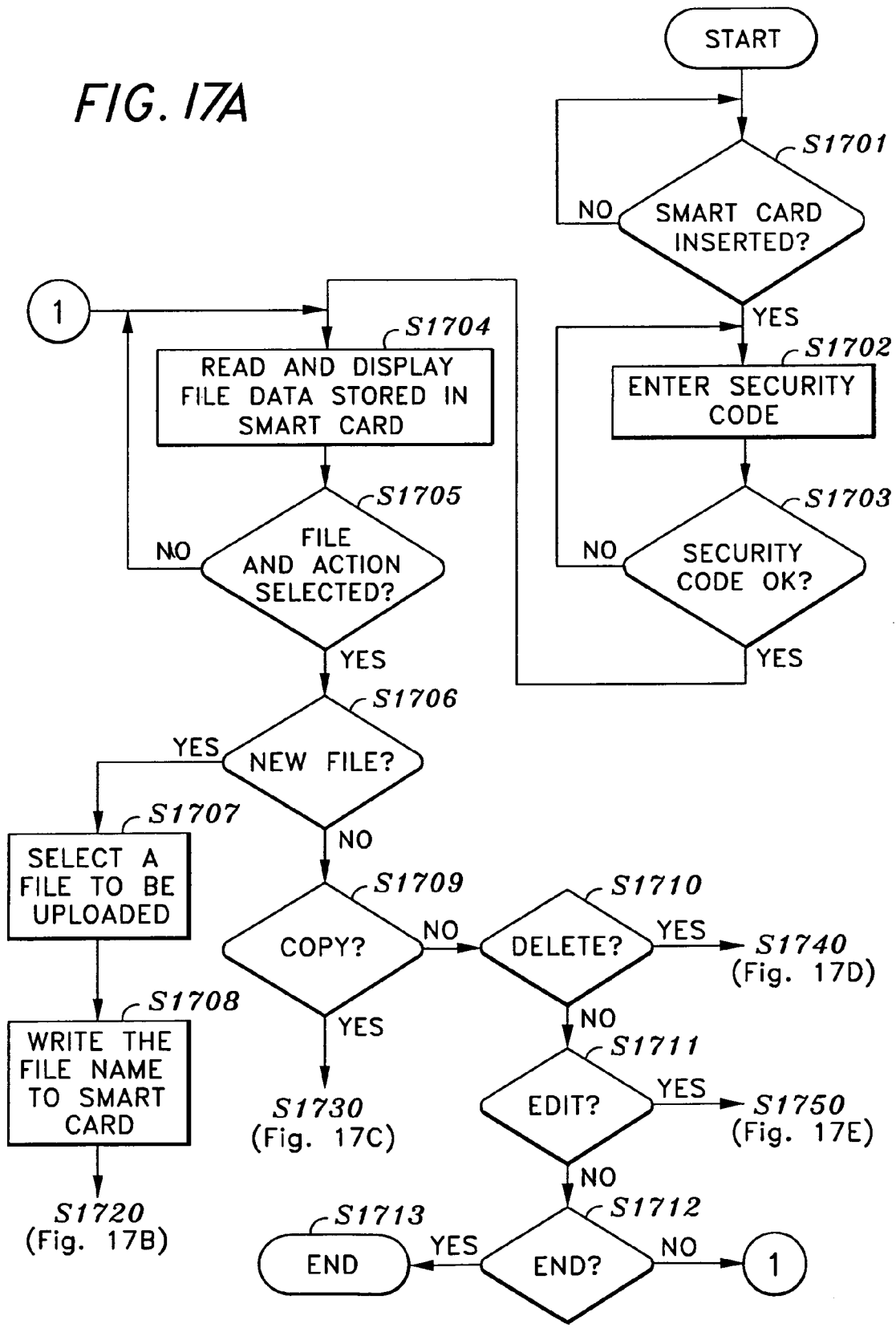
FIGS. 17A through 17E illustrate a flow diagram of process steps, according to the present invention, in which an attachment unit responds to input received from the user interface depicted in FIG. 16A.
Figure 17B:
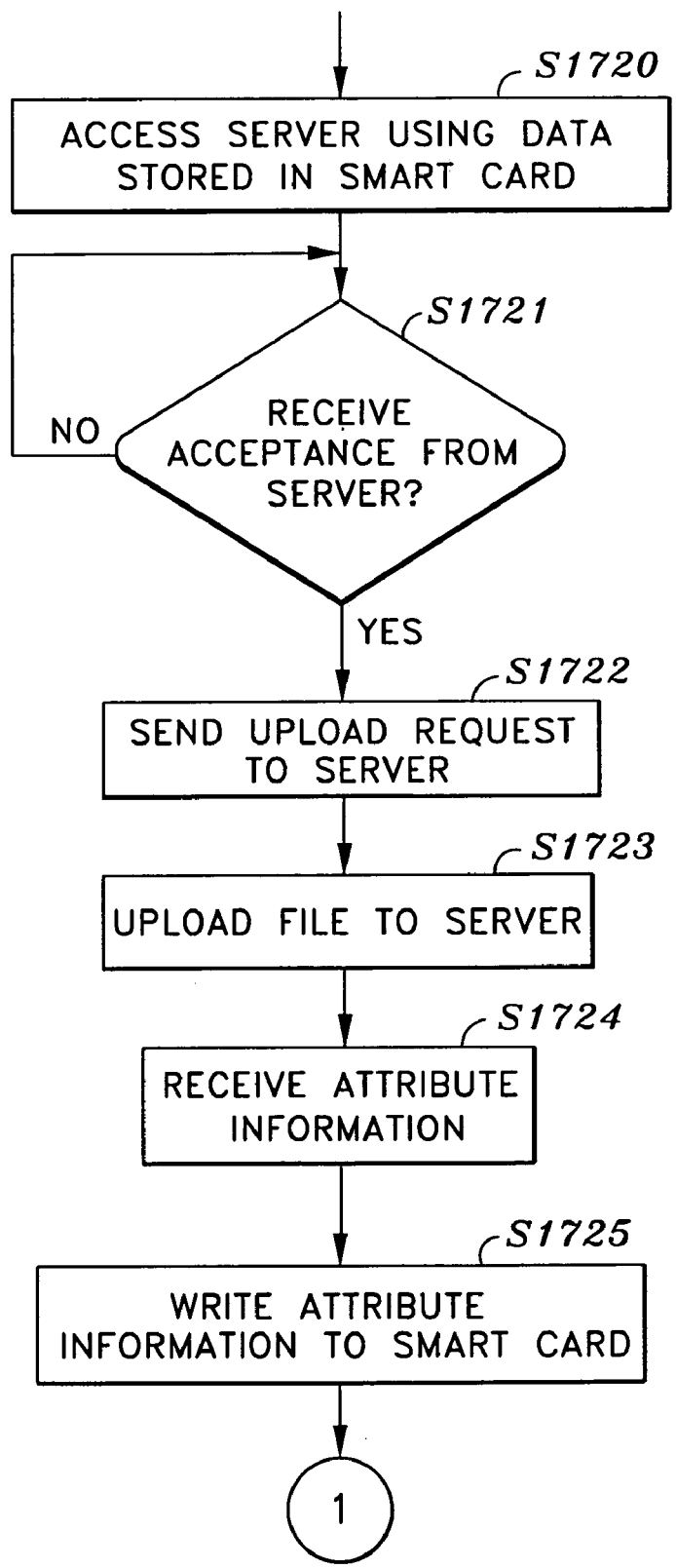
Figure 17C:
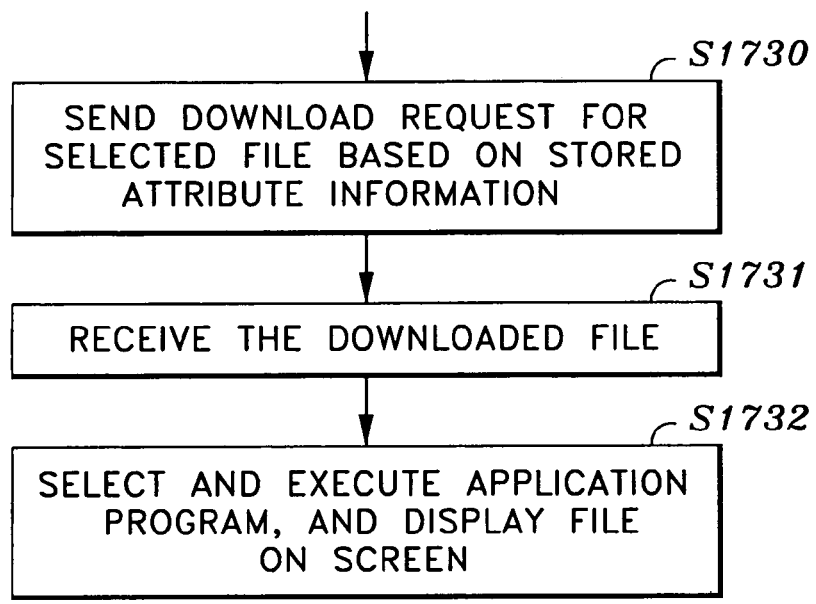

If it is determined, at step S1705 of FIG. 17A, that a new file operation was not selected by the user, attachment unit 19 continues by determining whether a copy operation was selected by the user. If so, processing continues at step S1730 of FIG. 17C. At step S1730, a download request is sent by attachment unit 19 to the server (e.g., server 15) specified by the file's reproduction data information 503 stored in portable memory device 21. At step S1731, the file is received from server 15 and at step S1732, an appropriate application executable by the PC to display the file is selected and used to display the file downloaded from server 15. The appropriate application may be determined to be a default application specified in reproduction data information 503, or an application capable of reading and displaying the reproduction data.

Attachment unit 19 may return to S1704 to await additional input, wait until the user exits the application currently displaying the downloaded reproduction data or wait for another trigger to display user interface 1601.

If attachment unit 19 determines at step S1709 of FIG. 17A that a copy operation was not selected, processing continues at step S1710 to determine whether the selected operation is a delete operation. If so, processing continues at step S1740 of FIG. 17D to respond to the delete selection.

At step S1740, attachment unit 19 confirms with the user whether the user actually wishes to delete the selected file. If so, processing continues at step 1741 to send a delete request to server 15. At step S1742, attachment unit 19 awaits receipt from server 15 that the selected file has been deleted. If it is determined at step S1742, that such notification has not been received, processing continues at step S1741 to resend the request in a case that server 15 did not receive the request, or such notification has not been received from server 15 after a reasonable waiting period. When notification is received from server 15 that the file has been successfully deleted and the corresponding entry in portable memory 21 is also deleted, processing continues at step S1704 to display user interface 1601 using information retrieved from portable memory device 21.

If it is determined, at step 1710 of FIG. 17A, that a delete operation was not selected by the user, processing continues at step S1711 to determine whether an edit operation was selected. If so, processing continues at step S1750 of FIG. 17E.

At step S1750, a determination is made whether the selected file is currently being edited by someone else. Such determination may be made by, for example, sending a request to server 15 to determine whether the selected file was requested by another attachment unit 19 for editing by another. If so, the user is informed at step S1751 and processing continues at step S1704 to display user interface 1601 using information retrieved from portable memory device 21.

If it is determined at step S1750 that the selected file is not currently being edited by another user, processing continues at step S1753 to download the file from server 15. At step S1754, the user may edit the file contents in an appropriate application (e.g., the default application) executing on the PC. At step S1755, an updated file is uploaded to server 15, and processing continues at step S1704 of FIG. 17A.

If it is determined at step S1711 of FIG. 17A that the operation selection is not an edit operation, processing continues at step S1712 to determine whether the user wishes to exit the system (e.g., such as by removal of portable memory device 21), processing ends at step S1713. Otherwise, processing continues at step S1704 to display user interface 1601 using information retrieved from portable memory device 21 and await user input.

Where reproduction device 18 is a copier, such as a digital copier, attachment unit 19 includes process steps for displaying user interface 1611 and responding to requests for functionality of the copier. FIGS. 18A through 18D illustrate a flow diagram of process steps, according to the present invention, in which an attachment unit 19 responds to input received from the user interface depicted in FIG. 16B.

Figure 18A:
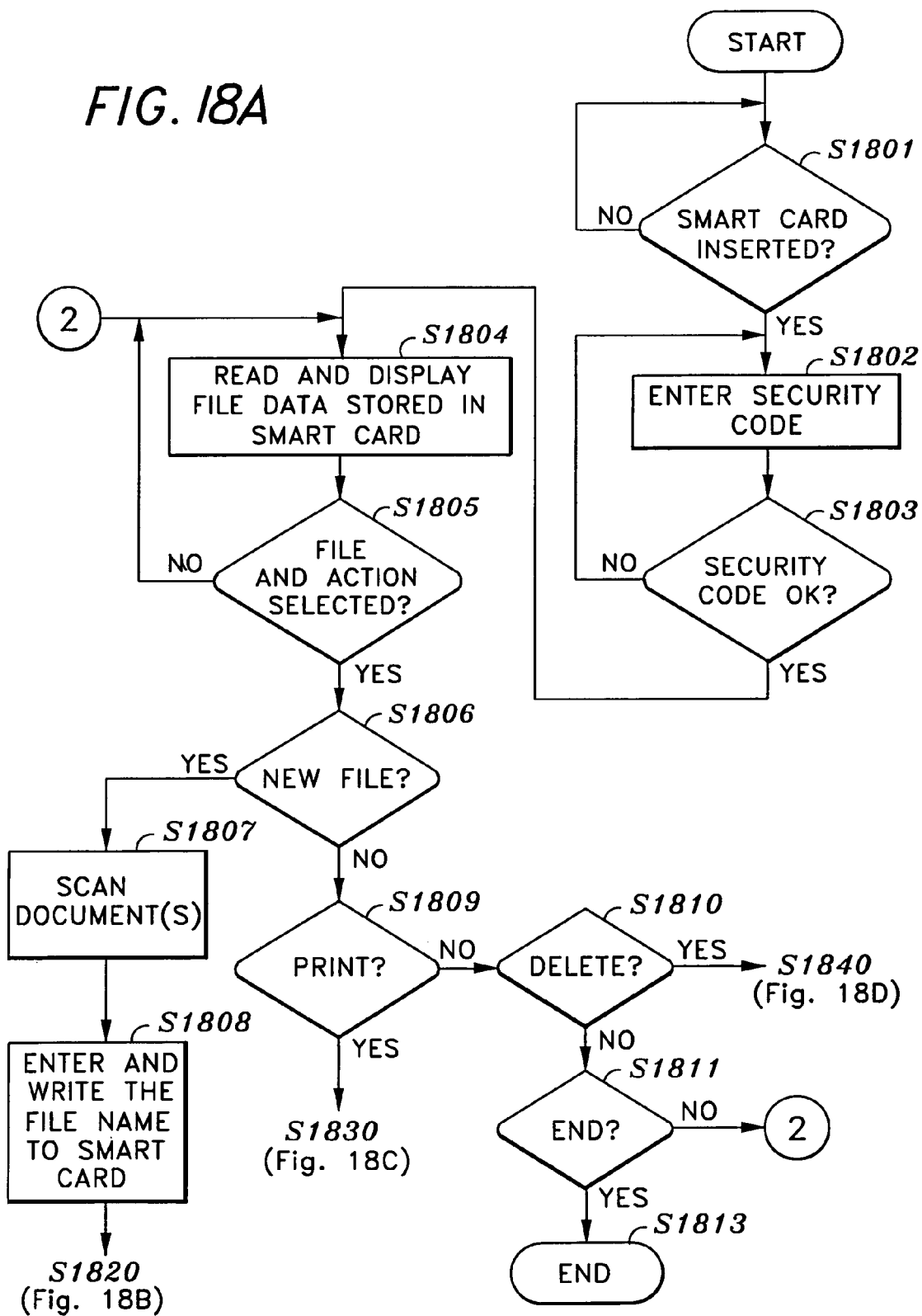
FIGS. 18A through 18D illustrate a flow diagram of process steps, according to the present invention, in which an attachment unit responds to input received from the user interface depicted in FIG. 16B.
Figure 18B:
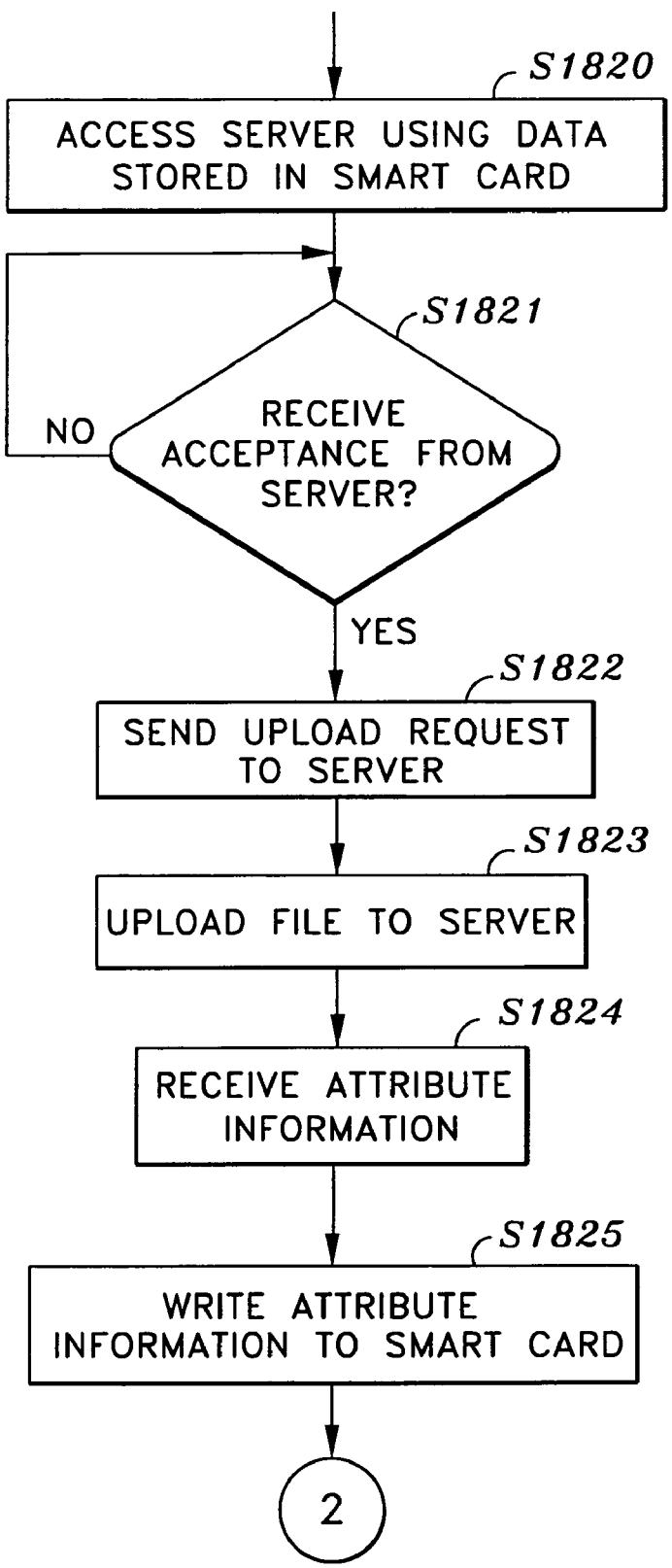

Steps S1801 through S1806 of FIG. 18A function in a manner similar to steps S1701 through S1706 of FIG. 17A. However, Step S1804 displays user interface 1611 including displays 1612 and 1613.

When a new file operation is detected at step S1806, processing continues at S1807 to scan the documents using the scanning capabilities of the copier. At step S1808, the user enters a name for the scanned-in image, and the name is stored in portable memory device 21. Processing continues at step S1820 of FIG. 18B. Steps S1820 through S1825 of FIG. 18B correspond to steps S1720 through S1725 of FIG. 17B. Once the attribute information is written to portable memory device 21 at step S1825, processing continues at step S1804 to display user interface 1611 using information retrieved from portable memory device 21.

Figure 18C:
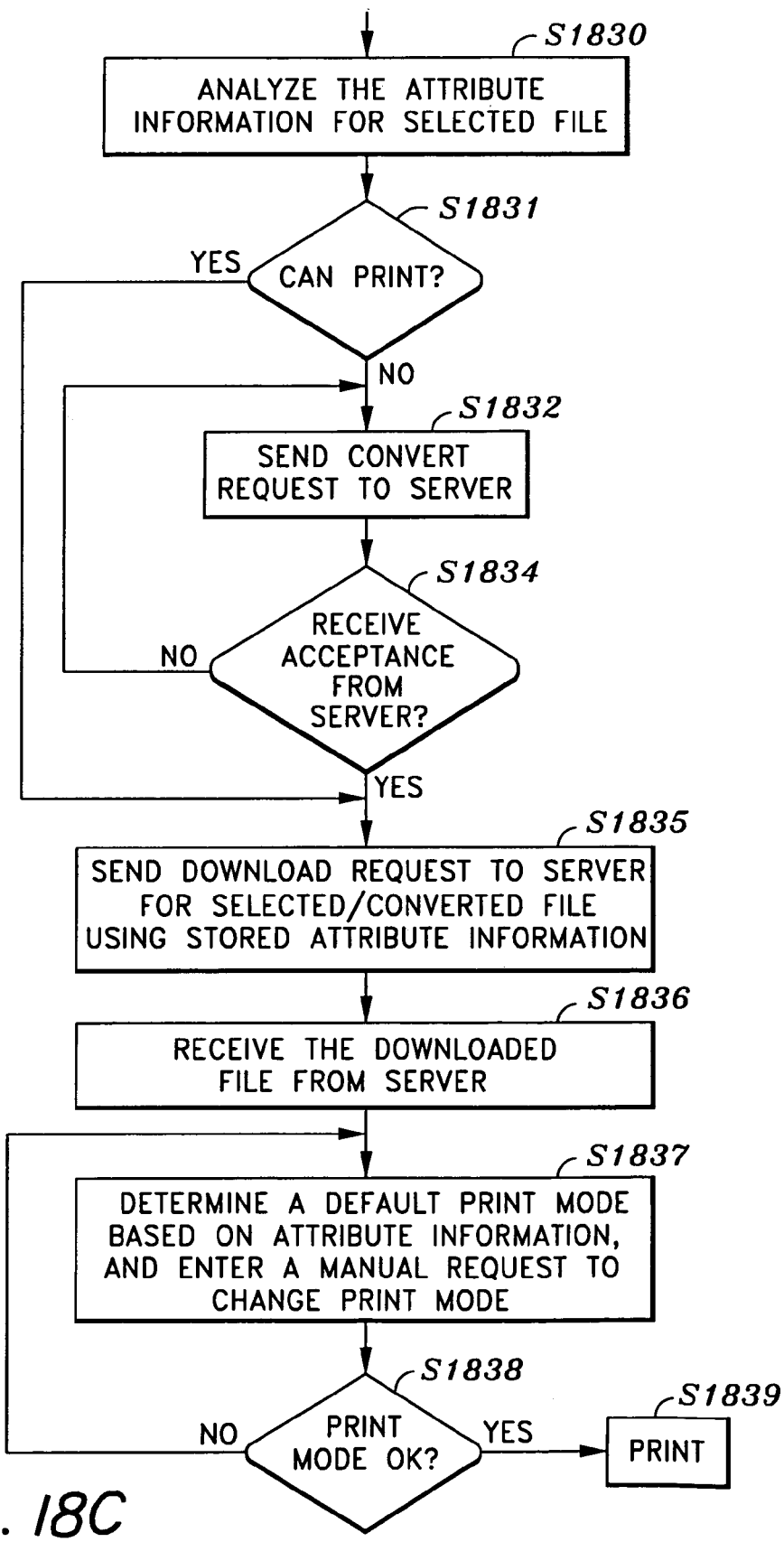

It is determined at step S1809 of FIG. 18A that a print operation is chosen by the user, processing continues at step S1830 of FIG. 18C to respond to the user's operation selection. At step S1830, attachment unit 19 analyzes the selected file's attribute information to determine whether the file is of a format that may be printed by the copier (e.g., image data such as HTML bitmap image data). If not processing continues at step S1832 to send a convert request to server 15 to convert the selected file to a suitable format for the copier.

At step S1834, a determination is made whether a response is received from server 15 that the file was successfully converted. If a response is not received, or the file was not successfully converted by server 15, the conversion request may be repeated at step S1832. When it is determined that the file was successfully converted by server 15, or it is determined (at step S1831) that the file's current format is suitable for the copier, processing continues at step S1835 to send a download request for the file to the server (e.g., server 15) based on the selected file's attribute information.

At step S1836, the downloaded file is received by attachment unit 19 from server 15. At step S1837, attachment unit 19 identifies using the selected file's attribute information, the default print mode for printing the selected file. Where the print mode is to be changed, attachment unit 19 may request the copier or prompt the user to set the default print mode as needed.

Figure 17D:
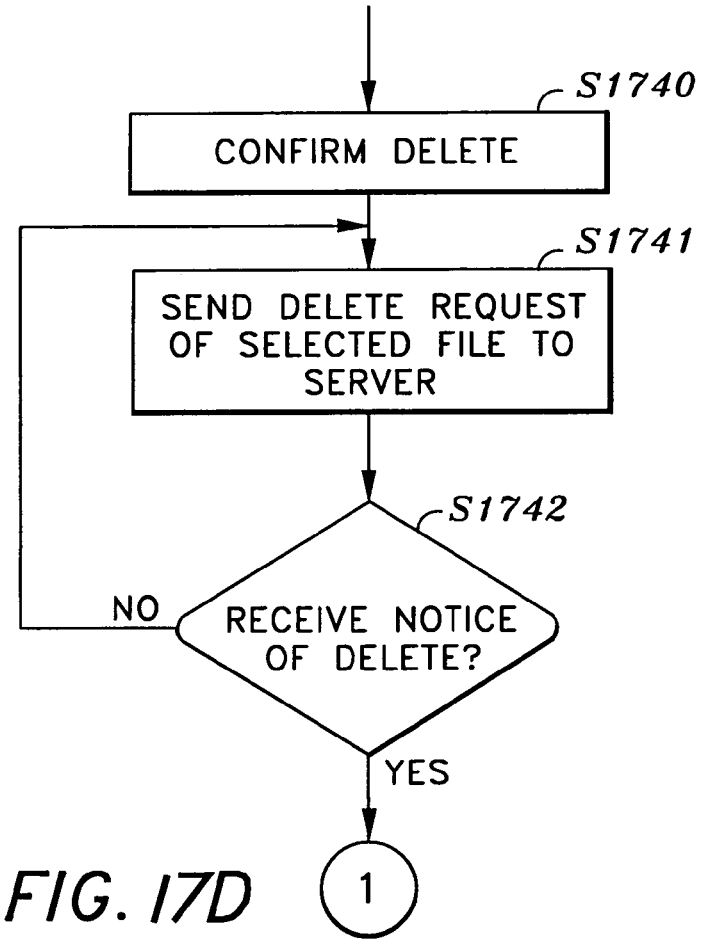
Figure 17E:
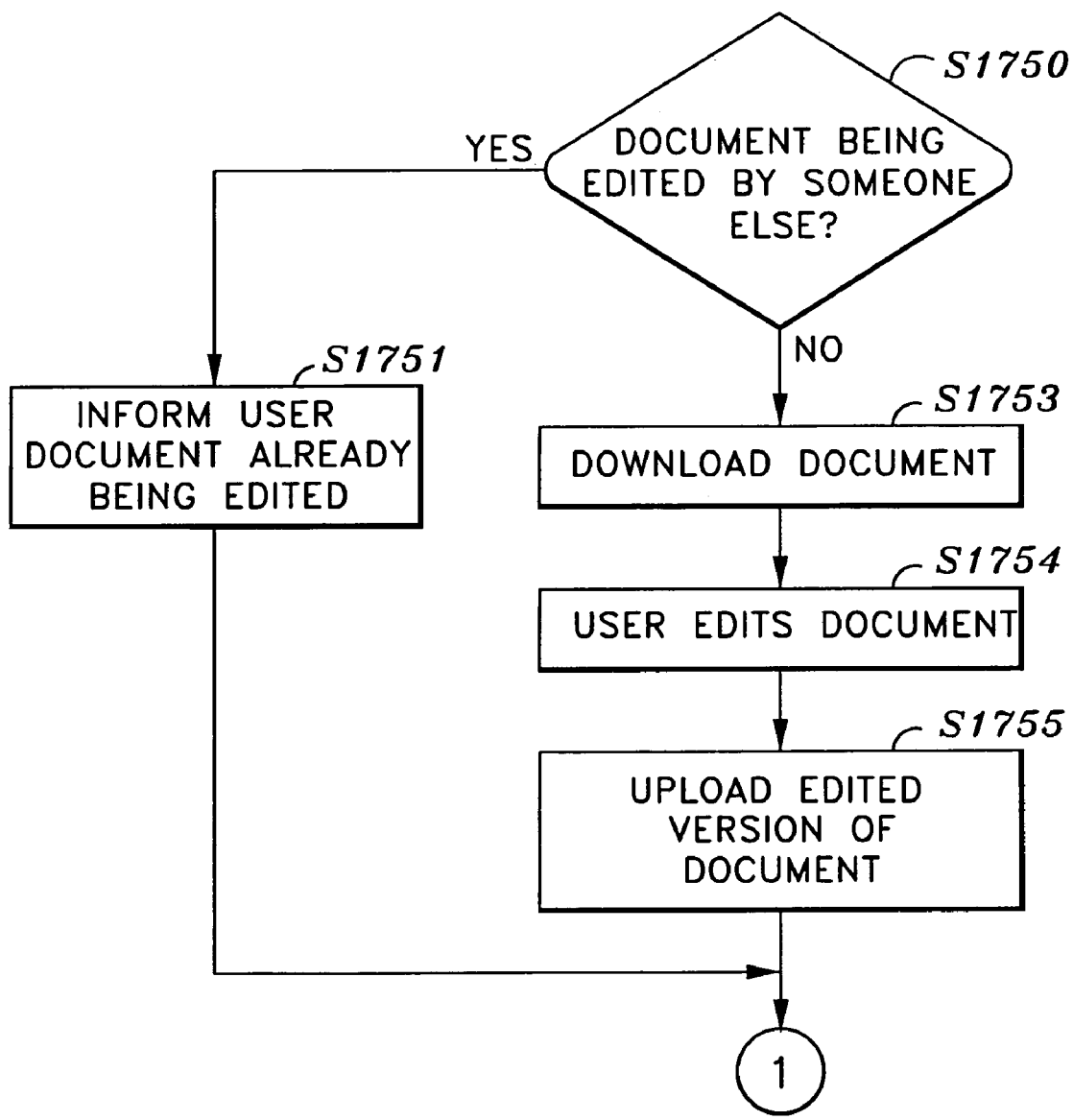
Figure 18D:
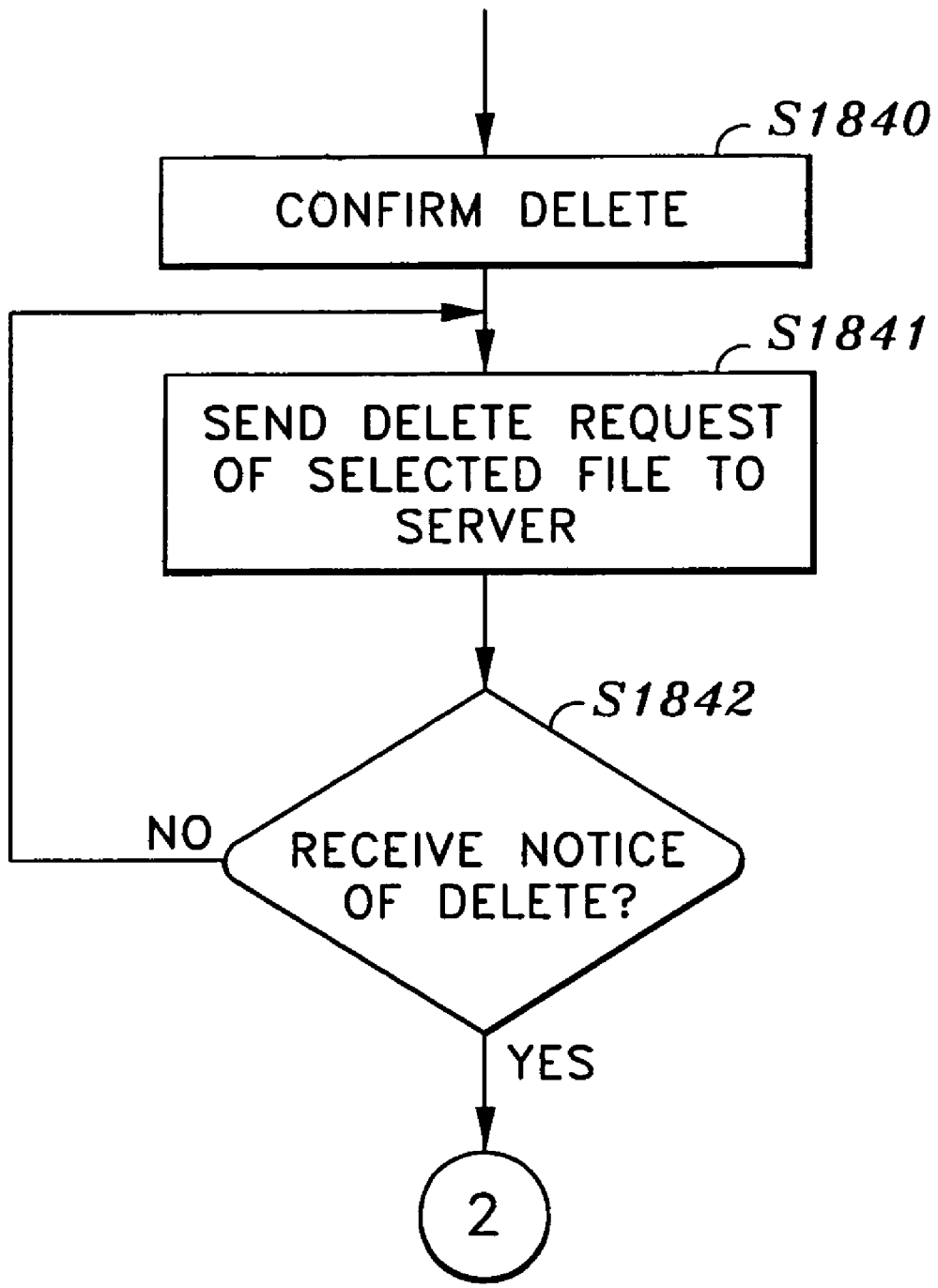

At step S1838, a determination is made whether the print mode settings are correct. If not, processing continues to repeat step S1837. Where the print mode is determined (at step S1838) to be correct, processing continues at step S1839 to print the selected file. Processing returns to step S1704 to display user interface 1611 using information retrieved from portable memory device 21.

Where a delete operation is detected at step 1810 of FIG. 18A, attachment unit 19 proceeds to process the requested operation as indicated FIG. 18D and steps S1840 through S1842 which perform similarly to steps S1740 through S1742 of FIG. 17D. When the delete operation is completed at step S1842, processing continues at step S1804 of FIG. 18A to display user interface 1611 using information retrieved from portable memory device 21.

Figure 19A:
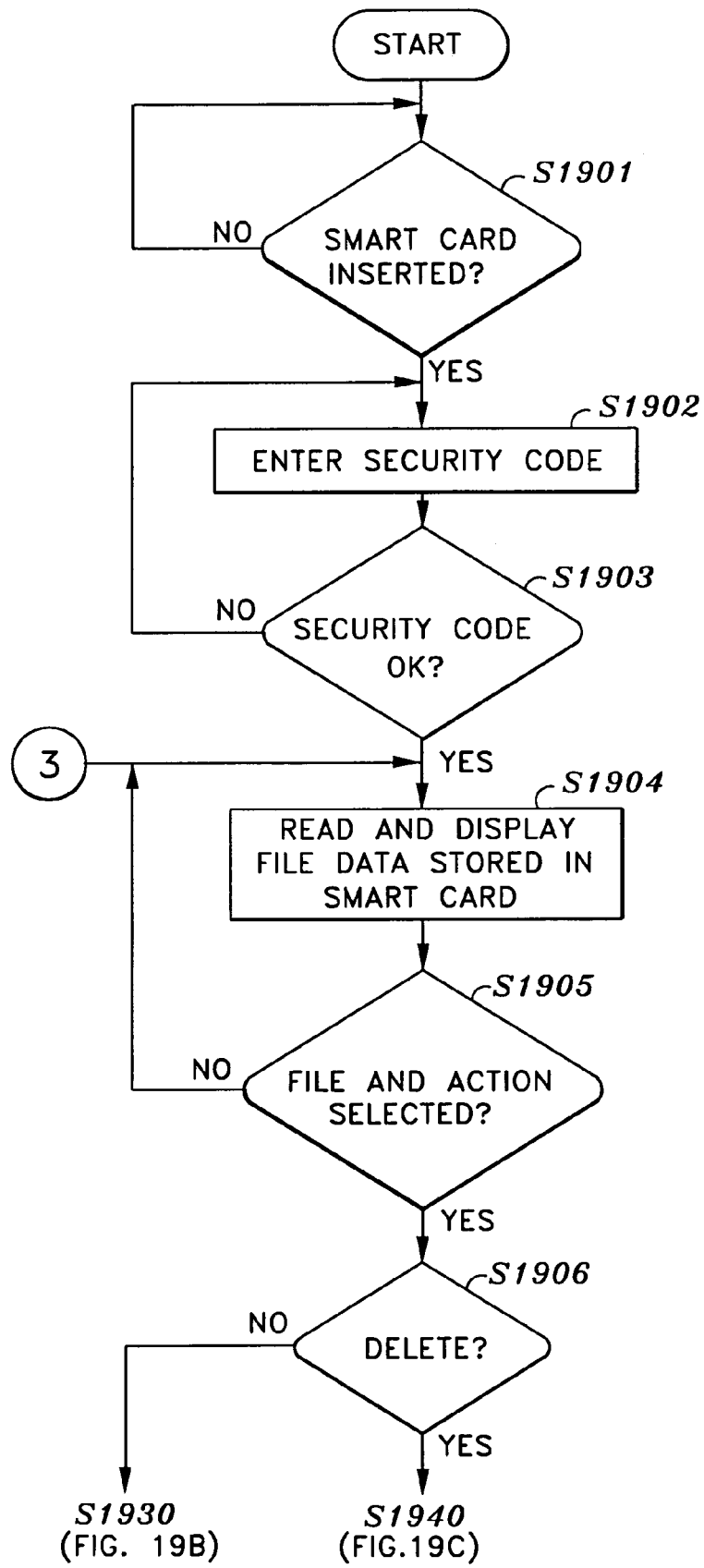
FIGS. 19A through 19C illustrate a flow diagram of process steps, according to the present invention, in which an attachment unit responds to input received from the user interface depicted in FIG. 16C.
Figure 19B:
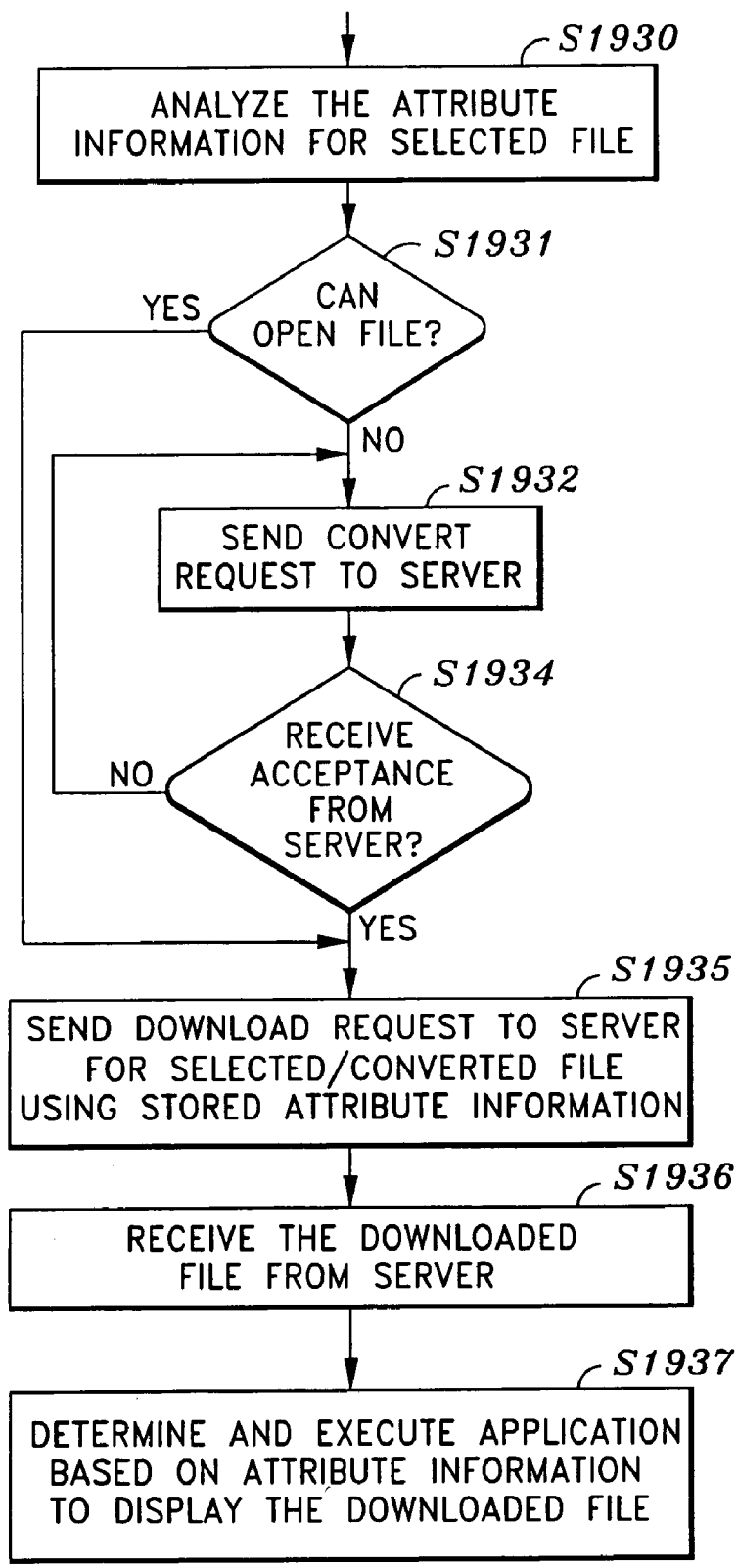
Figure 19C:
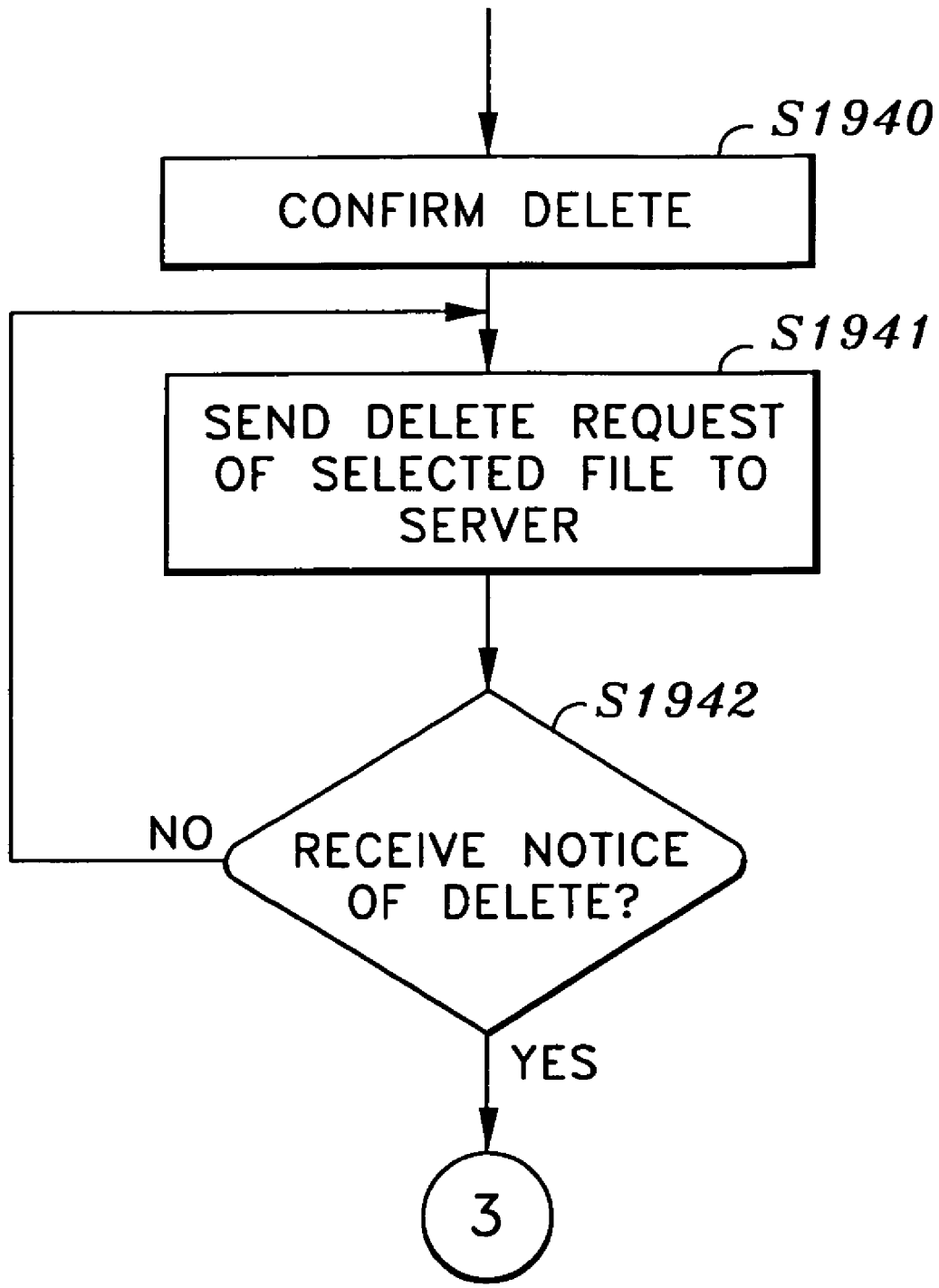

Upon an indication that the user wishes to end the session at step S1811, processing ends at step S1813.

Where the reproduction device 18 coupled to attachment unit 19 is an intelligent display, attachment unit 19 may include process steps such as those indicated in FIGS. 19A through 19C in which an attachment unit 19 responds to input received from the user interface depicted in FIG. 16C.

Steps S1901 through S1905 of FIG. 19A function similarly to steps S1701 through S1705 of FIG. 17A except that in Step S1904 user interface 1621 including displays 1622 and 1623 is displayed. Once a file and action are selected, processing continues at step S1906 to determine whether or not the selected action is a delete request. If so, processing continues as indicated by steps S1940 through S1942 of FIG. 19C which function in a manner similar to steps S1740 through S1742 of FIG. 17D. Processing then continues at step S1904 to display user interface 1621 using information retrieved from portable memory device 21.

If it is determined at step S1906 of FIG. 19A that a delete request was not made by the user, it is determined that the selected request is a display request and processing continues at step S1930 of FIG. 19B.

At step S1930, attachment unit 19 analyzes the selected file's attribute information to determine at step S1931 whether the file is of a format that may be opened for display by the intelligent display (e.g., whether the current format is compatible with an application executable by the intelligent display to open and display the file). If not processing continues at step S1932 to send a convert request to server 15 to convert the selected file to a suitable format for the intelligent display (e.g., to convert the file to raster image data).

At step S1934, a determination is made whether a response is received from server 15 that the file was successfully converted. If a response is not received, or the file was not successfully converted by server 15, the conversion request may be repeated at step S1932. When it is determined that the file was successfully converted by server 15, or it is determined (at step S1931) that the current file format is suitable for the intelligent display, processing continues at step S1935 to send a request to server 15 to download the selected file.

At step S1936, the downloaded file is received by attachment unit 19 from server 15. At step S1937, attachment unit 19 identifies using the selected file attribute information, an appropriate application for execution by the intelligent display to display the downloaded file. Processing returns to step S1904 to display user interface 1621 using information retrieved from portable memory device 21.

In a case where reproduction device 18 coupled to attachment unit 19 is a facsimile machine, attachment unit 19 includes process steps such as those indicated in FIGS. 20A through 20E wherein an attachment unit 19 responds to input received from user interface 1631 depicted in FIG. 16D.

Figure 20A:
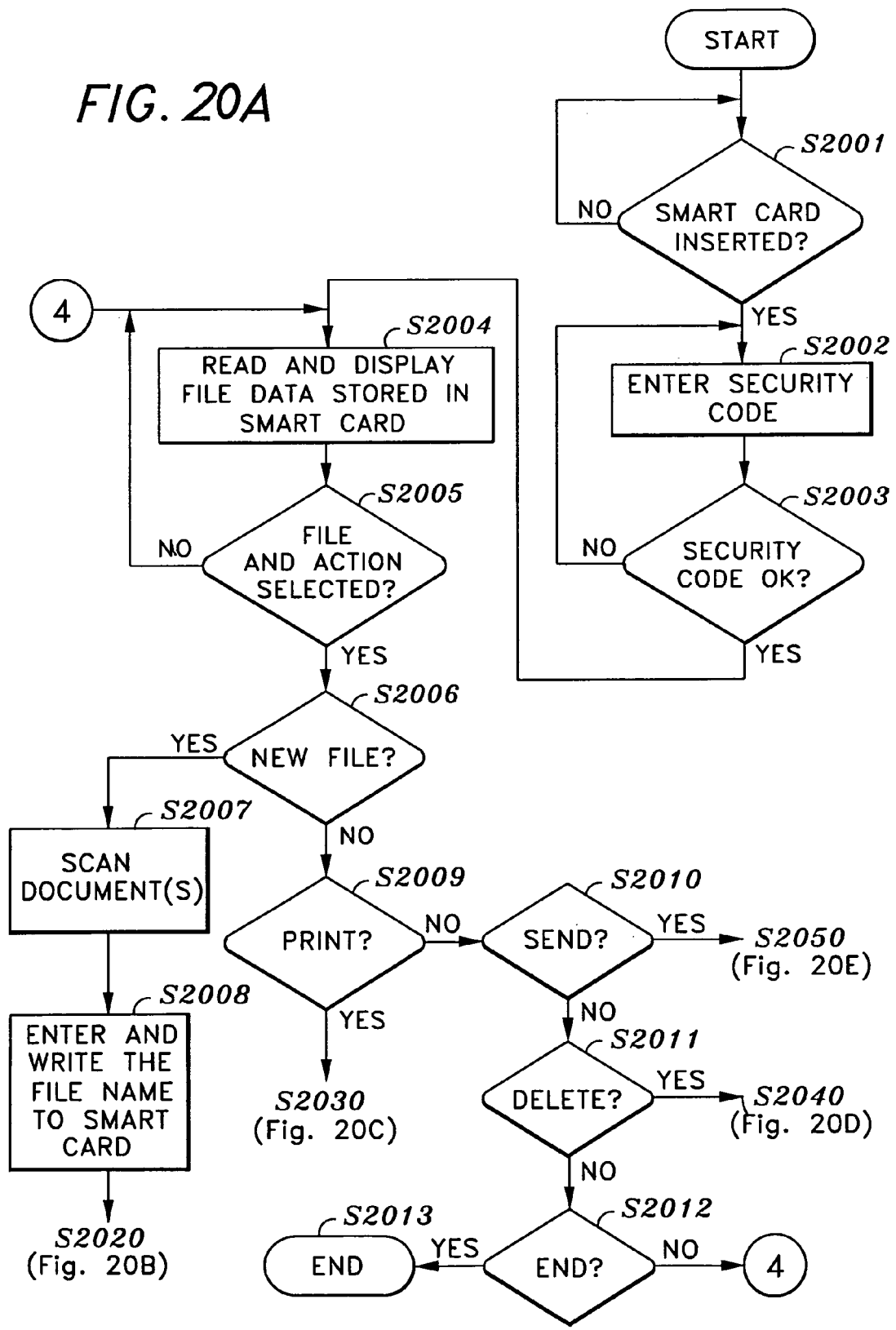
FIGS. 20A through 20E illustrate a flow diagram of process steps, according to the present invention, in which an attachment unit responds to input received from the user interface depicted in FIG. 16D.
Figure 20B:
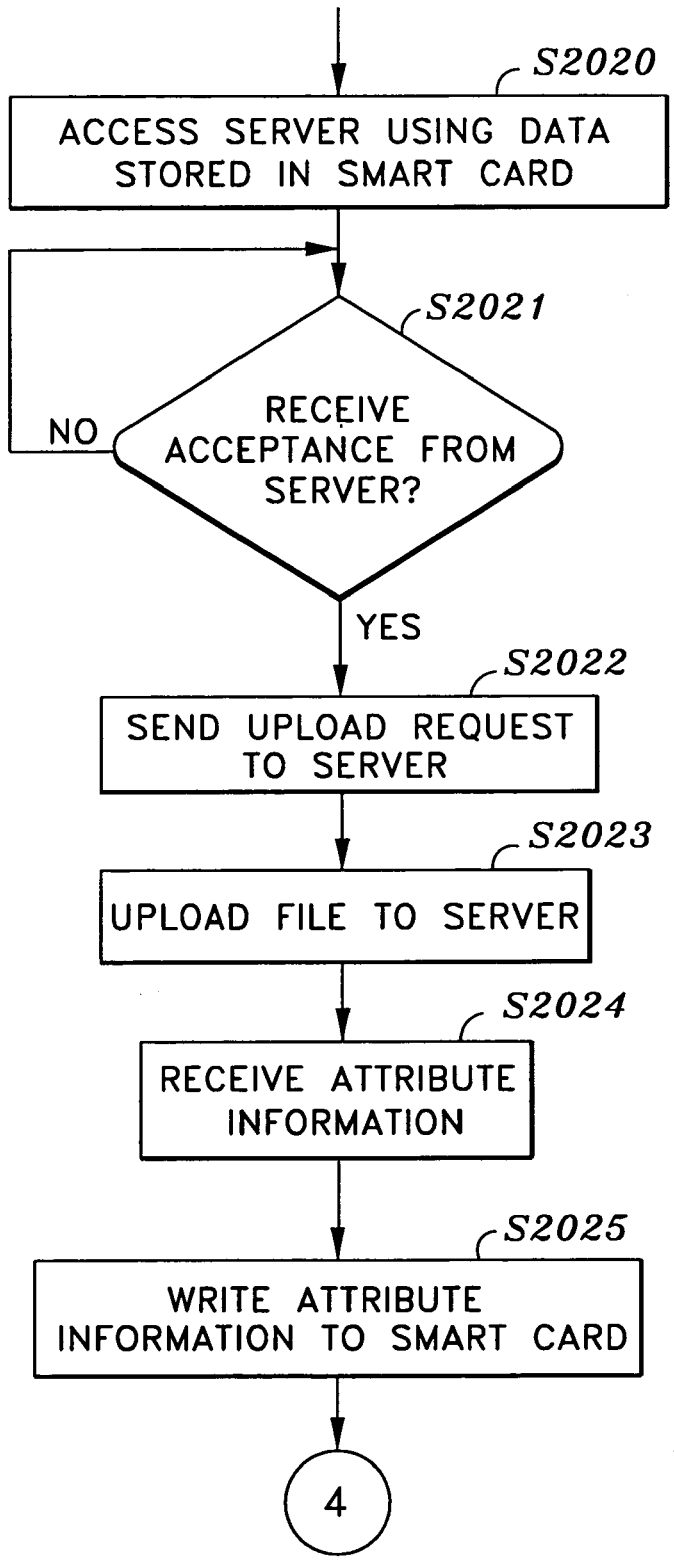

Steps S2001 through S2006 of FIG. 20A function in a manner similar to steps S1701 through S1706 of FIG. 17A. However, Step S2004 displays user interface 1631 including displays 1632 through 1634.

When a new file operation is detected at step S2006, processing continues at S2007 to scan the documents using the scanning capabilities of the copier. At step S2008, the user enters a name for the scanned-in image, and the name is stored in portable memory device 21. Processing continues with steps S2020 through S2025 of FIG. 20B which correspond to steps S1720 through S1725 of FIG. 17B. Once the attribute information is written to portable memory device 21 at step S2025, processing continues at step S2004 of FIG. 20A to display user interface 1631 using information retrieved from portable memory device 21.

Figure 20C:
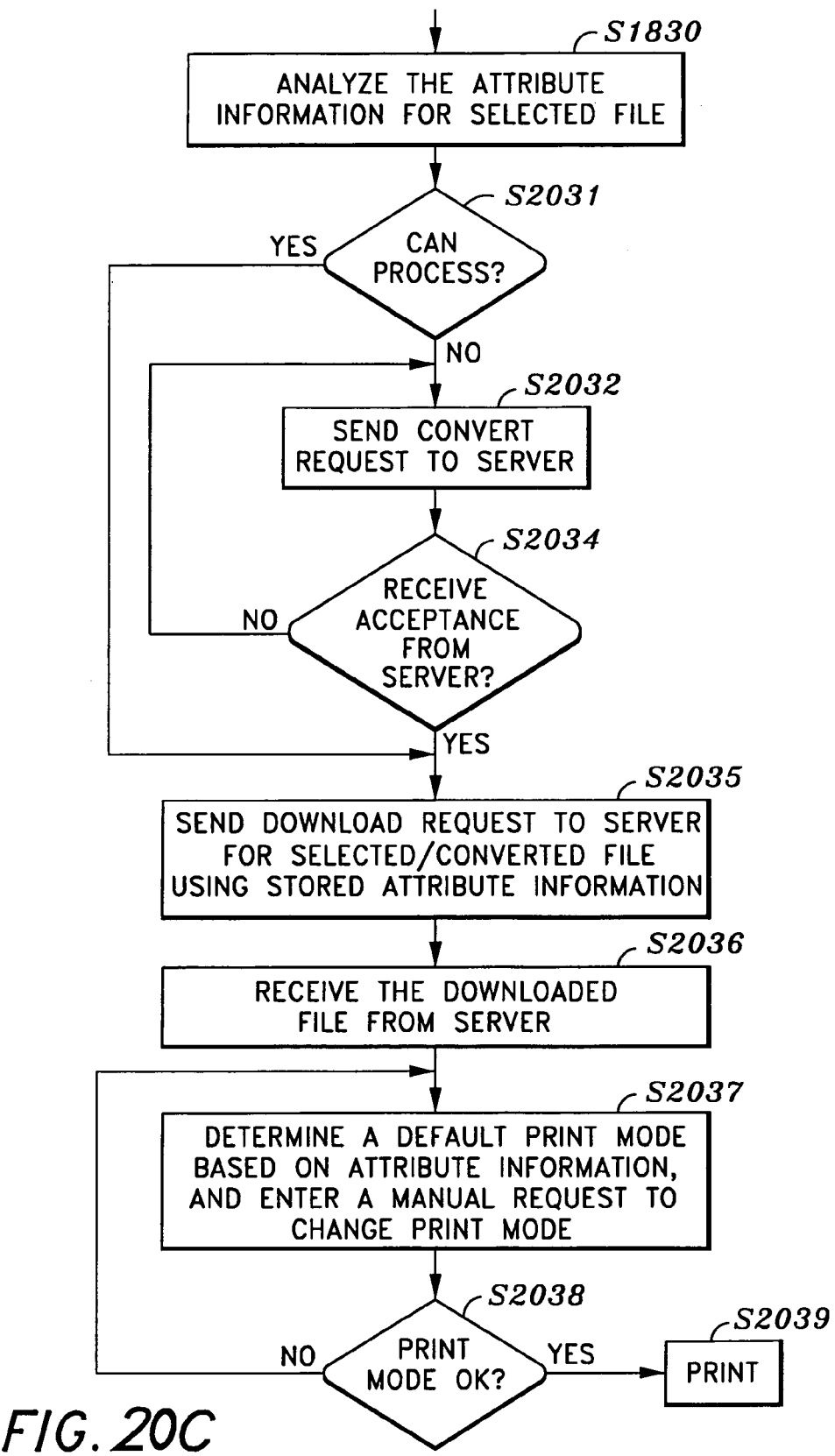

If it is determined at step S2009 of FIG. 20A that a print operation is chosen by the user, processing continues with steps S2030 through S2039 of FIG. 20C which function in a manner similar to steps S1830 through S1839 of FIG. 18C. Processing continues at step S2004 to display user interface 1631 using information retrieved from portable memory device 21.

Figure 20D:
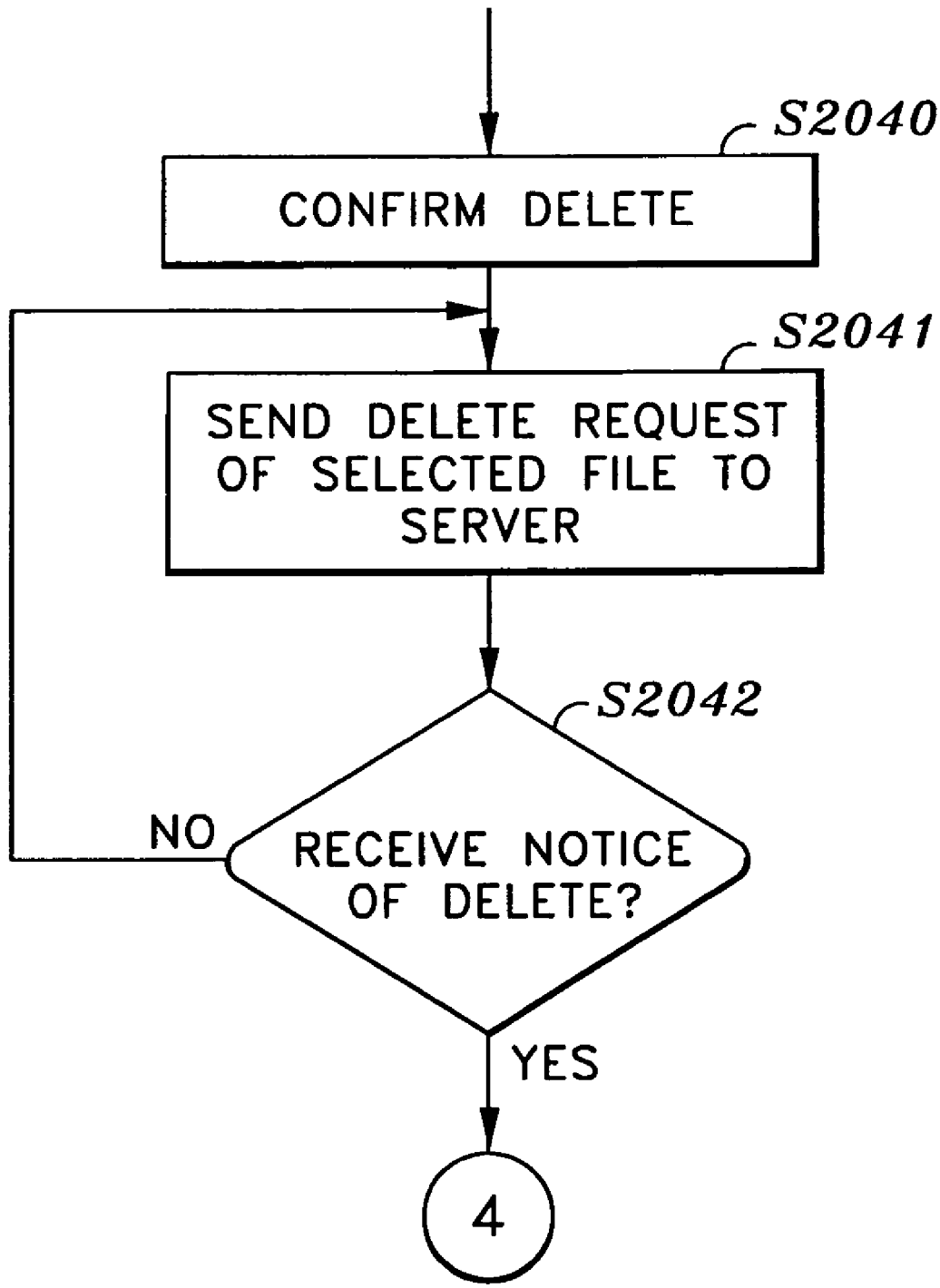
Figure 20E:
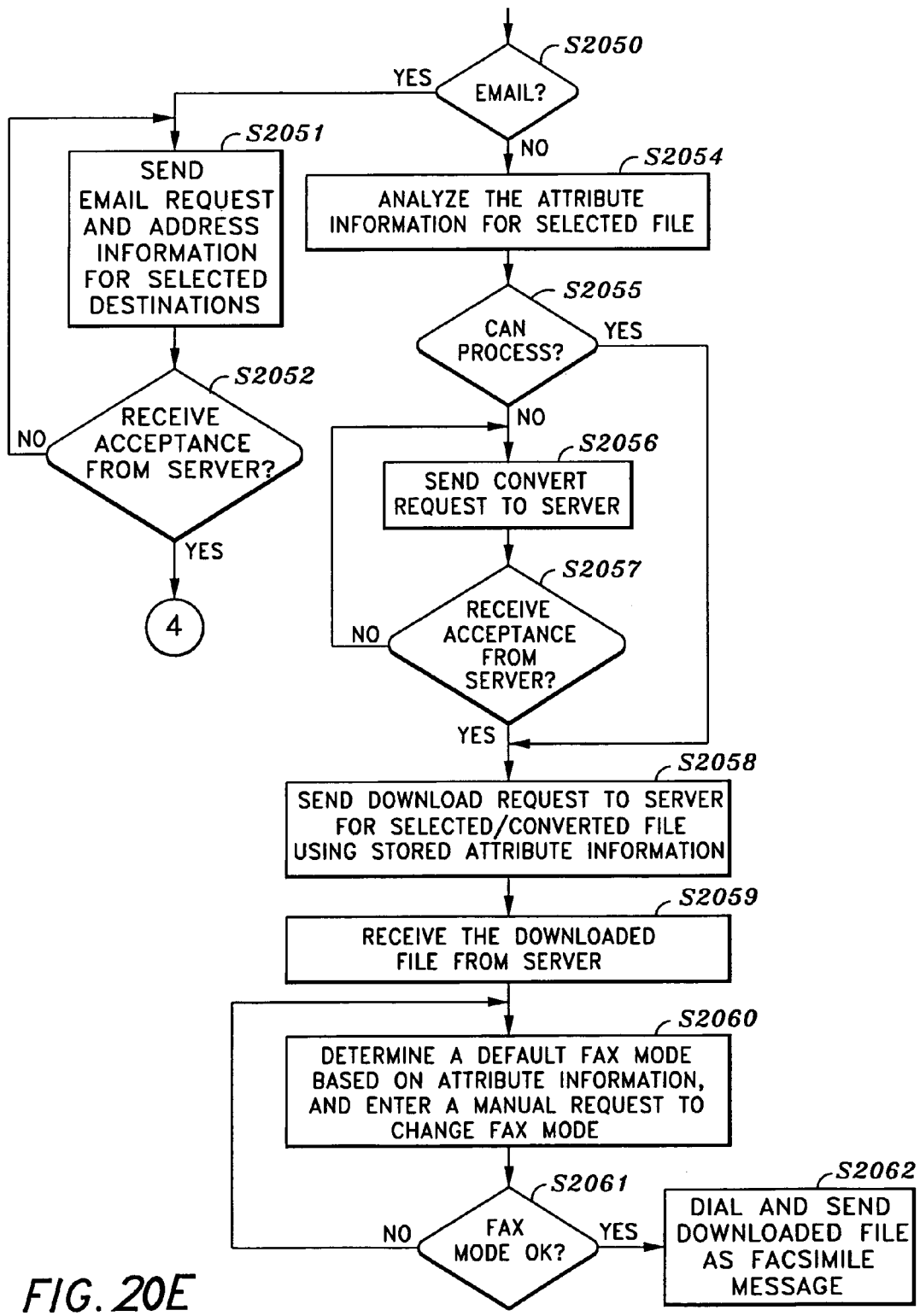

If it is determined at step S2010 of FIG. 20A that a send operation is selected by the user, processing continues at step S2050 of FIG. 20E.

At step S2050, a determination is made whether the selected operation is an email operation. If so, processing continues at step S2051 to send a request to server 15 to send an electronic mail message using the address information associated with user destinations selected in display 1634. Processing continues at step S2052 to determine whether notification of a successful completion was received by server 15. If not, processing continues at step S2051 to repeat the request as needed. When a successful completion notification is received from server 15, processing continues at step S2004 to display user interface 1631 using information retrieved from portable memory device 21.

Where it is determined, at step S2050, that the request is not an electronic mail request, processing continues at step S2054 to process the request as a facsimile request.

At step S2054, attachment unit 19 analyzes the selected file's attribute information to determine (at step 2055) whether the file is of a format that may be sent as a facsimile transmission (e.g., image data such HTML bitmap image data). If not, processing continues at step S2056 to send a convert request to server 15 to convert the selected file to a suitable format for the copier.

At step S2057, a determination is made whether a response is received from server 15 that the file was successfully converted. If a response is not received, or the file was not successfully converted by server 15, the conversion request may be repeated at step S2056. When it is determined that the file was successfully converted by server 15, or it is determined (at step S2055) that the file current format is suitable for the facsimile machine, processing continues at step S2058 to send a download request to server 15 for the selected file.

At step S2059, the downloaded file is received by attachment unit 19 from server 15. At step S2060, attachment unit 19 identifies using the selected file attribute information, the default fax mode for faxing the selected file. Where the fax mode is to be changed, attachment unit 19 may request the facsimile or prompt the user to set the default fax mode as needed.

At step S2061, a determination is made whether the fax mode settings are correct. If not, processing continues to repeat step S2060. Where the fax mode is determined (at step S2061) to be correct, processing continues at step S2062 to cause the facsimile machine to dial (based on destination selections made by the user in display 1634 of user interface 1631) and send the selected file as a facsimile message. Processing returns to step S2004 to display user interface 1631 using information retrieved from portable memory device 21.

If a delete operation is determined (at step S2011 of FIG. 20A) as being selected by the user, processing continues with steps S2040 through S2042 of FIG. 20D which correspond to steps S1740 through S1742 of FIG. 17D. Where it is determined at step S2012 that the user wishes to exit, processing continues at step S2013 to end.

Figure 21A:
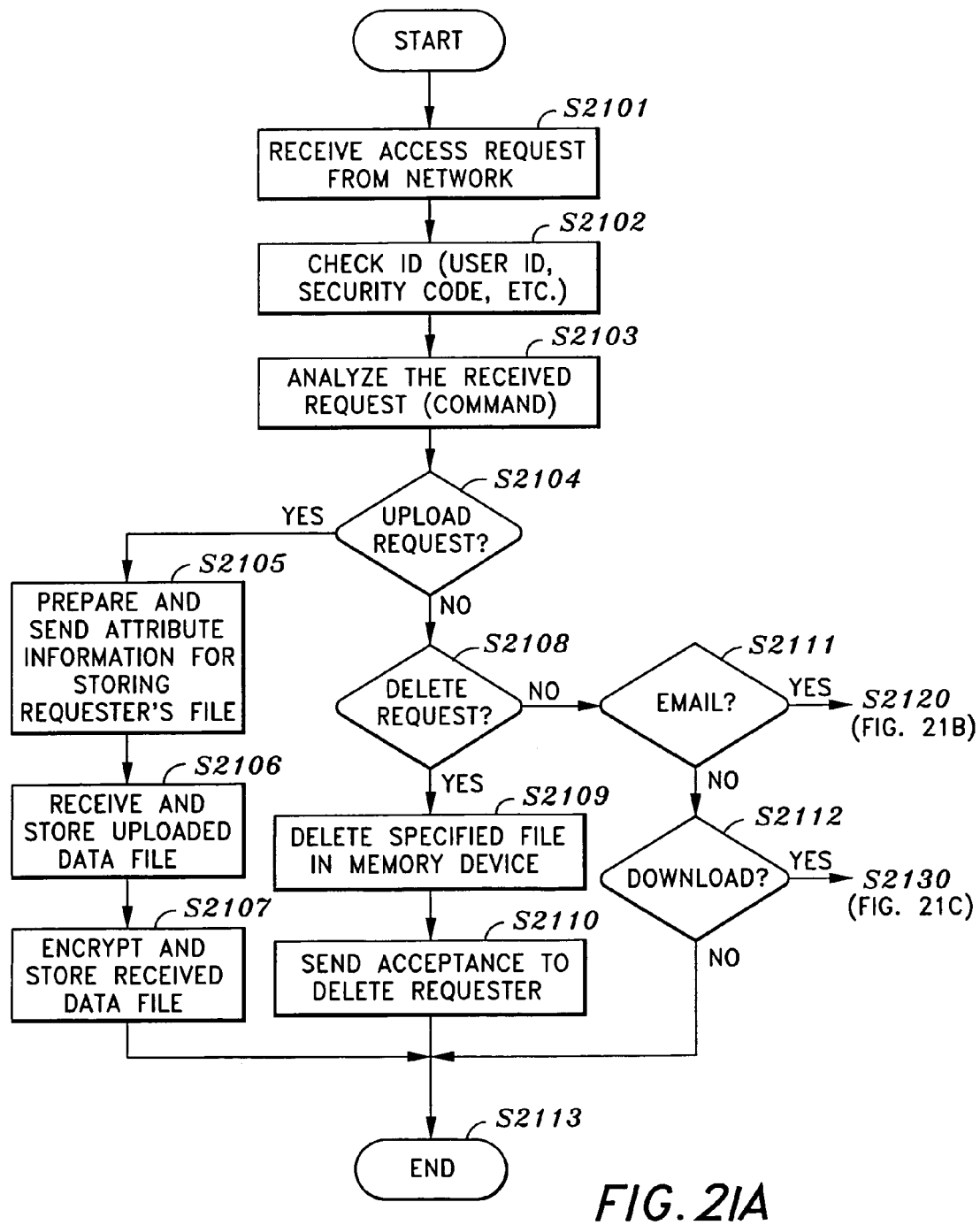
FIGS. 21A through 21C illustrate a flow diagram of process steps, according to the present invention, in which a server responds requests such as those transmitted by an attachment unit in FIGS. 17A through 17E, FIGS. 18A through 18D, FIGS. 19A through 19C, FIGS. 20A through 20E.
Figure 21B:
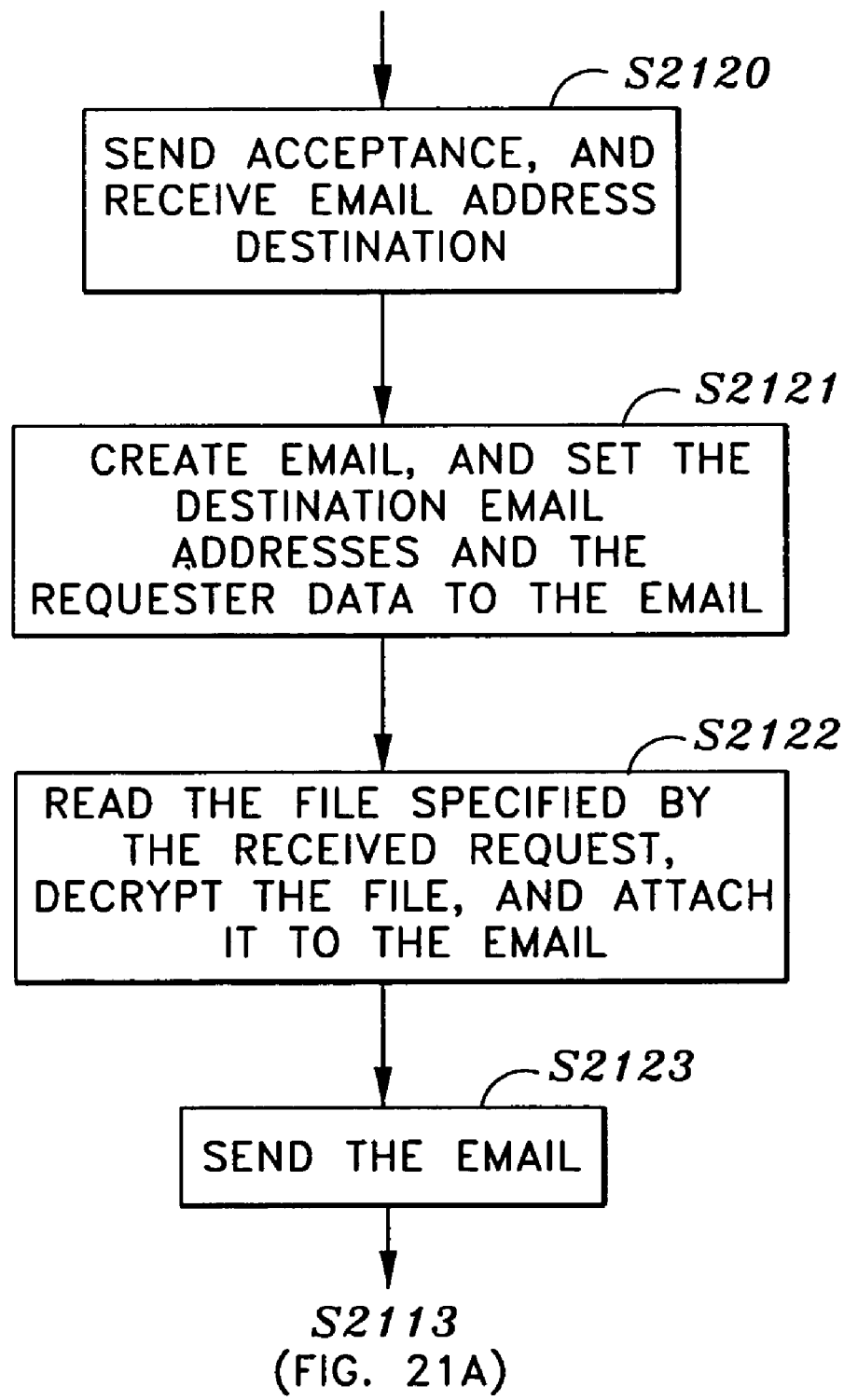
Figure 21C:
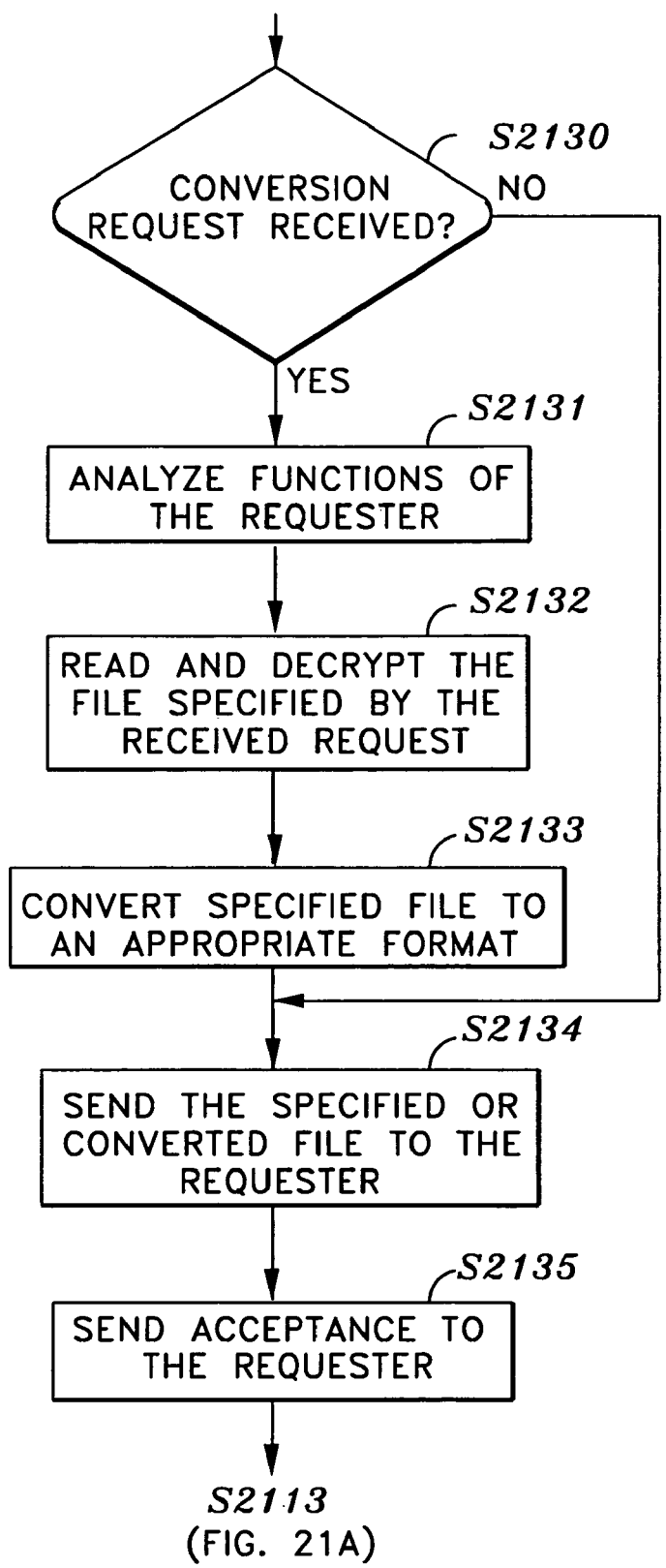

FIGS. 21A through 21C illustrate a flow diagram of process steps, according to the present invention, in which server 15 responds to requests (e.g., convert, download, upload, etc. request) such as those transmitted by an attachment unit 19 in FIGS. 17A through 17E, FIGS. 18A through 18D, FIGS. 19A through 19C, FIGS. 20A through 20E.

At step S2101, server 15 receives a request to access the server via the network (e.g., a request from attachment unit 19). At step S2102, server 15 checks verification information contained in the access request. Where the access is authorized, processing continues at step S2103 to analyze the request received via the network.

If it is determined at step S2104 that the request is an upload request, processing continues at step S2105 to generate and then send attribute information corresponding to the file to attachment unit 19. At step S2106, server 15 receives and stores the uploaded file. Where the uploaded file is to be encrypted, the file is temporarily stored in step S2106 and encrypted and permanently stored in step S2107. Processing of the received request ends at step S2113.

Where it is determined at step S2104, that the received request is not an upload request, processing continues at step S2108 to determine whether the received request is a delete request. When it is determined that a delete request is received, processing continues at step S2109 to delete the file specified in the request and send a completion notification to the requester. Processing of the received request ends at step S2113.

Where the received request is not a delete request, processing continues at step S2111, to determine whether the received request is an email request. If so, processing continues at step S2120 of FIG. 21B. At step S2120, server 15 acknowledges the request and acceptance to process the request to the requester (e.g., attachment unit 19) and receives the email request from the requester. At step S2121, server 15 creates the electronic mail message for the destinations and including any data for inclusion as specified in the request. At step 2122, the selected file (or files) identified in the request are retrieved by server 15, decrypted (if needed), and attached to the email. At step S2123, the email is sent and the requester is notified. Processing of the received request ends at step S2113.

Where the received request is not a delete request, processing continues at step S2112, to determine whether the received request is a download request. If not, processing of the received request ends at step S2113. If it is determined that the received request is a download request, processing continues at step S2130 of FIG. 21C.

At step S2130, a determination is made whether a conversion request is received. If so, processing continues at step S2131 to analyze functions of the requester to determine a suitable format. This information may be supplied in the download request, or may be accessed from information retrievable by server 15. For example, where server 15 maintains a registry of attachment units 19 and their associated reproduction devices 18, server 15 may determine a suitable format based on the type of reproduction device 18, or by formats identified in the registry.

At step S2132, server 15 decrypts the requested file and converts the file at step S2133 to an appropriate format as determined in step S2131. Whether or not a conversion was performed, processing continues at step S2134 to send the specified file (converted in its stored format) to the requester. At step S2135, server 15 sends a completion notification to the requester and processing of the received request ends at step S2113.

As is discussed in detail above, listing 402 of GUIs displays information from entries in portable memory device 21 that correspond to reproduction data stored by server 15. In one aspect of the invention, listing 402 includes an entry corresponding to each entry in portable memory device 21. That is, listing 402 identifies every entry in portable memory device 21 that corresponds to a reproduction data file (or file) stored by server 15.

However, as the number of reproduction data files that are stored increases, listing 402 as well as other processing of the reproduction data by a user becomes cumbersome. Advantageously, the present invention provides a mechanism to filter the reproduction data based on filtering (or selection) criteria specified in a filtering rule set. Thus, it is possible to filter out that reproduction data that is not currently of interest.

In another aspect of the invention, a user-specified rule or rules may be used to identify none or more reproduction data entries of portable memory device 21 that satisfy the criteria specified by the rules. According to this aspect of the invention, for example, listing 402 may display only those entries that satisfy the rule set criteria. The rule set may also be used to identify a set of reproduction data files that are to be processed according to an operation specified by the user. For example, a user may wish to define, as part of a rule set, those entries in portable memory device 21 that are printed, deleted, copied, viewed, etc.

Thus, once a user identifies himself, only those documents with associated information that satisfy the user's rule set are included in listing 402 of GUIs 400A and 400B and/or processed for a selected operation (or operations). As is described in more detail below, the present invention further contemplates an override of the rule set, if desired. In such a case, an entry is displayed in listing 402 for each of the entries in portable memory device 21, for example.

Examples of rules that may be used with the present invention include, but are not limited to, a LIFO (i.e., last in, first out) rule for selecting the most recently stored (or accessed) files, a "favorites" rule for selecting the most frequently used files, a rule designating a file for a particular operation (or operations), a rule designating selection of files suitable for a given reproduction device 18, etc.

Figure 23A:
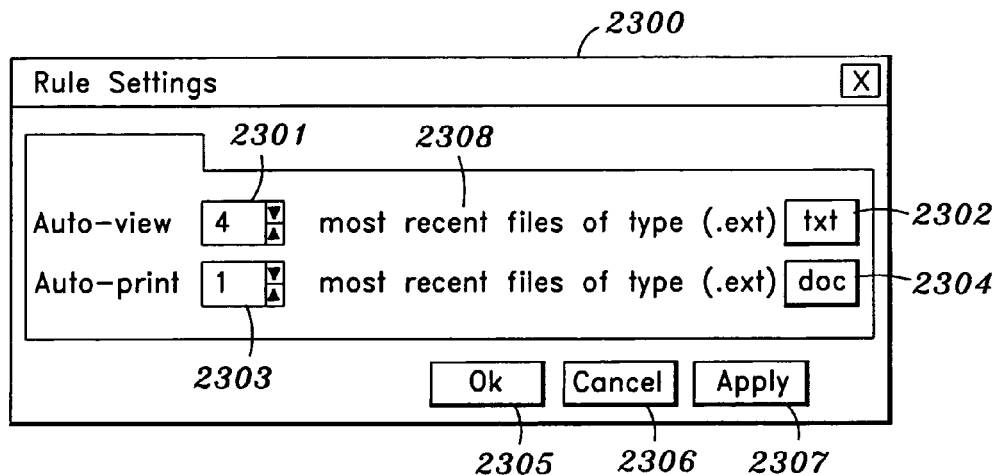
FIGS. 23A and 23B provide a GUI for setting rules according to the present invention.
Figure 23B:
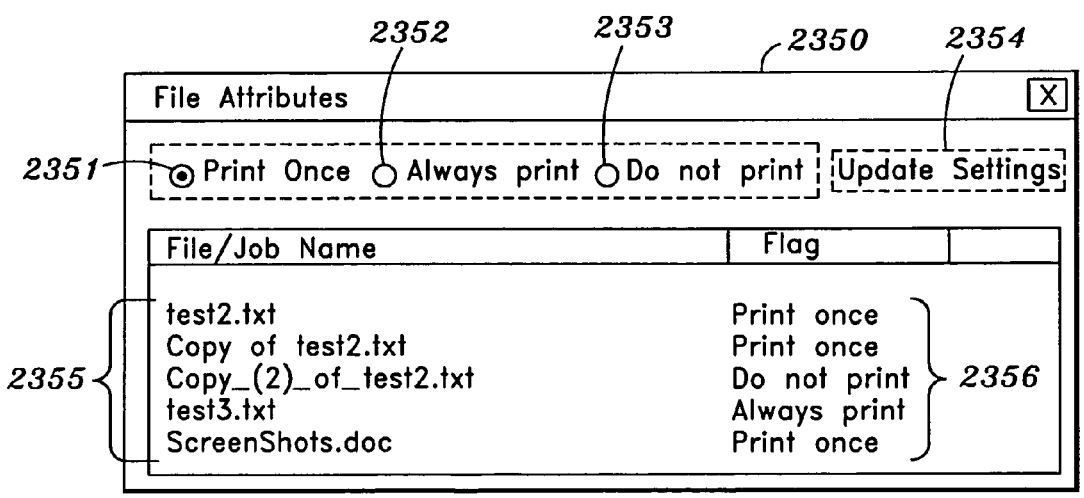

A rule may be stored in portable memory device 21 or by server 15, for example. A rule may be set using a GUI provided by attachment unit 19, server 15 and/or another computer system. FIGS. 23A and 23B provide a GUI for setting rules according to the present invention.

More particularly, FIG. 23A provides an example of a GUI 2300 for setting auto-view and auto-print rules according to the present invention. An auto-view rule setting identifies a number in box 2301 of the most recent files of the type identified in box 2302 that are to be automatically viewed when a portable memory device 21 is inserted into an attachment unit 19 coupled to an instance of reproduction device 18 capable of viewing the files.

Further, using GUI 2300 a user may specify an auto-print rule whereby a number indicated in box 2303 of most recent files of a type specified in box 2304 are to be automatically printed in a case that an instance of reproduction device 18 is capable of printing.

In GUI 2300, a rule is limited to a "most recent" criteria 2308. However, it is possible to modify GUI 2300 to include a selection box in which the user may scroll and choose another selection criteria. Thus, for example, it would be possible to select a "most frequently used" selection criteria within a selection box of a modified GUI 2300. Alternatively, separate entries may be added to GUI 2300 to provide "most frequently used" "auto-print and auto-view rules similar to the "most recent" auto-print and "auto-view" rules. In addition, type boxes 2302 and 2304 may specify a wild card (e.g., "*") to identify all types of files, or list one or more file types.

GUI 2350 provides another example of a GUI for setting a print attribute associated with a file according to the present invention. The print attribute may be used in combination with the auto-print rule illustrated in GUI 2300.

Print options 2351, 2352 and 2354 allow a user to identify whether a file is to be printed once, each time the user's portable memory device 21 that references the file is detected by attachment unit 19 coupled to a printer instance of reproduction device 18, or never printed. Listing 2355 identifies the files by name and listing 2356 identifies the print option associated with each of the files in listing 2355. By selecting one or more of the files in listing 2355 and selecting one of print options 2351 to 2353, the user is able to specify a criteria for printing. Box 2354 allows the user to update the print options.

When used in combination with an auto-print rule of GUI 2300, it is possible to further specify those files that are to be printed automatically. If, for example, "screenShots.doc" is the most recently used file of type "doc", it is automatically printed, if it has not already been printed. If it has already been printed, the auto-print rule may be configured to either not select another file for printing, or select the next most recent file for printing whose print file attribute indicates that it should be printed.

A similar GUI may be designed for use with the present invention to identify a view attribute which may be used alone or in combination with an auto-view rule depicted in GUI 2300.

Print and view file attributes are examples of some of the attributes that may be associated with files for use with the present invention. Other attributes may be assigned to files for use in determining whether a rule is satisfied for given reproduction data. For example, a counter may be associated with the files that may be used to identify the most frequently accessed files. The counter initialized when the file's entry is first added to portable memory device 21, incremented each time a file is selected, and reset as desired by the user, for example. A date may be associated with reproduction data used to identify that reproduction data that is the most recently accessed/stored.

A format attribute associated with reproduction data stored in a file (e.g., a file extension) or other attribute identifying the format of the reproduction) data may be used to determine whether a "suitable format" rule applied to reproduction data is satisfied. That is, for example, where reproduction device 18 is a facsimile machine, a determination is made whether the reproduction data has a bitmap format. Further, it is possible to associate an attribute with reproduction data to identify whether it contains color data that is to be printed by a color printer instance of reproduction device 18.

Figure 24:
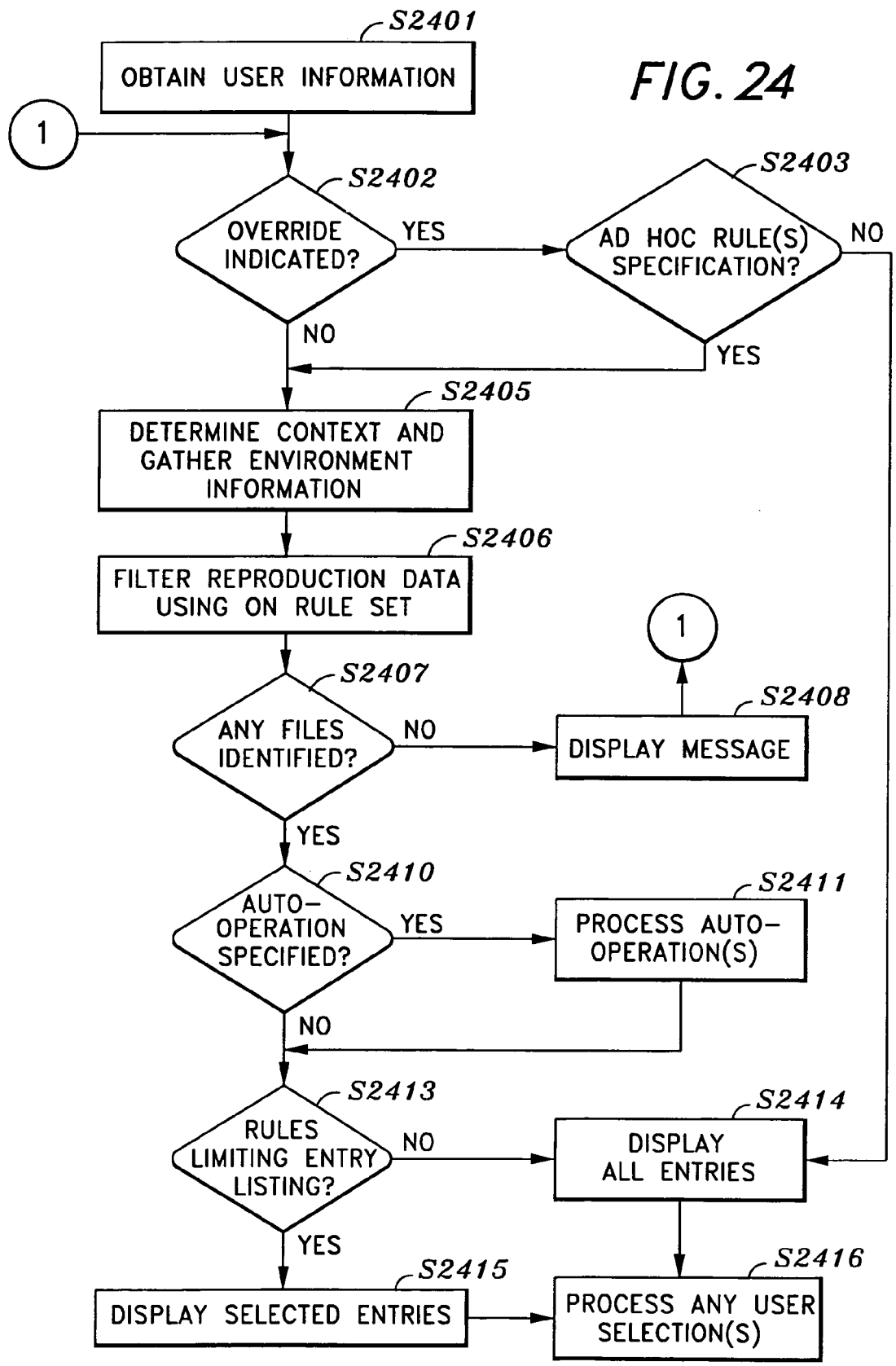
FIG. 24 illustrates a flow diagram of process steps to process a rules according to the present invention.

FIG. 24 illustrates a flow diagram of process steps to process a rules according to the present invention. The process steps are preferably performed prior to generating listing 402. While not included in the present flow diagram, it should be apparent that the such steps as user information verification may be performed as described in more detail above (e.g., as in FIG. 6).

At step S2401, user information is obtained. As discussed above, the user information includes such information as a username and/or password. In addition, a user may elect to override rule processing and/or specify a new (or ad hoc) rule set of none or more rules. If an override is detected at step S2402, processing continues at step S2403 to determine whether an ad hoc rule set has been specified by the user. If not, processing continues using the manual selection described herein. That is, listing 402 includes an entry for each of the entries in portable memory device 21, and a user may select an entry and an operation which is then processed.

If, however, the user enters an ad hoc rule set, processing continues at step S2405 to continue processing using the ad hoc rule set. If an override is not detected at step S2402, processing continues at step S2405 using the predefined rule set, if any.

At step S2405, a context and environment information are determined which is used during filtering to identify any reproduction data files that satisfy the user's set of rules. Such context and environment information includes the type of reproduction device 18 coupled to attachment unit 19, the data and time, attributes associated with each of the reproduction data files, etc.

At step S2406, reproduction data is filtered using the user-specified rule set (e.g., the predefined or ad hoc rule set). At step S2407, a determination is made whether or not any files where identified during filtering performed in step S2406. If none of the reproduction data satisfied the criteria defined by the rule set, processing continues at step S2408 to display a message and processing continues at step S2402 to allow the user to override the rule set and/or specify an ad hoc rule set.

However, if it is determined (in step S2407) that one or more reproduction data files were identified during the filtering performed in step S2406, processing continues at step S2410 to determine whether any auto-operation (e.g., "auto-print and/or "auto-view" operations) are defined in the rule set, processing continues at step S2411 to process the auto-operations. Auto-operation processing may include another override that allows the user to abort some or all of an auto-operation (e.g., by deselecting some or all of the reproduction data marked for processing during in the auto-operation). Thus, for example, a user may elect to remove one or more of the reproduction data files to be auto-printed" or "auto-viewed".

If no auto-operation is specified in the rule set or when the specified auto-operation(s) are processed, processing continues at step S2413 to determine whether the rule set limits the reproduction data entries included in listing 402. If so, processing continues at step S2415 to include in listing 402 for display the entries selected based on the filtering performed in step S2406. If not, processing continues at step S2414 to display all of the reproduction data with entries in portable memory device 21 in listing 402. In either case, processing continues at step S2416 to process any user selection operation(s). For example, if a user selects a reproduction data entry displayed in listing 402 along with an operation, the user selection is processed based on the operation selected as described in detail above.

In this regard, the invention has been described with respect to particular illustrative embodiments. However, it is to be understood that the invention is not limited to the above-described embodiments and that various changes and modifications may be made by those of ordinary skill in the art without departing from the spirit and the scope of the invention.

What is claimed is:

1. A data storing and reproducing system using a computer network comprising:
    server for storing reproduction data;
    at least one attachment unit coupled to the server, the at least one attachment unit comprising means for interfacing with a portable memory device having a reference to the reproduction data;
    first and second reproduction devices coupled to one or more of the at least one attachment unit, the first reproduction device capable of performing a first reproduction of the reproduction data and the second reproduction device capable of performing a second reproduction of the reproduction data, the second data reproduction being different than the first data reproduction; and
    rule processing means for processing a rule set, which includes selection criteria for selecting the reproduction data, to determine whether to reproduce the reproduction data based on whether the reproduction data satisfies selection criteria of the rule set,
    wherein the at least one attachment unit requests the reproduction data from the server for use by the reproduction device, if the reproduction data satisfies the selection criteria.

2. A data storing and reproducing system according to claim 1, wherein the at least one attachment unit further comprises a user interface for outputting information and receiving instructions.

3. A data storing and reproducing system according to claim 2, wherein the user interface comprises a portion that is common to all reproduction devices and another portion that is customized to an attached reproduction device.

4. A data storing and reproducing system according to claim 2, wherein the user interface displays for selection at least one entry corresponding to a reference to reproduction data stored in the portable memory device that satisfies the selection criteria, and at least one selectable function associated with one of the first and second reproduction devices.

5. A data storing and reproducing system according to claim 2, wherein the rule set specifies an auto-operation to be automatically performed on reproduction data that satisfies the selection criteria.

6. A data storing and reproducing system according to claim 5, wherein the auto-operation is an auto-print operation.

7. A data storing and reproducing system according to claim 5, wherein the auto-operation is an auto-view operation.

8. A data storing and reproducing system according to claim 1, wherein the rule processing means further comprises a means for determining whether to process the rule set based on a presence of a user-specified override.

9. A data storing and reproducing system according to claim 1, wherein the rule set includes criteria for selection of "most recently used" reproduction data.

10. A data storing and reproducing system according to claim 1, wherein the rule set includes criteria for selection of "most frequently used" reproduction data.

11. A data storing and reproducing system according to claim 1, wherein the rule set includes criteria for selection of reproduction data having a suitable format for one of the first and second reproduction devices.

12. An attachment unit connectable to plural types of data processing devices, comprising:
    means for interfacing with a portable memory device having information including a reference to reproduction data stored on a network server;
    means for processing a rule set, which includes selection criteria for selecting the reproduction data, to determine whether to reproduce the reproduction data based on whether the reproduction data satisfies selection criteria of the rule set;
    means for sending a request for the reproduction data, when the reproduction data satisfies the selection criteria;
    means for receiving the requested reproduction data from the network Server and ensuring that the requested reproduction data is in a format for use by one of the plural types of data processing devices; and
    means for causing the at least one of the plural types of data processing devices to perform a data reproduction of the received data.

13. An attachment unit according to claim 12, further comprising a means for displaying a user interface for outputting information and receiving instructions.

14. An attachment unit according to claim 13, wherein the user interface comprises a portion that is common to all reproduction devices and another portion that is customized to an attached reproduction device.

15. An attachment unit according to claim 12, wherein the display means further comprises:
    display means for displaying, for selection, at least one entry corresponding to a reference to reproduction data stored in the portable memory device that satisfies the selection criteria, and at least one selectable function associated with one of the first and second reproduction devices.

16. An attachment unit according to claim 12, wherein the rule set specifies an auto-operation to be performed using reproduction data that satisfies the selection criteria.

17. A data storing and reproducing system according to claim 16, wherein the auto-operation is an auto-print operation.

18. A data storing and reproducing system according to claim 16, wherein the auto-operation is an auto-view operation.

19. An attachment unit according to claim 12, wherein the rule processing means determines whether to process the rule set based on a user-specified override.

20. An attachment unit according to claim 12, wherein the rule set includes criteria for selection of "most recently used" reproduction data.

21. An attachment unit according to claim 12, wherein the rule set includes criteria for selection of "most frequently used" reproduction data.

22. An attachment unit according to claim 12, wherein the rule set includes criteria for selection of reproduction data having a suitable format for one of the first and second reproduction devices.

23. A method of storing and reproducing data on at least one of plural types of reproduction devices, the method comprising:

storing the reproduction data on a server;

retrieving information stored on a portable memory device in response to a request to reproduce the reproduction data using one of plural types of reproduction devices, the stored information on the portable memory device corresponding to the reproduction data;

retrieving a rule set which includes selection criteria for selecting the reproduction data;

using the stored information and the rule set to determine whether to reproduce the reproduction data based on whether the reproduction data satisfies the selection criteria, and accessing the reproduction data on the server, if the reproduction data satisfies the selection criteria; and reproducing the reproduction data using the requested reproduction device.

24. A method according to claim 23, further comprising displaying a user interface having a portion that is common to all reproduction devices and another portion that is customized to an attached reproduction device.

25. A method according to claim 24, wherein the user interface displays for selection at least one entry corresponding to a reference to reproduction data stored in the portable memory device that satisfies the selection criteria, and at least one selectable function associated with one of the first and second reproduction devices.

26. A method according to claim 23, wherein the rule set specifies an auto-operation to be automatically performed on reproduction data that satisfies the selection criteria.

27. A method according to claim 26, wherein the auto-operation is an auto-print operation.

28. A method according to claim 26, wherein the auto-operation is an auto-view operation.

29. A method according to claim 23, further comprising determining whether to process the rule set based on a presence of a user-specified override.

30. A method according to claim 23, wherein the rule set includes criteria for selection of "most recently used" reproduction data.

31. A method according to claim 23, wherein the rule set includes criteria for selection of "most frequently used" reproduction data.

32. A method according to claim 23, wherein the rule set includes criteria for selection of reproduction data having a suitable format for one of the first and second reproduction devices.

33. A network terminal capable of being accessed by at least one data reproduction device having means for interfacing with a portable memory device, the portable memory device including a reference to reproduction data stored in the network terminal, the network terminal, comprising:

means for storing the reproduction data;

means for receiving a request for the reproduction data from the at least one data reproduction device;

means for determining whether to convert the reproduction data to a format compatible with the reproduction device;

means for converting the reproduction data based on the result of a determination by the determination means; and means for sending the reproduction data to the reproduction device, wherein the reproduction data being requested and sent satisfies selection criteria for selecting the reproduction data, the selection criteria being included in a rule set, and wherein the selection criteria is used to determine whether to reproduce the reproduction data.

34. A network terminal according to claim 33, wherein the rule set specifies an auto-operation to be automatically performed on reproduction data that satisfies the selection criteria.

35. A network terminal according to claim 34, wherein the auto-operation is an auto-print operation.

36. A network terminal according to claim 34, wherein the auto-operation is an auto-view operation.

37. A network terminal according to claim 33, wherein the rule set includes criteria for selection of "most recently used" reproduction data.

38. A network terminal according to claim 33, wherein the rule set includes criteria for selection of "most frequently used" reproduction data.

39. A network terminal according to claim 33, wherein the rule set includes criteria for selection of reproduction data having a suitable format for one of the first and second reproduction devices.

40. A method for reproducing data using a terminal connected to a network having plural types of reproduction devices each having data format requirements, the method comprising:

storing the reproduction data;

sending access information corresponding to the reproduction data for storage in a portable memory device;

receiving a request for reproduction data determined to satisfy selection criteria for selecting reproduction data, the selection criteria being included in a rule set; and sending the reproduction data for reproduction by the requested reproduction device, wherein the selection criteria is used to determine whether to reproduce the reproduction data.

41. A method according to claim 40, wherein the rule set specifies an auto-operation to be automatically performed on reproduction data that satisfies the selection criteria.

42. A method according to claim 41, wherein the auto-operation is an auto-print operation.

43. A method according to claim 41, wherein the auto-operation is an auto-view operation.

44. A method according to claim 40, wherein the rule set includes criteria for selection of "most recently used" reproduction data.

45. A method according to claim 40, wherein the rule set includes criteria for selection of "most frequently used" reproduction data.

46. A method according to claim 40, wherein the rule set includes criteria for selection of reproduction data having a suitable format for one of the first and second reproduction devices.

* * * * *